(12) United States Patent
Longshaw et al.

(10) Patent No.: US 7,895,216 B2
(45) Date of Patent: Feb. 22, 2011

(54) METHOD AND SYSTEM FOR SORTING DATABASE TABLES ACCORDING TO A SORT PATTERN AND SORT ORDER

(75) Inventors: Tom Longshaw, Worcestershire (GB); Gary Pratley, Gloucester (GB); Keith Summers, Ross-on-Rye (GB)

(73) Assignee: Rainstor Limited, Gloucestershire (GB)

( * ) Notice: Subject to any disclaimer, the term of this patent is extended or adjusted under 35 U.S.C. 154(b) by 440 days.

(21) Appl. No.: 11/901,535

(22) Filed: Sep. 17, 2007

(65) Prior Publication Data

US 2008/0016074 A1    Jan. 17, 2008

Related U.S. Application Data

(62) Division of application No. 11/244,347, filed on Oct. 4, 2005.

(60) Provisional application No. 60/615,793, filed on Oct. 4, 2004, provisional application No. 60/671,172, filed on Apr. 12, 2005.

(51) Int. Cl.
*G06F 17/30* (2006.01)
(52) U.S. Cl. ...................... 707/752; 707/753
(58) Field of Classification Search ............... 707/752, 707/753
See application file for complete search history.

(56) References Cited

U.S. PATENT DOCUMENTS

| | | | |
|---|---|---|---|
| 5,592,667 A | 1/1997 | Bugajski |
| 5,983,232 A | 11/1999 | Zhang |
| 6,493,721 B1 | 12/2002 | Getchius et al. |
| 6,725,223 B2 | 4/2004 | Abdo et al. |
| 6,775,675 B1 | 8/2004 | Nwabueze et al. |
| 7,043,485 B2 | 5/2006 | Manley et al. |
| 7,139,768 B1 | 11/2006 | Janzig et al. |
| 7,599,949 B1 | 10/2009 | Plasek et al. |

(Continued)

FOREIGN PATENT DOCUMENTS

WO    WO 02/063498 A1    8/2002

(Continued)

OTHER PUBLICATIONS

Hitz et al., "File System Design for an NFS File Server Appliance," Network Appliance, Technical Report 3002, Rev. C 3/95, 1994, pp. 1-23, The USENIX Association.

(Continued)

*Primary Examiner*—Jean M Corrielus
(74) *Attorney, Agent, or Firm*—McDermott Will & Emery LLP

(57) ABSTRACT

A database is created from a set of data by identifying the patterns in the data set, storing the patterns in a memory device, and generating a representation of the database structure using pointers to the stored patterns. The use of pointers to store the patterns can greatly reduce the amount of memory or other space required to store the data set by replacing duplicate patterns with additional pointers, which are normally considerably smaller in size. In addition, the use of pointers may allow for more rapid searching, sorting, and other operations on the database. The representation of the database may use pointers in a tree structure to identify nodes and reduce searching and other operations. A tree structure representation of a table may use a pointer to a pattern for the base leaf node (e.g., nodes that do not branch) while using pointer pairs to represent branching nodes.

7 Claims, 47 Drawing Sheets

U.S. PATENT DOCUMENTS

2002/0095397 A1 7/2002 Koskas
2002/0095421 A1 7/2002 Koskas
2002/0133510 A1 9/2002 Lau
2005/0091188 A1 4/2005 Pal et al.
2006/0106832 A1 5/2006 Ben-Dyke et al.

OTHER PUBLICATIONS

Garcia-Molina et al., "Database Systems: The Complete Book" (2002) pp. 909-914 XP002448152.

| | Surname 101 | First Name 102 | City 103 | Age 104 |
|---|---|---|---|---|
| 105 | Smith | Andrew | Manchester | 40 |
| 106 | Wright | Andrew | London | 52 |
| 107 | Jones | Andrew | Manchester | 35 |
| 108 | Smith | Bob | Gloucester | 52 |
| 109 | Bolton | Andrew | Manchester | 40 |
| 110 | Smith | Jim | London | 45 |

| Surname 119 | Frequency (Instances) 120 |
|---|---|
| Bolton 111 | 1 115 |
| Jones 112 | 1 116 |
| Smith 113 | 3 117 |
| Wright 114 | 1 118 |

Table 121:

| Address 131 | Surname 119 | Frequency 120 |
|---|---|---|
| A1 135 | Bolton | 1 |
| A2 136 | Jones | 1 |
| A3 137 | Smith | 3 |
| A4 138 | Wright | 1 |

Table 122:

| Address 132 | First Name 125 | Frequency 126 |
|---|---|---|
| B1 139 | Andrew | 4 |
| B2 140 | Bob | 1 |
| B3 141 | Jim | 1 |

Table 123:

| Address 133 | City 127 | Frequency 128 |
|---|---|---|
| C1 142 | Gloucester | 1 |
| C2 143 | London | 2 |
| C3 144 | Manchester | 3 |

Table 124:

| Address 134 | Age 129 | Frequency 130 |
|---|---|---|
| D1 145 | 35 | 1 |
| D2 146 | 40 | 2 |
| D3 147 | 45 | 1 |
| D4 148 | 50 | 2 |

| Address | Left | Right | Frequency |
|---|---|---|---|
| E1 161 | A1 135 | B1 139 | 1 |
| E2 162 | A2 136 | B1 139 | 1 |
| E3 163 | A3 137 | B1 139 | 1 |
| E4 164 | A3 137 | B2 140 | 1 |
| E5 165 | A3 137 | B3 141 | 1 |
| E6 166 | A4 138 | B1 139 | 1 |

| Address | Left | Right | Frequency |
|---|---|---|---|
| F1 171 | C1 142 | D4 148 | 1 |
| F2 172 | C2 143 | D3 147 | 1 |
| F3 173 | C2 143 | D4 148 | 1 |
| F4 174 | C3 144 | D1 145 | 1 |
| F5 175 | C3 144 | D2 146 | 2 |

151

| Address | Left | Right | Frequency |
|---|---|---|---|
| E1 161 | A1 135 | B1 139 | 1 |
| E2 162 | A2 136 | B1 139 | 1 |
| E3 163 | A3 137 | B1 139 | 1 |
| E4 164 | A3 137 | B2 140 | 1 |
| E5 165 | A3 137 | B3 141 | 1 |
| E6 166 | A4 138 | B1 139 | 1 |

| Address | Left | Right |
|---|---|---|
| G1 181 | E3 163 | F5 175 |
| G2 182 | E6 166 | F3 173 |
| G3 183 | E2 162 | F4 174 |
| G4 184 | E4 164 | F1 171 |
| G5 185 | E1 161 | F5 175 |
| G6 186 | E5 165 | F2 172 |

| FIELD | CARDINALITY |
|---|---|
| manufacturer 701 | 80 706 |
| year of manufacture 702 | 40 707 |
| color 703 | 25 708 |
| use code 704 | 2 709 |
| premium 705 | 1000 710 |

FIG. 7b

| FIELD | CARDINALITY |
|---|---|
| manufacturer 811 | 80 821 |
| year of manufacture 812 | 40 822 |
| color 813 | 25 823 |
| use code 814 | 2 824 |
| premium 815 | 1000 825 |
| branch 816 | 4 826 |
| commission 817 | 1200 827 |
| driver sex 818 | 2 828 |
| number of drivers 819 | 5 829 |

FIG. 8b

| FIELD | CARDINALITY | GROUPING VALUE |
|---|---|---|
| use code 814 | 2 824 | 0 834 |
| driver sex 818 | 2 828 | 0 838 |
| branch 816 | 4 826 | 0 836 |
| number of drivers 819 | 5 829 | 0 839 |
| color 813 | 25 823 | 1 833 |
| year of manufacture 812 | 40 822 | 1 832 |
| manufacturer 811 | 80 821 | 1 831 |
| premium 815 | 1000 825 | 3 835 |
| commission 817 | 1200 827 | 3 837 |

GROUP 0 840
GROUP 1 841
GROUP 2 842

FIG. 8c

| manufacturer 1102 | no. of patterns 1112 |
|---|---|
| "Mfg A" 1103 | 147  1113 |
| "Mfg B" 1104 | 135  1114 |
| "Mfg C" 1105 | 237  1115 |
| "Mfg D" 1106 | 223  1116 |
| "Mfg E" 1107 | 258  1117 |
|  | 1000  1118 |

PATTERN 1101

INSTANCES OF PATTERN 1111

FIG. 11a

| PATTERN 1101 | manufacturer 1152 | no. of patterns 1162 | offset 1161 |
|---|---|---|---|
| | "Mfg E" 1157 | 258 1167 | 0 1177 |
| | "Mfg D" 1156 | 223 1166 | 258 1176 |
| | "Mfg C" 1155 | 237 1165 | 481 1175 |
| | "Mfg B" 1154 | 135 1164 | 718 1174 |
| | "Mfg A" 1153 | 147 1163 | 853 1173 |
| | | 1000 1168 | |

LOCATION OF FIRST PATTERN

FIG. 11b

| name 1401 | age 1410 |
|---|---|
| A 1403 | 23 1413 |
| B 1404 | 34 1414 |
| C 1405 | 17 1415 |
| D 1406 | 22 1416 |
| E 1407 | 24 1417 |
| F 1408 | 32 1418 |

FIG. 14a

| name 1401 | age 1410 | sort key 1420 |
|---|---|---|
| C 1405 | 17 1415 | 15 1425 |
| A 1403 | 23 1413 | 20 1423 |
| D 1406 | 22 1416 | 20 1426 |
| E 1407 | 24 1417 | 20 1427 |
| B 1404 | 34 1414 | 30 1424 |
| F 1408 | 32 1418 | 30 1428 |

| name 1440 | age 1441 | income 1442 |
|---|---|---|
| A 1450 | 23 1460 | 57,000 1470 |
| B 1451 | 34 1461 | 78,000 1471 |
| C 1452 | 17 1462 | 29,000 1472 |
| D 1453 | 22 1463 | 43,000 1473 |
| E 1454 | 24 1464 | 80,000 1474 |
| F 1455 | 32 1465 | 110,000 1475 |
| G 1456 | 50 1466 | 210,000 1476 |
| H 1457 | 35 1467 | 85,000 1477 |
| I 1458 | 18 1468 | 15,000 1478 |
| J 1459 | 40 1469 | 98,000 1479 |

| name 1440 | age 1441 | income 1442 | sort key 1443 |
|---|---|---|---|
| C 1452 | 17 1462 | 29,000 1472 | 29 1482 |
| I 1458 | 18 1468 | 15,000 1478 | 22 1488 |
| D 1453 | 22 1463 | 43,000 1473 | 41 1483 |
| A 1450 | 23 1460 | 57,000 1470 | 48 1480 |
| E 1454 | 24 1464 | 80,000 1474 | 60 1484 |
| F 1455 | 32 1465 | 110,000 1475 | 85 1485 |
| B 1451 | 34 1461 | 78,000 1471 | 69 1481 |
| H 1457 | 35 1467 | 85,000 1477 | 77 1487 |
| J 1459 | 40 1469 | 98,000 1479 | 89 1489 |
| G 1456 | 50 1466 | 210,000 1476 | 155 1486 |

| name 1440 | age 1441 | income 1442 | sort key 1443 |
|---|---|---|---|
| I 1458 | 18 1468 | 15,000 1478 | 22 1488 |
| C 1452 | 17 1462 | 29,000 1472 | 29 1482 |
| D 1453 | 22 1463 | 43,000 1473 | 41 1483 |
| A 1450 | 23 1460 | 57,000 1470 | 48 1480 |
| E 1454 | 24 1464 | 80,000 1474 | 60 1484 |
| B 1451 | 34 1461 | 78,000 1471 | 69 1481 |
| H 1457 | 35 1467 | 85,000 1477 | 77 1487 |
| F 1455 | 32 1465 | 110,000 1475 | 85 1485 |
| J 1459 | 40 1469 | 98,000 1479 | 89 1489 |
| G 1456 | 50 1466 | 210,000 1476 | 155 1486 |

METHOD AND SYSTEM FOR SORTING DATABASE TABLES ACCORDING TO A SORT PATTERN AND SORT ORDER

CROSS REFERENCE TO RELATED APPLICATIONS

This application is a divisional of U.S. patent application Ser. No. 11/244,347, filed on Oct. 4, 20005, which claims the benefit of U.S. Provisional Application No. 60/615,793, filed on Oct. 4, 2004, and U.S. Provisional Application No. 60/671,172, filed on Apr. 12, 2005, which are expressly incorporated herein in their entirety by reference thereto.

This application relates to U.S. Provisional Application No. 60/615,793 with title "Method and System for Implementing an Enhanced Database" filed on Oct. 4, 2004 and PCT Application WO 02/063498 with title "Method of Querying a Structure of Compressed Data", which are expressly incorporated in their entirety by reference herein.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates to a method and system for implementing an enhanced database and enhanced database operations.

BACKGROUND INFORMATION

Conventional database management systems incur greater operating overhead using more resources as they grow larger. Businesses rely on fast database performance in the execution of normal commercial operations and, in particular, would benefit from gains made in database efficiency and performance. The present invention is a significantly enhanced implementation of a database as well as enhanced database operations that result in greater efficiency, particularly with larger databases.

BRIEF DESCRIPTION OF THE DRAWINGS

FIG. 1a is a diagram illustrating a table of data that may appear in a database system.

FIG. 1b is a diagram illustrating a leaf node pattern set for a field according to one embodiment of the present invention.

FIG. 1c is a diagram illustrating the leaf node pattern sets for all the fields in a table according to one embodiment of the present invention.

FIG. 1d is a diagram illustrating a pattern set for a branch node according to one embodiment of the present invention.

FIG. 1e is an illustration of both branch node pattern sets for a particular table according to one embodiment of the present invention.

FIG. 1f is an illustration of the root node pattern set for a table according to one embodiment of the present invention.

FIG. 7b is a diagram listing the example fields and their cardinalities determined according to one embodiment of the present invention.

FIG. 8b is a diagram illustrating the example fields and their associated cardinality values for the refined tree design process according to one embodiment of the present invention.

FIG. 8c is a diagram illustrating the grouping of the fields into sub-lists using a logarithmic value of the cardinality for each field according to one embodiment of the present invention.

FIG. 11a is diagram illustrating the patterns and number of instances for each pattern that are stored in memory or on a storage device and referenced by pointers in the representation of the table for the data set according to one embodiment of the present invention.

FIG. 11b is a diagram illustrating the offset values for a table sorted in reverse alphabetical order by manufacturer according to one embodiment of the present invention.

FIG. 14a is a diagram illustrating an example table to be sorted using an expression according to one embodiment of the present invention.

FIG. 14b is a diagram illustrating the sorted table with the expression value shown according to one embodiment of the present invention.

FIG. 14c is a diagram illustrating a data set for an example table.

FIG. 14d is a diagram illustrating the table in sorted order by age and then income and showing the sort field or key value for each tuple of the table according to one embodiment of the present invention.

FIG. 14e is a diagram illustrating the data set for the table in sorted order by expression according to one embodiment of the present invention.

DETAILED DESCRIPTION OF EXAMPLE EMBODIMENTS

Figure 1G:
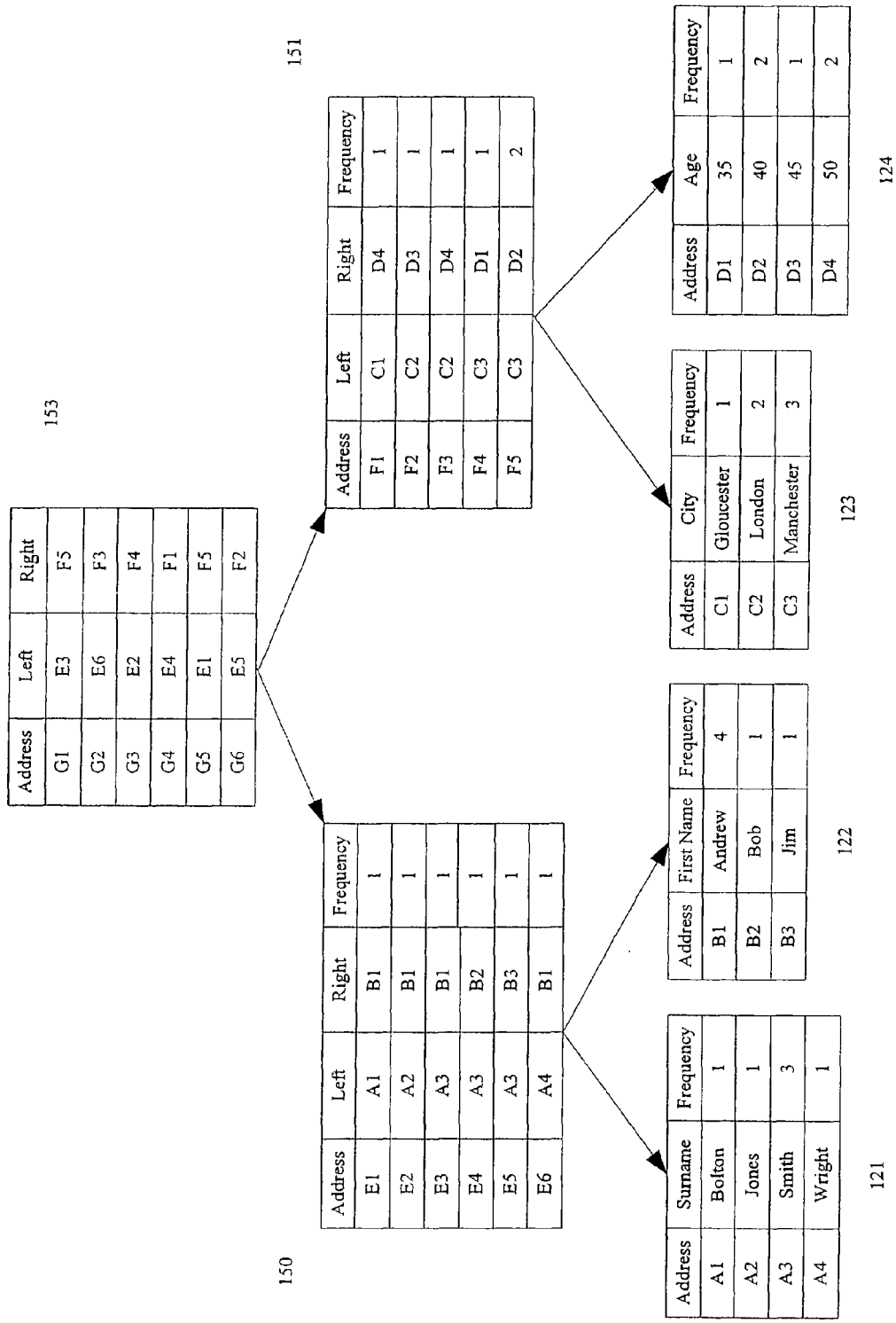
FIG. 1g is an illustration of the entire tree structure of a particular table with the pattern sets for each node according to one embodiment of the present invention.

According to one embodiment of the present invention, a database is created from a set of data (i.e., a "data set") by identifying the patterns in the data set, storing the patterns in memory (or on a storage device), and generating a representation of the database structure using pointers to the stored patterns. The use of pointers to store the patterns can greatly reduce the amount of memory or other space required to store the data set by replacing duplicate patterns with additional pointers, which are normally considerably smaller in size. In addition, the use of pointers may allow for more rapid searching, sorting, and other operations on the database because they can be performed using the patterns to represent many records (tuples) in a single operation. The present invention incorporates such a database as described in PCT Application WO 02/063498, METHOD OF QUERYING A STRUCTURE OF COMPRESSED DATA, the entirety of which is expressly incorporated by reference herein.

The terms tuple, row, and record are used interchangeably throughout this specification. The example embodiment illustrated below refers to a tuple identifying the relational nature of the resulting database according to this embodiment of the present invention. The present invention may also be implemented using a hierarchical or other database model in alternative embodiments of the present invention. The following examples and embodiments often describe the present invention using a data set for a table in a database. However, the embodiments described can also be used across several tables rather than for a single table only and the descriptions should not be considered as limiting the present invention to operating only on a single table of a database.

FIG. 1a is a diagram illustrating a table of data that may appear in a database system. This table contains four (4) fields: surname 101, first name 102, city 103, and age 104. There are six (6) tuples (rows or records) 105-110 as indicated. In a tree structure representation of this table according to one embodiment of the present invention, each of these fields corresponds to a leaf node in the tree and the values of the field are the patterns for the leaf node. In one embodiment of the present invention, the unique patterns for each node, including the leaf nodes for the fields, are stored in memory or on a storage device and a pointer in the table references the stored pattern. In addition, the number of instances of the pattern in the table is also stored along with the pattern and may be referenced by the same pointer to the pattern. In an alternative embodiment of the present invention, a second pointer to the number of instances may be used in the table though, in the example embodiment, this is not the case. FIG. 1b is a diagram illustrating a leaf node pattern set for a field according to one embodiment of the present invention. The unique patterns 111-114 along with the number of instances 115-118 of these patterns occur in the table are included in the pattern set for the leaf node (i.e., field) of the table according to this embodiment. The patterns are stored only once in the pattern set and each additional occurrence of the pattern results in incrementing the number of instances for the pattern. FIG. 11b shows a pattern set 151 with four patterns for the surname field along with the associated number of instances. The patterns are "Bolton" 11, "Jones" 112, "Smith" 113, and "Wright" 114 with a respective number of instances of 1 115, 1 116, 3 117, and 1 118. As previously stated, this pattern information is stored in memory or on a storage device and is referred to by pointers in the table. The titles "Surname" 119 and "Instance" 120 are shown only for the sake of clarity in the illustration and, in this embodiment, are not stored with the pattern information. The patterns in the pattern set are also stored in a sorted canonical order according to this example embodiment though, in other embodiments, ordering the patterns in the pattern set may not occur. Also as previously discussed, a single pointer refers to a pattern and its number of instances though in an alternative embodiment a separate pointer may be used for the number of instances. The number of instances is determined from the tuples 105-110 in the original data set of table 100. For example, the pattern "Bolton" 111 occurs only in a single tuple 109 of the table and, therefore, the pattern has only 1 instance 115. In another example, the pattern "Smith" 113 occurs in three tuples 105, 108, 110 of the table and, therefore, the pattern has 3 instances 117. FIG. 1b illustrates the pattern set for a single field or leaf node of the table and is only one example of the pattern sets for the table 100 according to this embodiment of the present invention.

FIG. 1c is a diagram illustrating the leaf node pattern sets for all the fields in a table according to one embodiment of the present invention. The pattern set for the surname field or leaf node 121 shown in FIG. 1b is also shown in FIG. 1c. In addition, the pattern set for the first name field or leaf node 122, the city field/leaf node 123, and the age field/leaf node 124 are also shown. Each of the pattern sets 121-124 includes the unique patterns for the field or leaf node along with the number of instances for the pattern in the field as previously described. For example, the first name pattern set 122 includes the first name patterns and their associated number of instances. The headings for the patterns 119, 125, 127, 129 and the number of instances 120, 126, 128, 130 are shown only for the sake of clarity in the illustration and are not otherwise stored according to this embodiment as previously described. The additional column address 131-134 are also shown for the sake of clarity and contain "addresses" for each of the patterns (and the associated number of instances) in the pattern set. The pointers in the table generally refer to the addresses for these pattern values. The addresses are shown here merely to facilitate the explanation of this embodiment of the present invention and the addresses are not stored values in the pattern sets (at least in accordance with this embodiment).

In addition to the leaf nodes (the fields) in a table, a tree structure representation of the table also includes branch nodes (a combination of leaf nodes and/or other branch nodes) as previously discussed according to one embodiment of the present invention. In a binary tree structure according to this embodiment, each branch node contains patterns based on two subordinate nodes. FIG. 1d is a diagram illustrating a pattern set for a branch node according to one embodiment of the present invention. The pattern set 150 for the branch node in a binary tree contains patterns that are composed of patterns from its two subordinate nodes (either leaf and/or branch nodes). A left node pattern 167 and a right node pattern 168 combine to make the branch node pattern and the number of instances 169 is also included for the pattern. As previously stated the headers and address column are shown only for the sake of clarity in the illustration and is not otherwise be stored along with the pattern information according to this embodiment. The pattern set for the branch node does not repeat the patterns for the subordinate nodes but instead includes pointers to those patterns according to this embodiment. As a result, the pattern set of a branch node is a pair of pointers—one for the left pattern and one for the right pattern—and a number of instances (or frequency) for the pattern. Based on the original data set for the table 100, the branch node pattern set 150 includes pointers to two subordinate leaf nodes for surname 121 and first name 122. The patterns for branch node pattern set 150 are: A1 135 (the pointer to the "Bolton" pattern) and B1 139 (the pointer to the "Andrew" pattern) with a frequency (number of instances) of 1 stored at address E1 161; A2 136 and B1 139 with frequency of 1 at address E2 162; A3 137 and B1 139 with frequency of 1 at address E3 163; A3 137 and B2 140 with frequency of 1 at address E4 164; A3 137 and B3 141 with frequency of 1 at address E5 165; and A4 138 and B1 139 with frequency of 1 at address E6 166. The branch node pattern set 150 shown in FIG. 1d is only one of the branch nodes for the table 100.

FIG. 1e is an illustration of both branch node pattern sets for a particular table according to one embodiment of the present invention. One branch node pattern set 150 was already described in FIG. 1d. A second branch node pattern set 151 includes pointers to two subordinate leaf nodes for city 123 and age 124. The patterns for this second branch node pattern set are: C1 142 (the pointer to the "Gloucester" pattern) and D4 148 (the pointer to the 52 pattern) with frequency (i.e., number of instances) of 1 at address F1 171; C2 143 and D3 147 with frequency 1 at address F2 172; C2 143 and D4 148 with frequency 1 at address F3 173; C3 144 and D1 145 with frequency 1 at address F4 174; and C3 144 and D2 146 with frequency of 2 at address F5 175. The patterns in the branch nodes 150, 151 reflect the unique combinations of patterns that exist in the original data set 100 for the table.

FIG. 1f is an illustration of the root node pattern set for a table according to one embodiment of the present invention. The root node pattern set 153 includes pointers to both the branch nodes 150, 151 described in FIG. 1e. The left and right pointers contain the addresses of the patterns in the branch node pattern sets according to this example. The patterns for the root node pattern set 153 are: E3 163 and F5 175 at address G1 181; E6 166 and F3 173 at address G2 182; E2 162 and F4 174 at address G3 183; E4 164 and F1 171 at address G4 184; E1 161 and F5 175 at address G5 185; and E5 165 and F2 172 at address G6 186. The frequency or number of instances at the root table is omitted from the example shown in FIG. 1f because it is generally redundant as most tables will not have multiple tuples with identical data in all the fields. It is however possible to have such identical tuples and therefore a frequency or number of instance value may be used with the patterns at the root node in one embodiment of the present invention. The patterns in the root set (i.e., the root node data set) represent each of the tuples in the table.

FIG. 1g is an illustration of the entire tree structure of a particular table with the pattern sets for each node according to one embodiment of the present invention. The tree structure reflects the original table data shown in FIG. 1a represented in a tree structure with the patterns stored at each of the leaf nodes 121-124 and pointers to the patterns or to other pointers stored at each of the branch 150, 151 and root 153 nodes.

Identifying Patterns in a Data Set:

A pattern may refer to one value in a field of a table as well as to a combination of values from multiple fields of the table. For example, a pattern for a leaf node is a value for a field represented by the leaf node. If the leaf node represents the field vehicle manufacturer, a pattern for the leaf node may be, for example, "Mfg A". A pattern may also represent the value for a branch node in a tree. A branch node is a node with subordinate or child nodes (two subordinate or child nodes for each branch in a binary tree). A pattern for a branch node represents the values for at least two leaf nodes in a binary tree. For example, a branch node may have two subordinate or child leaf nodes representing the fields vehicle manufacturer and year of manufacture. A pattern for this branch node may include, for example, {Mfg A, 1996}. The pattern in this example represents one pairing of values from the subordinate/child nodes. In the case where a branch node has at least one subordinate branch node, the pattern for the parent branch node will contain a grouping of at least 3 field values for the at least 3 leaf nodes at some point subordinate to the parent branch node. In summary, a pattern may be one value in the set of values for a field in a table (a pattern at a leaf node of a tree) or a pattern may be a grouping of values from the set of values for at least two fields in a table (a pattern at a branch node of a tree).

According to one embodiment of the present invention, the identification of data patterns in a data set for a table may be an important element in storing the patterns in memory or on a storage device and using pointers in the table to reference the data patterns. The use of pointers in the tuples (rows or records) of the table may allow greater efficiency through faster database operation and decreased storage required to implement a database according to the present invention. A pointer to a stored pattern replaces each data pattern that is encountered during the building of the example table in a database according to this embodiment. The use of a pointer to reference a pattern may occur for any type of pattern encountered. For example, a pointer may be used for any of the patterns at one of the four different types of nodes that may be encountered in a binary tree representation of a tuple of data in a database table as discussed below. According to one embodiment of the present invention, all the data patterns in a table are stored in pattern sets in memory or on a storage device and the representation of each tuple is implemented by using pointers to the stored patterns.

Figure 2:
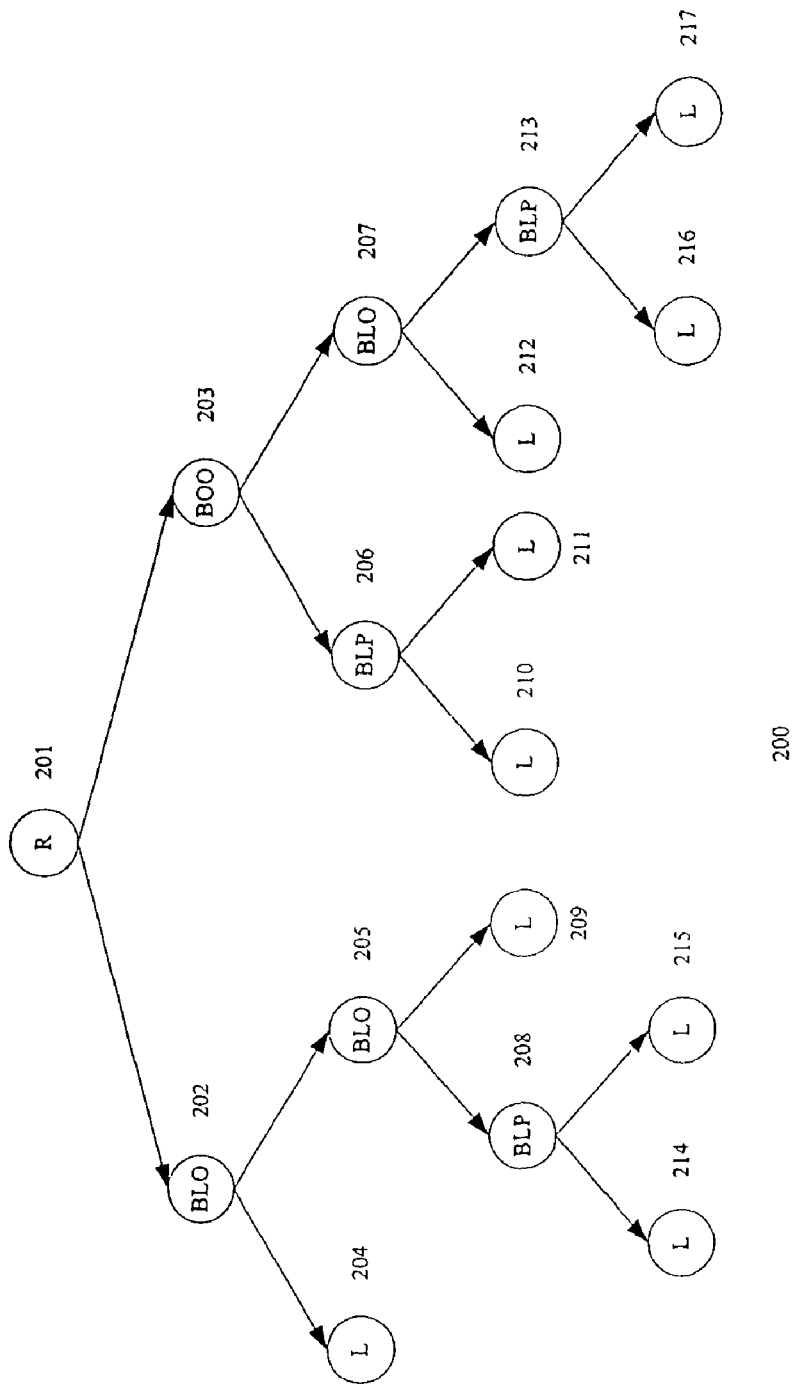
FIG. 2 is a diagram illustrating an example binary tree structure representation of a tuple in a table of a database highlighting the different types of patterns that may be identified according to one embodiment of the present invention.

FIG. 2 is a diagram illustrating an example binary tree structure representation of a tuple in a table of a database highlighting the different categories of patterns that may be identified according to one embodiment of the present invention. The binary tree structure 200 for the tuple begins at its highest point with a root node "R" 201, which identifies the tuple. In this embodiment, the root node 201 contains the tuple identification information that should remain in order to retain an accurate account of the tuples in the table of a database according to this embodiment of the present invention. From the root node "R" 201, the binary tree 200 branches to two nodes 202, 203 each containing pointers to one or more stored patterns. At any level of the binary tree 200 the contents of a node may be pointers to stored patterns according to this embodiment. For example, both of the first two nodes 202, 203 resulting from the branching from the root node 201 may contain pointers to their own respective stored pattern sets.

The first node 202 represents one particular type of node: a branching node with a subordinate leaf node and another subordinate branching node—i.e., Branching node with Leaf and Other nodes (BLO). This branching node 202 contains a pointer to a BLO pattern. The BLO pattern itself being a pair of pointers with the first pointer to the subordinate leaf node 204 pattern (i.e., a field value) and the second pointer to the subordinate branch node 205 pattern, in this case another BLO branching node. Any pattern for a branching node and for the root node will contain a pair of pointers to other patterns because of the binary tree structure used according to this embodiment of the present invention. This second BLO branching node 205 branches to another leaf node 209 and to a different type of branching node 208 that branches to two subordinate leaf nodes—i.e., Branching node with Leaf Pair (BLP). This BLP branching node 208 contains a BLP pattern and branches to two leaf nodes 214, 215. A BLP pattern is a pair of pointers with the first pointing to a first leaf node 214 pattern and the second pointing to a second leaf node 215 pattern. Unlike the root node and the branching nodes, leaf nodes contain pointers to field values instead of to other pointers—the leaf nodes correspond to the fields in the table—according to this embodiment. On the other side of the binary tree 200 from the root node 201, the second node 203 is yet another type of branching node with two subordinate branching nodes—i.e., Branching node with Other node and Other node (BOO). This BOO branching node 203 contains a BOO branching pattern and branches to a BLP branching node 206 and a BLO branching node 207. A BOO branching pattern is a pair of pointers with the first pointing to first branching node 206 pattern and the second pointing to a second branching node 207 pattern. The first branching node 206 is a BLP node branching to two subordinate leaf nodes 210, 211. The second branching node 207 is a BLO node branching to a subordinate leaf node 212 and a subordinate BLP branching node 213. This BLP branching node 213 itself branches to two subordinate leaf nodes 216, 217. Though the nodes in the tree structure, particularly the branching nodes, have been distinguished, all nodes other than leaf nodes in the tree structure will contain pointers to patterns consisting of two pointers, one each for a pattern from the immediate two subordinate nodes, according to this embodiment of the present invention. Leaf nodes represent the fields of the table and wilt contain pointers to actual field values that are stored as part of the pattern set for the field/leaf node according to this embodiment.

FIG. 2 illustrates different types of nodes that may exist in a binary tree representation of a tuple of a database table according to one embodiment of the present invention. However, FIG. 2 does not necessarily illustrate the use of binary tree structures in the generation of an example table or database as it does not incorporate other example database building techniques such as unbalancing/re-balancing the binary tree and replacement of leaf and branch patterns that may be utilized according to one embodiment of the present invention.

One process according to the example embodiment of the present invention is to replace multiple occurrences of a data pattern in a table with multiple pointers to a single instance of the data pattern. According to this process, the data patterns for a field or node are stored in a pattern set in memory or on a storage device and pointers are used in the nodes of the table to reference the stored patterns in the pattern set. This reduces the amount of memory and/or disk space required to implement a table or database resulting in improved efficiency. In other words, a repeated pattern in a table is replaced by multiple pointers to a single instance of the pattern stored in memory or on a storage device. For this reason, a determination whether a data pattern is new needs to be made each time a data pattern is identified. For example, when a pattern is encountered for a table, a search operation may be conducted to determine if the pattern has already been encountered—i.e., an instance of the pattern has already been recorded in the pattern set for the field or node of the table. The time required to conduct this search operation is proportional to number of already encountered patterns—in particular, it is proportional to log(n) where n represents the number of different patterns already encountered for the table of the database. As a result of this proportionally increasing execution cost for the search operation, a reduction in the number of search operations conducted may greatly improve the efficiency in the building of the example database.

One method to reduce the number of search operations conducted is related to the type of data pattern encountered. According to one embodiment of the present invention, the type of data pattern is first determined when a data pattern is encountered (e.g., leaf, BLP, BLO, and BOO). For a leaf pattern (i.e., a field value), no reduction in the number of search operations may be feasible. Therefore, the encountered leaf pattern may need to be compared with the set of already encountered patterns to determine if the leaf pattern is new. If the pattern is new, it is added to the set of encountered patterns and a pointer may be used to replace the pattern in the representation of the tuple of the table. A frequency value of 1 may also be assigned to the pattern according to one embodiment of the present invention. If the pattern already exists, the frequency counter may be updated (i.e., incremented) and a pointer may be used to replace the pattern in the representation of the tuple for the table. The remaining patterns (e.g., BLP, BLO, and BOO—branch node patterns) represent a pair of patterns that can occur in a binary tree representation of a tuple of a table. For these patterns based on a pair of subordinate patterns, the pattern may be new regardless of whether its subordinate patterns are new or already exist because the combination of the subordinate patterns may be new. However, it is a certainty that if either of the subordinate patterns is new, the pattern itself will be new. For this reason, if a new first subordinate pattern is encountered, the second subordinate pattern does not need to be compared in order to determine if the pattern itself is new—it is a certainty that the pattern is new. This situation allows for an efficiency enhancement to be made in the pattern identification process by reducing the number of search operations for patterns based on subordinate pattern pairs (e.g., BLP, BLO, and BOO patterns—branch node patterns) according to one embodiment of the present invention. This efficiency results in only searching half the subordinate patterns where the first subordinate pattern encountered is new.

Figure 3:
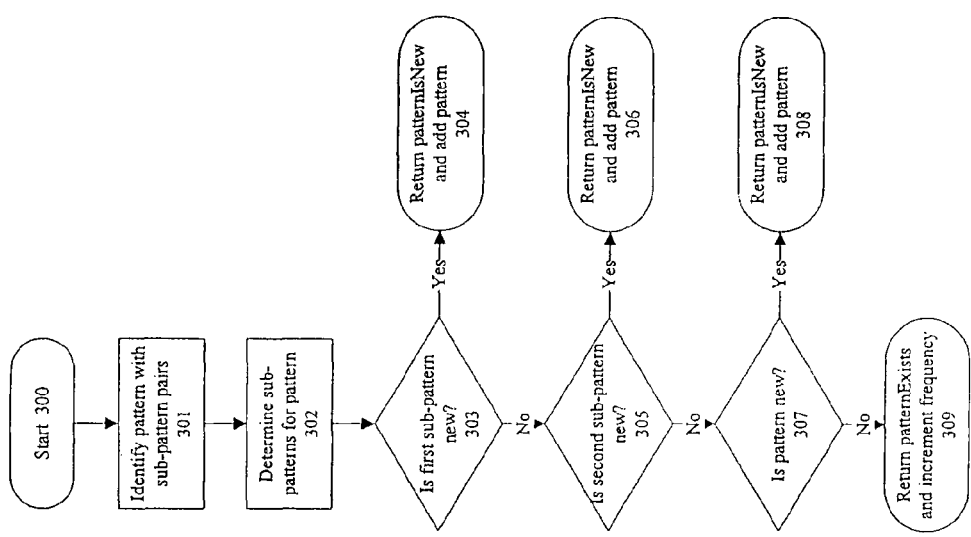
FIG. 3 is a diagram illustrating the logic used in incorporating one particular efficiency enhancement into the pattern identification process for patterns based on subordinate pattern pairs, according to one embodiment of the present invention.

FIG. 3 is a diagram illustrating the logic used in incorporating one particular efficiency enhancement into the pattern identification process for patterns based on subordinate pattern pairs, according to one embodiment of the present invention. According to this embodiment, one of the subordinate patterns is first compared with existing patterns to determine if it is new. Based on this determination for the first subordinate pattern, the second subordinate pattern may or may not be compared. It is not relevant which subordinate pattern is first compared and the example shown in FIG. 3 can easily be reversed. The new pattern function may begin 300 with an identification of the pattern 301 and a determination of the sub-patterns 302. A first sub-pattern, in this example the left sub-pattern in a binary tree representation, is compared 303 with existing patterns to determine if it is new. The comparison process for the subordinate pattern returns a frequency value indicating how many times the sub-pattern has already been identified in the table in one embodiment of the present invention. A frequency of 1, in one embodiment of the present invention, indicates that this is the first time that the sub-pattern has been encountered and, therefore, it is new. A frequency greater than 1 indicates that the sub-pattern is not new. p.leftPattern.frequency is an example of a variable that may contain the frequency value for the first sub-pattern of the pattern. If the sub-pattern is new (i.e., the frequency is 1), the new pattern function may add the pattern (with a frequency of 1) and terminate 304 indicating that the pattern is also new. If the first sub-pattern is not new, the second sub-pattern needs to be compared. In this example, the second sub-pattern is the right sub-pattern in a binary tree representation and is also compared 305 with existing patterns to determine if it is new. If a frequency of 1 is encountered for the second sub-pattern indicating that it is new, the new pattern function may add the pattern (with a frequency of 1) and terminate 306 indicating that the pattern is new (because one of its sub-patterns was new). p.rightPattern.frequency is an example of a variable that may contain the frequency value for the second sub-pattern of the pattern. If the frequency is greater than 1 for the second sub-pattern, the pattern itself needs to be compared 307 with already encountered patterns to determine if it is new. The result of this comparison 307 will determine if the pattern is new and the appropriate value will be returned either indicating the pattern is new 308 or that it already exists 309. The process as illustrated in FIG. 3 can be made further efficient by first performing pattern identification of leaf patterns (i.e., the field values) then incrementally increasing the hierarchy of the branch patterns up to the root pattern. In this manner, subordinate patterns will already be compared allowing for the retrieval of the frequency values instead of comparisons against other stored patterns.

Tree Design:

According to one embodiment of the present invention, a table of data can be represented using a tree-structure and in particular a binary tree-structure. According to this embodiment, a single tree contains the value for the data in a tuple or row of a table and a forest or conglomeration of trees (with a similar structure) represent the data in the entire table. In other words, the forest or set of trees represents the table while a single tree represents a tuple or row of the table. A tree-structure does not contain the field values and patterns found in the tree but only outlines the placement and organization of the nodes and where the field values are located (i.e., which leaf nodes represent which fields). In a binary tree-structure, all nodes are either leaf nodes (terminal nodes) with no subordinate or child nodes or they are branch or root nodes with exactly two subordinate/child nodes. In other words, in a binary tree structure, all nodes either do not branch (i.e., have no subordinate nodes) or branch to exactly two subordinate nodes. Nodes that do not branch are termed leaf nodes and may be thought of as leaves in the binary tree. Nodes that branch to two subordinate nodes may be termed branch nodes and may be thought of as the branching points in the binary tree. The first branching node in a binary tree may be termed the root node and may be thought of as the trunk or root of the binary tree. As previously discussed, the fields of a table are represented by leaf nodes in the binary tree. The patterns at the leaf nodes are the values of the field. Branch nodes represent a pairing or grouping of the values from all the subordinate leaf nodes.

Figure 4:
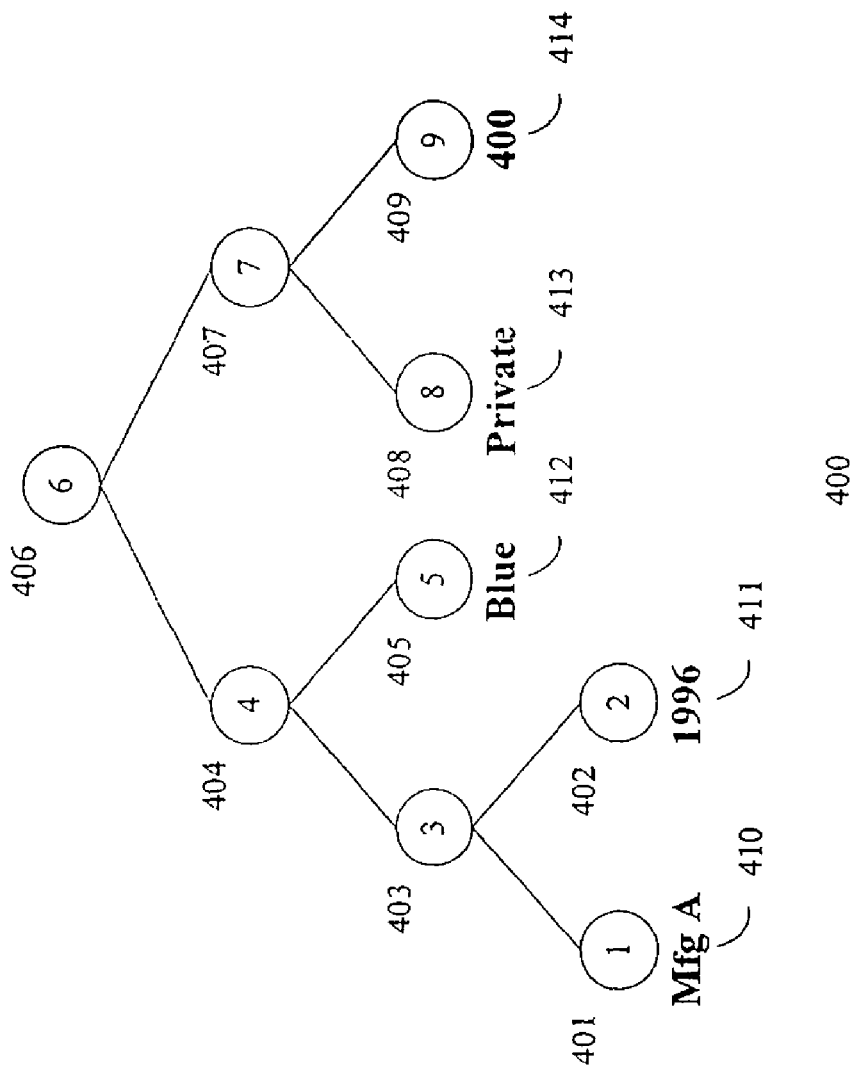
FIG. 4 is a diagram illustrating a binary tree structure representing an example tuple of a table according to one embodiment of the present invention.

FIG. 4 is a diagram illustrating a binary tree structure representing an example tuple of a table according to one embodiment of the present invention. In this example diagram, the table represented contains five fields: manufacturer, year of manufacture, color, use code, and premium. The tuple presented by the binary tree shown in the FIG. 4 has the following values for the fields {Mfg A, 1996, Blue, Private, 400}. Leaf nodes in the binary tree represent the field values with: leaf node 1 401 representing the manufacturer field, leaf node 2 402 representing the year of manufacture field, leaf node 5 405 representing the color field, leaf node 8 408 representing the use code field, and leaf node 9 409 representing the premium field. Though the leaf nodes in FIG. 4 represent the fields of the table in the order that they were originally presented, the order of the fields does not need to be maintained in the leaf nodes for the example embodiment of the present invention. The field values at the leaf nodes are "Mfg A" 410 at leaf node 1 401, "1996" 411 at leaf node 2 402, "Blue" 412 at leaf node 5 405, "Private" 413 at leaf node 8 408, and "400" 414 at leaf node 9 409. The branch nodes in this binary tree are branch node 3 403, branch node 4 404, and branch node 7 407. The root node 406 is the first branching node in the tree. The pattern for each branch node depends on the subordinate leaf nodes. For example, the pattern for branch node 3 403 is {Mfg A, 1996} according to the embodiment shown in FIG. 4. The pattern for branch node 4 404 is {Mfg A, 1996, Blue} according to the embodiment shown in FIG. 4. The pattern for branch node 7 407 is {Private, 400} according to the embodiment shown in FIG. 4.

The ordering and position of a leaf node representing a field of the table greatly affects the efficiency of the tree design and table organization of the example database according to one embodiment of the present invention. For example, the performance of a search operation is determined by the number of unique patterns at each node (i.e., position) in the tree-structure. A node or position may be represented using an (x,y) coordinate system where x is the number of steps from the left to right across the level (numbered from 0) and y is the height above the lowest level of the tree (also numbered from 0). In other words, the x-value may be viewed as the horizontal axis value and the y-value may be viewed as the vertical axis value for the node in the tree. Using this (x,y) coordinate system (i.e., Cartesian coordinates), a formula for determining the minimum and a formula for determining the maximum number of unique patterns for a node may be implemented according to one embodiment of the present invention. The equation for the minimum number of unique patterns, in one embodiment of the present invention, is:

$$npMIN(x,y)=\max(NP(a,b)), \text{ where } (a,b)\epsilon children(x,y)$$

npMIN(x,y) is a function determining the Number of Patterns Minimum (npMIN) at a particular branch node in a tree—leaf nodes will have the set of unique values (patterns) for the field and no calculations need to be made for subordinate/child nodes as must be done for branch nodes. The branch node is identified using the (x,y) position identification as discussed earlier. The function is solved by determining the Number of Patterns (NP) for each of the immediate subordinate/child nodes of the branch node, the subordinate node identified using the (a,b) convention for the position to differentiate it from the (x,y) convention used for the branch node. The "max" function in the equation indicates using the larger of the two values (for a binary tree) for the number of patterns for the two subordinate nodes of the branch node. According to this equation, the minimum number of unique patterns for a branch node is equal to the larger of the two values for the number of unique patterns for the subordinate or child nodes of the branch node. For example, if a branch node has two subordinate leaf nodes, one subordinate leaf node for manufacturers with 10 unique patterns {Mfg 1, Mfg 2, Mfg 3, Mfg 4, Mfg 5, Mfg 6, Mfg 7, Mfg 8, Mfg 9, Mfg 10} and another subordinate leaf node for automobile colors with 5 unique patterns {Red, Green, Blue, Black, Grey}, the minimum number of unique patterns for the branch node is 10—the larger of the two values for the unique number of patterns for the two subordinate leaf nodes. Described another way, the minimum number of unique patterns at a branch node must include at least one instance of each pattern/value in the set of values for the subordinate/child nodes. Therefore, a subordinate leaf node with 10 unique values in its set of values requires a minimum of at least 10 different patterns occurring in the parent branch node according to this embodiment of the present invention. Because the patterns/values from the subordinate nodes can fully correlate (e.g., Mfg 1 is always Red), the minimum unique patterns at a branch node equal the greater of the two values for the unique number of patterns for each subordinate/child node of the branch node.

In addition to the equation for the minimum number of patterns at a branch node, an equation for the maximum number of patterns at a branch node may also be implemented. One example of an equation for the maximum number of patterns is, according to one embodiment of the present invention, as follows:

$$npMAX(x,y)=\min(\Pi NP(a,b),R), \text{ where } (a,b)\epsilon children(x,y)$$

npMAX(x,y) is the function to determine the Number of Patterns Maximum (npMAX) at a particular branch node in a tree. The branch node is identified using the (x,y) position identification as discussed earlier. As with the minimum function (npMIN) discussed above, the solution to the npMAX function requires a determination of the Number of Patterns (NP) for each of the subordinate or child nodes of the branch node. Unlike the minimum function (npMIN), a product of the number of unique patterns for each of the subordinate or child nodes is taken and compared to the number of tuples or rows in the table with the lesser of the two values (i.e., the product and the number of tuples) used as the final value. Using the same example used above for the minimum function (npMIN), if a branch node has two subordinate leaf nodes for the fields automobile manufacturer and color, the product of the two values for the unique number of patterns for each subordinate node equals 50 (i.e., 10 manufacturers*5 colors). This value, 50, is compared to the total number of tuples for the table—e.g., 40 tuples—and the lesser value (in this example 40) is used as the maximum number of unique patterns that can occur for a branch pattern according to this embodiment of the present invention.

Because a binary tree structure is used to represent the tuples of the table, the minimum and maximum number of unique pattern functions (npMIN and npMAX) can be further refined by replacing the (a,b) position convention for the subordinate or child nodes with the same (x,y) convention used for the branch node resulting in the following redefined functions:

$$npMIN(x,y)=\max(NP(2x,y-1),NP(2x+1,y-1))$$

$$npMAX(x,y)=\min(NP(2x,y-1)*NP(2x+1,y-1),R)$$

The minimum pattern function (npMIN) is equal to the maximum or greater value of the number of unique patterns from either of the two subordinate nodes. The maximum pattern function (npMAX) is equal to the minimum or lesser value of the product of the number of unique patterns for the two subordinate nodes or the total number of tuples or rows for the table (R).

When the actual number of unique patterns at a branch node is closer to the minimum value (npMIN) rather than the maximum value (npMAX), query and other operations on the data may be more efficient thereby improving the performance of the example database according to one embodiment of the present invention. One method to structure the tree in order to reduce the number of unique patterns at a branch node is to group closely correlated fields according to one embodiment of the present invention. Correlation refers to the direct relationship between the values for two different fields in a table of the database (or, for example, the patterns for two different leaf nodes in the tree). Using the previous example, the patterns/values in an automobile manufacturer field may have a correlation to the patterns in the automobile color field. If the pattern "Mfg 1" in the manufacturers field is always "Red", a pattern in the color field, and "Mfg 2" is always "Green" and so on, a strong or complete correlation between the patterns in the fields exists as each automobile manufacturer would be correlated to one automobile color. At the other extreme, the patterns or values for both fields would be completely uncorrelated if each automobile manufacturer produced automobiles in every one of the automobile colors. The direct correlation between the fields may range from no correlation (i.e., completely uncorrelated) as discussed above to a strong or complete correlation also discussed above with any degree of correlation in between. Using the above example, if the automobile manufacturer field is completely correlated to the automobile color field and their representative leaf nodes are both subordinate to the same branch node, there would only be 10 branch patterns for the 10 manufacturers with each manufacturer correlating to a single color value. If the automobile manufacturer field is completely uncorrelated to the automobile color field and their representative leaf nodes are both subordinate to the same branch node, there would be 50 branch patterns because each of the 10 manufacturers may produce cars in all 5 of the automobile colors. In a previously discussed example, the 40 tuples in the table indicate that there is little correlation between these fields as the value of 40 more closely resembles the completely uncorrelated value of 50 rather than the completely correlated value of 10.

In another embodiment of the present invention, a sub-binary tree (a subset of the binary tree beginning at a branch node instead of the root node) that has n subordinate leaf nodes (leaves) with the patterns at each leaf node having similar frequencies or alternatively the leaf nodes having a similar number of patterns could be replaced with a single n-ary node with the same number of leaves that also retains a count of the frequencies of the sub-leaves. For example using FIG. 4, a sub-binary tree beginning at node 4 404 has 3 leaf nodes: node 1 401, node 2 402, and node 5 405. If pattern frequencies or alternatively the number of patterns are similar, the sub-binary tree may be replaced with node 4 404 having 3 subordinate nodes (no longer a binary tree) without the intermediate branch node 3 403. This may be particularly advantageous where a stronger correlation between the patterns in the sub-binary tree exists.

As previously stated, a stronger correlation in the patterns of two subordinate nodes result in a parent branch node having closer to the minimum number of patterns rather than to the maximum number of patterns. By reducing the actual patterns at the branch node, the number of patterns is reduced in all further parent branch nodes. In other words, the stronger the correlation between two sets of patterns for subordinate nodes, the closer their combination size will be to the minimum possible value and because the parent node pattern size will be smaller, its parents can be smaller in pattern size and so on. The reduction in the number of patterns in the parent nodes results in a decreased amount of memory and storage usage as well as expedited execution of a query process on the data according to this embodiment of the present invention. The way the tree is designed, therefore, becomes very important in optimizing the database.

In selecting a tree design or layout, correlation may be used to achieve more optimal outcomes. In one embodiment with a tree with p leaf sets (leaves), there is a possible p! orderings of the fields with $2^p$ possible layouts or designs for the tree. As the number of fields increase or the number of tuples or rows (i.e., the set of values for the field) increase, it becomes increasingly impractical to determine the correlation between the fields. Therefore, finding another solution to achieve similar results where correlation values are not available can provide a near optimal solution without the considerable overhead determining correlation involves. Ideally, this other solution will require additional time or resources in a linearly progressing manner to the quantity of data and not in a greater than linearly progressing manner or else this solution will become too cumbersome for very large data sets. One such solution is the use of a cardinality value in place of correlation according to one embodiment of the present invention.

The cardinality of a field is the number of unique values (patterns) that the field contains in the entire data set for the field—in other words all the unique values that are used for the field. For example, in a data set of size R (the number of tuples or rows for the table), a unique key field would have a cardinality of R (all the values for the field are unique). The maximum number of values for a field (or patterns for a leaf node) is R because you can not have more values than tuples or rows in the table. Therefore, in this example, the minimum number of values for each parent branch node above the unique key must be R, which will always be greater than or equal to the number of patterns for any other leaf node. Because the number of patterns for the parent branch node is a minimum of R, if the leaf node for the field appears 10 levels below the root node there will be at least 10R patterns necessary to represent the table (10 levels*R as the minimum per level) in this example. However, if the leaf node for the field appears immediately below the root node there will only be a minimum of 2R patterns necessary to represent the table (2 levels*R). Therefore, placing the leaf node representing fields with high cardinality closer to the root node reduces the number of patterns necessary to represent the table and results in lower memory and storage usage as well as more efficient query execution in a manner similar to using field correlation. Regardless of the placement of the leaf nodes for the fields, there will always be a minimum of R patterns in the root node to represent all the tuples in a table. The maximum number of patterns in any field is R, the number of tuples (a field can only have one pattern in any given tuple, so even if a key is unique there can only be R of them in the entire database). The minimum number of patterns is always 1 because the field must always have a value (even if the value is NULL) in every tuple. According to one embodiment of the database, there will be R root nodes for a table because it allows the original order of the tuples in the table to be recorded. Although it is theoretically possible to have two completely identical tuples in a table, the occurrence is rare in practice and using a complicated mechanism to remove the duplicated pattern in the root node while retaining the original ordering of the tuples in the table may be less efficient. In an alternative embodiment of the present invention, it is possible to remove duplication of patterns at the root node.

The above example illustrates how using cardinality can achieve similar results as correlation according to one embodiment of the present invention. The principle difference between the two is in the amount of time (resources) required to determine cardinality as opposed to correlation. Using a simple function to calculate the time taken to determine the cardinality can be represented as $O(n*p)$ while the time taken to determine correlation would take $O(n*p^2)$ where n represents the number of tuples in the table and p represents the number of fields in each tuple of the table.

Figure 5:
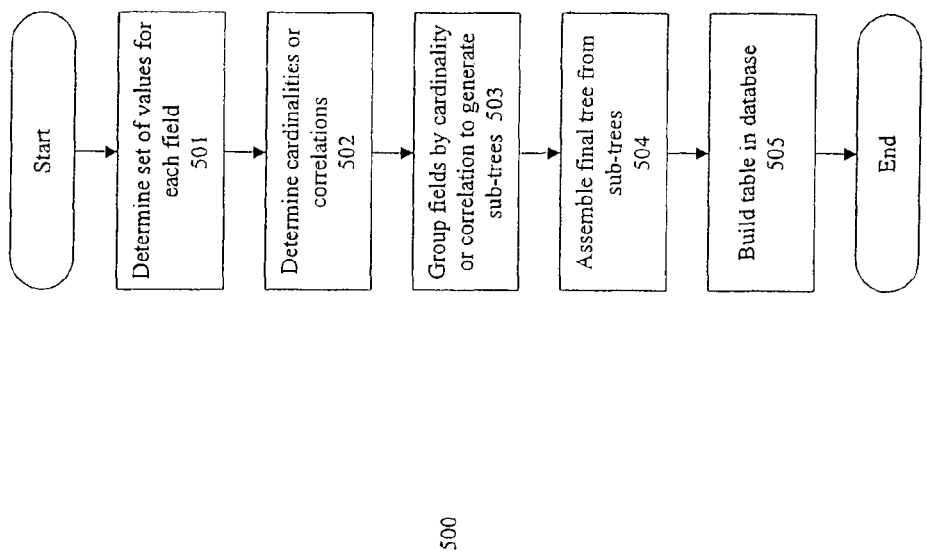
FIG. 5 is a diagram illustrating the process of generating a tree design or layout for a table according to one embodiment of the present invention.

FIG. 5 is a diagram illustrating the process of generating a tree design or layout for a table according to one embodiment of the present invention. The first step 501 in the process 500 is determining the set of values (i.e., the patterns) for each field of the database table. The cardinalities or correlations between the fields are next determined 502. As previously discussed, the calculation of cardinality may be more efficient than calculating the correlation between fields and takes only time O(n) to compute instead of time O(n²). However, a correlation may provide more useful information in generating the tree structure representation of the table and should therefore be used when available. Even though the correlation may be more useful, it is not calculated instead of cardinality and is used only if already available in the example embodiment of the present invention. Ordering the fields in the tree representation of the table in order to take advantage of a common cardinality or high correlation is the third step 503 in the process depicted in FIG. 5. Fields with common cardinality or high correlation are ordered so they share a common parent or, in other words, so that they are both subordinate or child nodes of the same parent branch node. Grouping fields with common cardinality or high correlation may reduce the number of patterns that may exist at the parent branch node and for other ancestor (i.e., preceding) nodes. After grouping fields with common cardinality or high correlation 503, the tree for the table is assembled 504 from the sub-trees or branches created in the grouping process 503. The grouping step 503 and the assembly step 504 can be iterative in order to produce a final tree from the assembly of branches determined through the grouping 503 and assembly 504 processes. The final step in the process of designing a tree-structure to represent a table in the database 500 is the building of the table 505 based on the determined tree-structure.

The third step 503 in the process 500 involves the grouping of fields (or clustering of nodes) and generating sub-trees based on these groupings. In order to accomplish this task, a function to determine the sub-tree structure may be required. For example, the function subtree(list,h) is defined below and takes as its parameters a list of the fields for the table—list— and a minimum height for any node in the sub-tree—h. The list of fields can be in any order (though the grouping process 503 provides a sorted list which is used as part of the process) and the minimum height is the height in levels (further described below) of the branch node or sub-tree. The subtree function may return a list of equal length as the list provided; the returned list specifying the positions for each field and node. In one embodiment of the present invention, the subtree function may be specified as follows:

```
subtree(list,h) =
    let width = 2^{int(log_2(length(list)))} in
        let diff = (length(list) – width)*2 in
            let x=0, y=h in
                let result = [ ] in
                    for (i=0; i<diff; i++)
                        result.append((x,y))
                        x = x+1
                    if(diff>0)
                        y = y+1
                        x = diff/2
                    while (x<width)
                        result.append((x,y))
                        x = x+1
```

Applying the subtree function to a list of fields {a,b,c,d,e} of length 5 (i.e., containing 5 fields) and with a minimum height of 0 (h=0) results in a width=$2^{int(log_2(length(list)))}$=4, where length(list)=length({a,b,c,d,e})=5, $log_2$(length(list))=$log_2$(5) =2.322, int($log_2$(length(list)))=int(2.322)=2 and a diff=2 in the above equation. The resulting set of Cartesian coordinates (x,y) for the nodes corresponding to the fields is {(0,0), (1,0), (1,1), (2,1), (3,1)}.

Figure 6A:
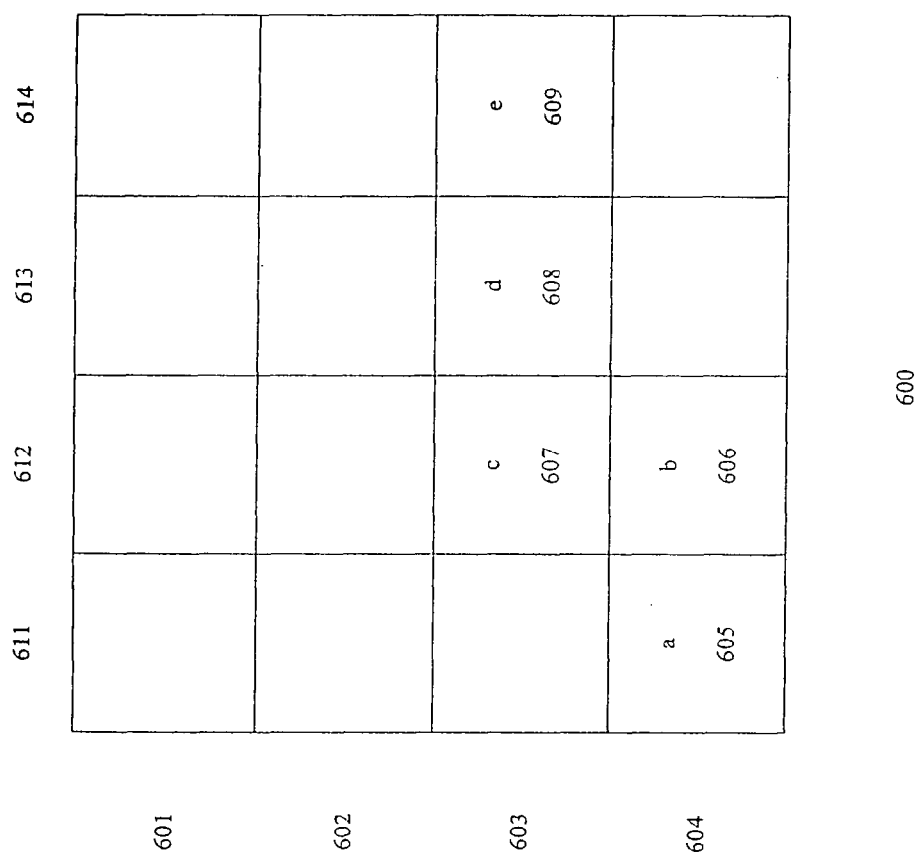
FIG. 6a is a diagram illustrating a two-dimensional array where the fields of the table are positioned as leaf nodes according to one embodiment of the present invention.

FIG. 6a is a diagram illustrating a two-dimensional array where the fields of the table are positioned as leaf nodes in accordance with the above example according to one embodiment of the present invention. The array 600 contains 4 rows 601-604 and 4 columns 611-614. The fields of the table are arranged as the leaves (i.e., leaf nodes) of the tree beginning at the lowest level of the tree and/or array 600. Using the (x,y) coordinates for the fields returned by the subtree function, the fourth or lowest row 604 of the array 600 corresponds to the y-coordinate value 0, the next higher or third row 603 corresponds to the y-coordinate value 1, and so on. The columns of the array 600 begin with the leftmost or first column 601 which corresponds to the x-coordinate value 0, the next or second column 602 corresponds to the x-coordinate value 1, and so on. The array 600 may be considered the first quadrant or quandrant I in a two-dimensional planar system with the x-axis being the horizontal axis and the y-axis being the vertical axis with both axes beginning with value 0 (zero) and incrementing by a value of 1. According to this embodiment, the field values and corresponding (x,y) coordinates returned by the subtree function are as follows:

| Field: | Coordinates (x, y): |
|---|---|
| a | (0, 0) |
| b | (1, 0) |
| c | (1, 1) |
| d | (2, 1) |
| e | (3, 1) |

Using the coordinates to place the fields in the array results in: field "a" 605 being placed in the fourth row 604 and first column 611 corresponding to coordinates (0,0); field "b" 606 being placed in the fourth row 604 and second column 612 corresponding to coordinates (1,0); field "c" 607 being placed in the third row 603 and second column 612 corresponding to coordinates (1,1); field "d" 608 being placed in the third row 603 and third column 613 corresponding to coordinates (2,1); and field "e" 609 being placed in the third row 603 and fourth column 614 corresponding to coordinates (3,1).

Figure 6B:
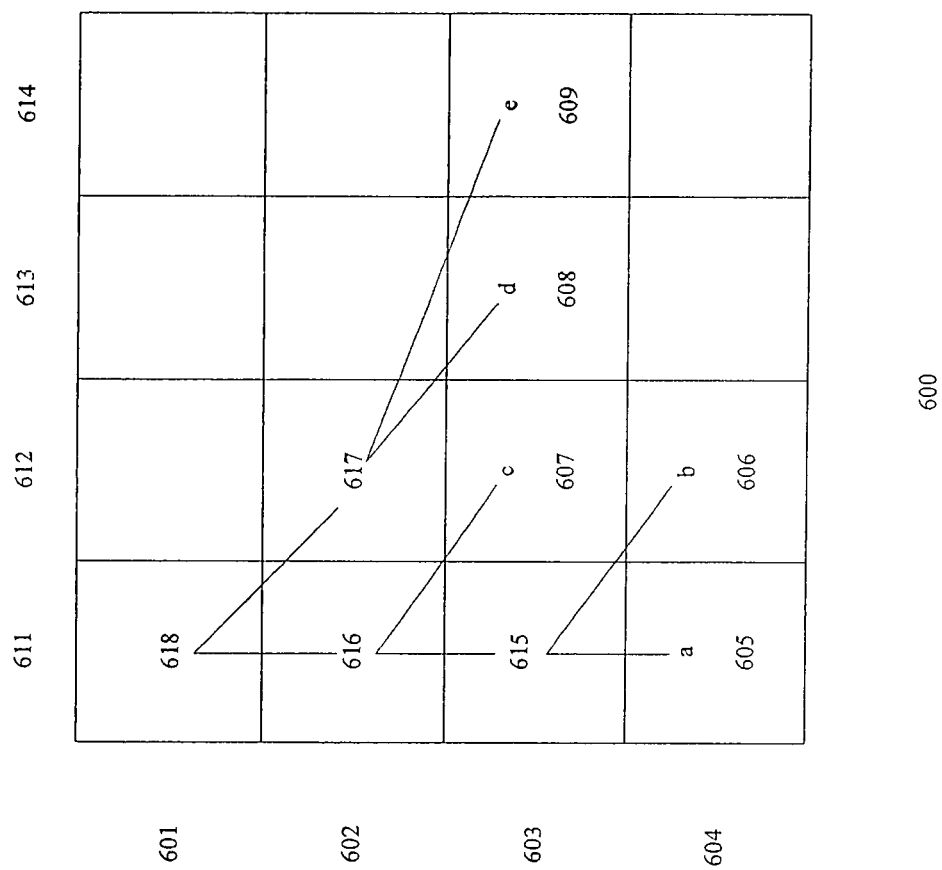
FIG. 6b is a diagram illustrating the two-dimensional array with the addition of the links between the leaf nodes and the branch and root nodes according to one embodiment of the present invention.

FIG. 6b is a diagram illustrating the two-dimensional array with the addition of the links between the leaf nodes and the branch and root nodes according to one embodiment of the present invention. The array 600 is the same as the array 600 shown in FIG. 6a with the addition of the links and non-leaf nodes. The links are created according to this embodiment by taking the first pair in a row and linking them to the leftmost open cell in the preceding row of the array. For example, fields "a" 605 and "b" 606 are paired in the fourth row 604 of the array 600 and linked to the first open cell 615 in the third row 603 of the array 600 representing a parent branch node for the leaf nodes (cells) for the fields. At the third row 603, this new branch node 615 is paired with the field "c" 607 leaf node and linked to the first open cell 616 in the second row 602 of the array 600 representing another branch node 616. Fields "d" 608 and "e" 609 are also paired and linked to the next open cell in the second row 617 in the array 600 representing another branch node 617. The two branch nodes 616, 617 of the second row 602 of the array 600 are paired and linked to the first open cell in the first row 601 of the array 600 thus representing the root node for the tree. The process described above allows a tree-structure to be designed and represented in an array using the subtree or other function according to one embodiment of the present invention.

Figure 6C:
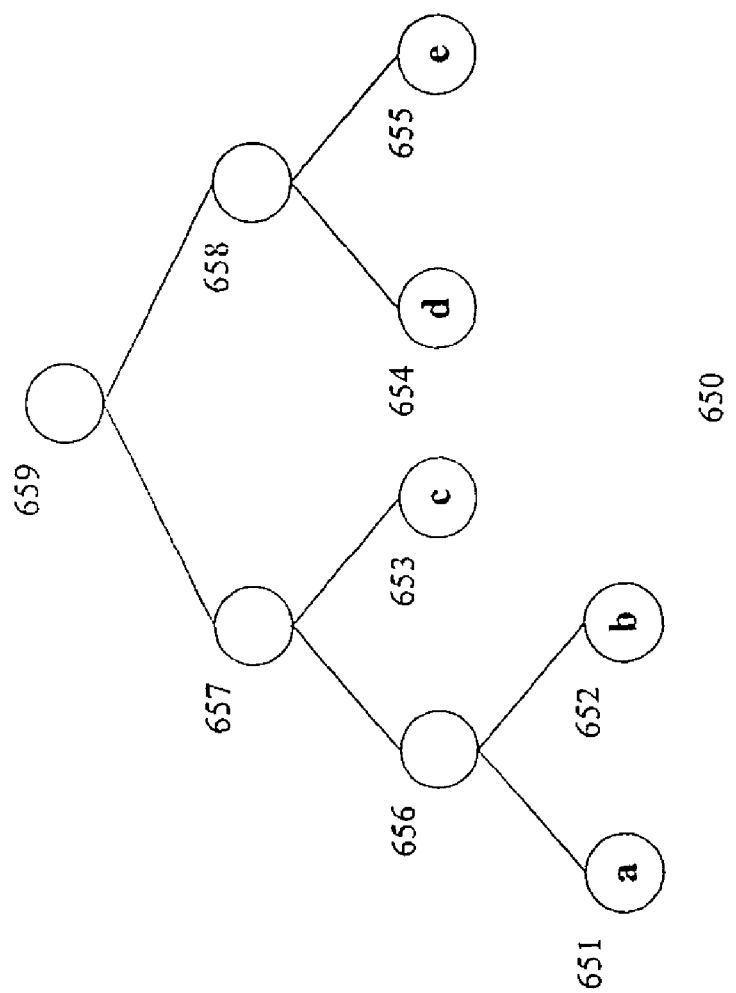
FIG. 6c is a diagram illustrating a more conventional binary tree representation of the fields of a table as determined according to the subtree function in one embodiment of the present invention.

FIG. 6c is a diagram illustrating a more conventional binary tree representation of the fields of a table as determined according to the subtree function in one embodiment of the present invention. The fields of the table {a,b,c,d,e} are displayed as the leaf nodes 651-655 of the tree. As discussed above, the leaf nodes are linked creating the branch nodes 656-658 of the tree and ultimately linking to the root node 659 of the tree. The above example shown in FIGS. 6a-6c illustrate a simple method for designing an example database table.

Figure 6D:
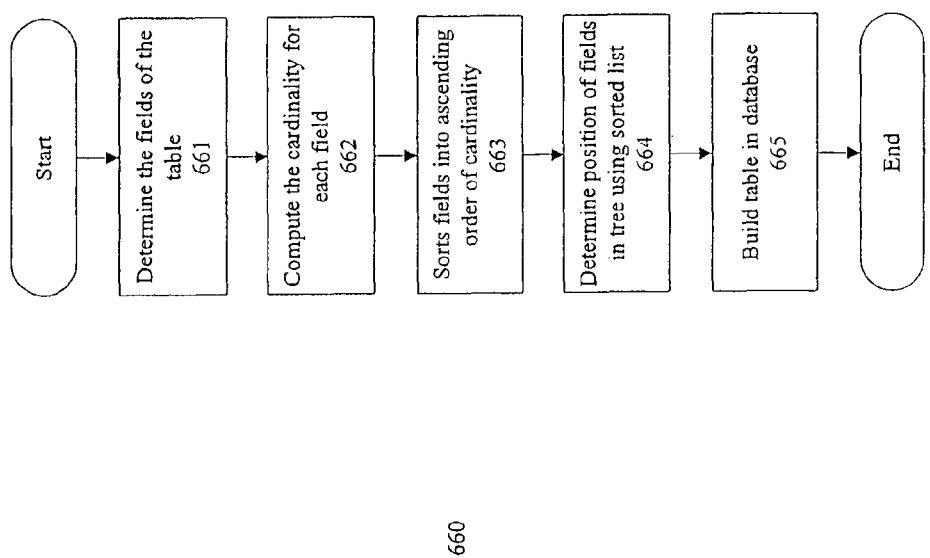
FIG. 6d is a block diagram illustrating a simple process for designing a table of an example database according to one embodiment of the present invention.

FIG. 6d is a block diagram illustrating a simple process for designing a table of an example database according to one embodiment of the present invention. This process begins by determining the fields of the table 661 as the first step. A second step 662 computes the cardinality of each field in the table. The fields are sorted into an ascending order of cardinality as the third step 663 in the process. The sorted field list is then supplied in the fourth step 664 to the subtree function in order to determine the coordinates for the fields as leaf nodes in a tree representation of the table. The returned coordinates are used to generate a table array for the fields of the table in the fifth step 665. As discussed later in this application, a three-dimensional array may be used with the third dimension representing the rows or tuples of the table and where the array cells contain pointers to the values for the fields according to one embodiment of the present invention.

Figure 7A:
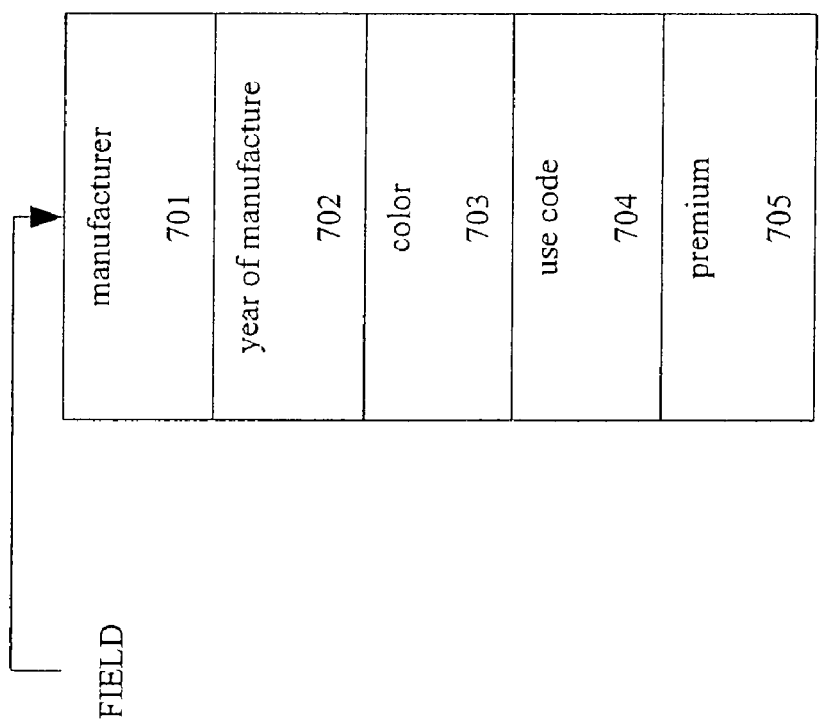
FIG. 7a is a diagram showing 5 example fields that can be designed into a tree using a simple process according to one embodiment of the present invention.
Figure 7C:
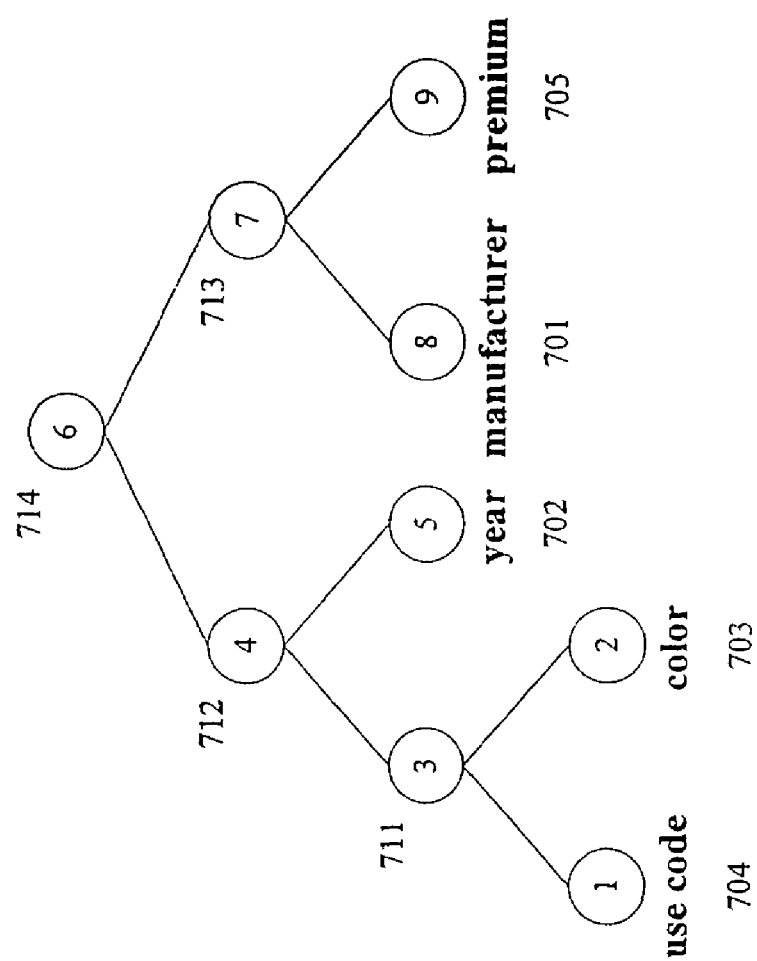
FIG. 7c is a diagram illustrating the resulting tree design using the simple process according to one embodiment of the present invention.

The process shown in FIG. 6d can be further illustrated using another example. FIG. 7a is a diagram showing 5 example fields that can be designed into a tree using a simple process according to one embodiment of the present invention. The five example fields are "manufacturer" 701, "year of manufacture" 702, "color" 703, "use code" 704, and "premium" 705. These fields are examples that may be included in the details for automobiles. The first step in the process 661 is determining the fields as is shown in FIG. 7a. Determining the cardinalities for each of these fields, the second step in the process 662, is performed and the results are shown in FIG. 7b. FIG. 7b is a diagram listing the example fields and their cardinalities determined according to one embodiment of the present invention. The cardinality value for the manufacturer field 701 is 80 706. The cardinality value for the year of manufacture field 702 is 40 707. The cardinality value for the color field 703 is 25 708. The cardinality value for the use code field 704 is 2 709. The cardinality value for the premium field 705 is 1000 710. Sorting the fields into an ascending order by cardinality, the third step in the process 663, results in a sorted list of the fields as {use code, color, year of manufacture, manufacturer, premium}. Using the subtree function discussed above, the sorted list is provided in order to obtain field coordinates in the fourth step of the process 664 with the coordinates used to generate the tree in the fifth step of the process 665. FIG. 7c is a diagram illustrating the resulting tree design using the simple process according to one embodiment of the present invention. The fields 701-705 are arranged as the leaf nodes 701-705 with new branch nodes 711-713 identified along with a root node 714. The simple tree design process described above is an effective method for designing and generating a tree for a table according to one embodiment of the present invention but becomes increasing less optimal in situations involving larger deviations in the cardinality counts of the fields.

Figure 8A:
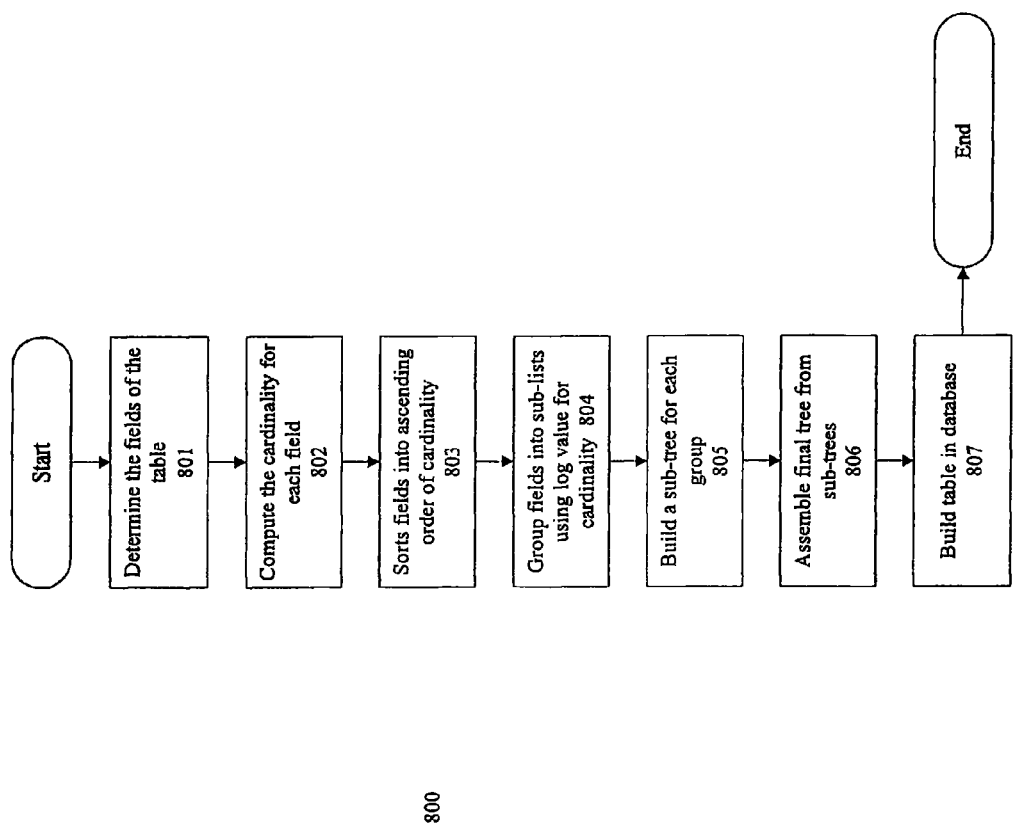
FIG. 8a is a diagram illustrating a further refined tree design process according to one embodiment of the present invention.

In order to improve the optimal nature of the tree design, the tree design process can be further refined to take into account the potential for large deviations in the cardinality between the fields. FIG. 8a is a diagram illustrating a further refined tree design process according to one embodiment of the present invention. The first three steps in this refined process are similar to the simple process shown in FIG. 6d. This refined process begins with a first step 801 to determine the fields of the table. A second step 802 is the calculation of the cardinality of each field in the table. FIG. 8b is a diagram illustrating the example fields and their associated cardinality values for the refined tree design process according to one embodiment of the present invention. The examples fields and their cardinality values are: "manufacturer" field 811 with a cardinality value of 80 821; "year of manufacture" field 812 with a cardinality value of 40 822; "color" field 813 with a cardinality value of 25 823; "use code" field 814 with a cardinality value of 2 824; "premium" field 815 with a cardinality value of 1000 825; "branch" field 816 with a cardinality value of 4 826; "commission" 817 with a cardinality value of 1200 827; "driver sex" field 818 with a cardinality value of 2 828; and "number of drivers" field 819 with a cardinality value of 5 829. After the cardinality for the fields is determined 802, the fields are sorted into an ascending order of cardinality as the third step 803 in the process. The resulting sorted list of fields is {use code, driver sex, branch, number of drivers, color, year of manufacture, manufacturer, premium, commission}. The fourth step 804 in the refined process is new and was not part of the simple process shown in FIG. 6d. The fourth step 804 is the grouping of fields into sub-lists using a logarithmic value for the cardinalities to determine how this grouping occurs. In order for this grouping to occur, a grouping value may be calculated using the following equation: $\text{int}(\log_{10}(\text{cardinality}))$. Using this equation, a base 10 logarithmic value of the cardinality is determined and this value is converted to an integer by dropping any residual fractional value. The resulting integer may be used to generate the sub-lists. FIG. 8c is a diagram illustrating the grouping of the fields into sub-lists using a logarithmic value of the cardinality for each field according to one embodiment of the present invention. Using the equation $\text{int}(\log_{10}(\text{cardinality}))$, a grouping value is determined for each field using that field's cardinality. For example, the grouping value for the use code field 814 with a cardinality of 2 824 is 0 834. The grouping value for the driver sex field 818 is also 0 (zero) 838 as is the grouping values 836, 839 for the branch field 816 and the number of drivers field 819, respectively. These four fields 814, 818, 816, 819 all have a grouping value of zero 834, 838, 836, 839 and all form group 0 840 in this example. The color field 813, year of manufacture field 812, and manufacturer field 811 all have a grouping value of 1 833, 832, 831 and form group 1 841. The premium field 815 and commission field 817 both have a grouping value of 3 835, 837 and form group 2 842. The fields in each of the groups still maintain the ascending order of cardinality determined in the third step 803 of the process in this example. The fifth step 805 in the refined tree design process is the building of a sub-tree for each of the groups. The subtree function may be used to generate the sub-trees for each group by providing the subtree function the list of fields for that group. The first group, group 0 840, will generate a sub-tree with four leaves or leaf nodes for the four fields contained in the group. The second group, group 1 841 will generate a sub-tree with three leaves or leaf nodes for the three fields contained in the group. The third group, group 2 842, will generate a sub-tree with two leaves or leaf nodes for the two fields contained in the group. The sixth and final step 806 in the process is generating the final tree by combining the sub-trees for each group. In a process similar to the tree generation for the array described earlier, the sub-trees for the first two groups (group 0 840 and group 1 841) may be linked to a branch node with this branch node and the sub-tree for the third group being linked to the root node. The groups are intentionally linked together in sequence beginning with the first group in order to force the higher cardinality fields (those with the higher grouping values) to higher positions in the tree. This will result in a reduced number of potential patterns at the branch nodes of the tree with the overall effect of greater efficiency in manipulating the data in the table and the tree—e.g., resulting in greater efficiency when searching the table.

Figure 8D:
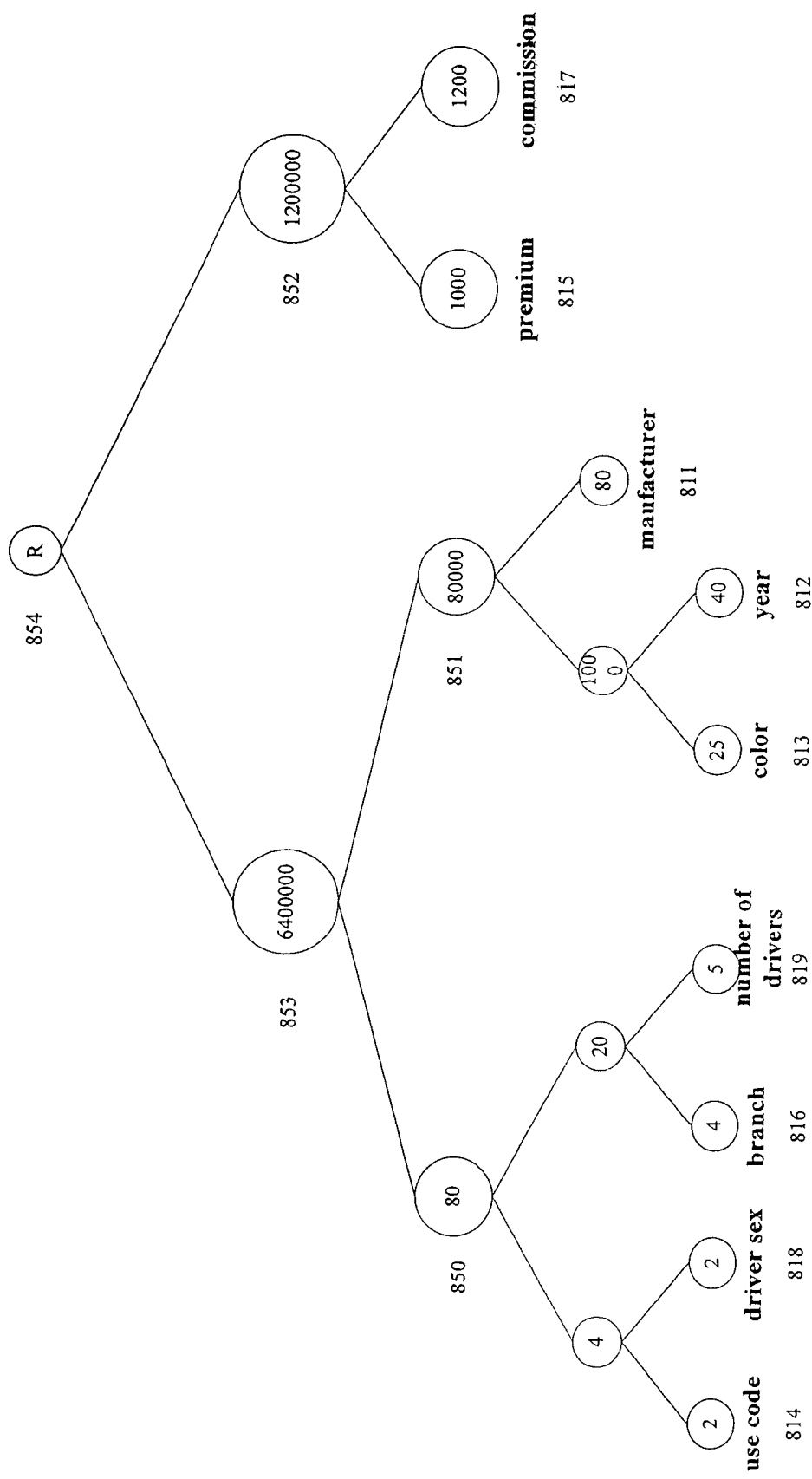
FIG. 8d is a diagram illustrating the final tree resulting from the refined tree design process according to one embodiment of the present invention.

FIG. 8d is a diagram illustrating the final tree resulting from the refined tree design process according to one embodiment of the present invention. The group 0 840 sub-tree is joined into the final tree at a branch node 850 and includes at its leaf nodes the fields user code 814, driver sex 818, branch 816, and number of drivers 819 organized according to cardinality and position returned by the subtree function. The group 1 841 sub-tree is joined into the final tree at a branch node 851 and includes at its leaf nodes the fields color 813, year 812, and manufacturer 811. The group 2 842 sub-tree is joined into the final tree at a branch node 852 and includes at its leaf nodes the fields premium 815 and commission 817. The group 0 840 and group 1 841 sub-trees are linked to a branch node 853 which in turn is linked with the group 2 842 sub-tree to the root node 854 of the final tree. The values at each node indicate the maximum possible patterns or values that can occur at the node. For example, the values at the leaf node indicate all the possible unique values for that field. At the branch nodes, the values indicate the maximum possible combinations based on the values of the subordinate or child nodes. These branch node values are determined by multiplying the values of the subordinate nodes. The maximum possible values are shown to indicate the efficiency achieved by using a logarithmic value to group the fields with the fields with greater cardinality being grouped together and included in the final tree at a higher level (i.e., closer to the root node 854) according to the example embodiment of the present invention. The use of this refined process may substantially reduce the number of patterns that can occur according to other tree designs for the same fields and may provide a more optimal solution to the tree design process.

Null Value Representation:

As part of the process of generating the example database, patterns in the data of a database table are identified and stored according to one embodiment of the present invention. In order to accomplish this pattern identification task, for any given field in a table, a set of all values that are present in the field is generated. Each value is included only once in this set of values for the field. For example, if an integer field of a table contains the values 1, 3, 5, 3, 7, 1, 5, 6 in various tuples of the table, a set of values {1, 3, 5, 7, 6} is generated for the field. The values 1, 3, and 5 are only included once in this set of values even though they each occur twice in the original data set of the database table.

In addition to storing values for the field, the data in a table of the database may also be examined and represented in a binary tree structure. According to one embodiment of the present invention, each tuple in the table is represented by a binary tree. The binary trees may then be manipulated in a manner where the leaves and branches of the binary tree are reorganized in order to facilitate a comparison of the binary trees for the table. Patterns may be found as follows: in the field value shown at a leaf of the binary tree—a leaf pattern; at a branch in the binary tree with a left and right leaf patterns—a pair of leaf patterns; at a branch in the binary tree with a subordinate leaf pattern and another pattern (branch pattern); and at a branch in the binary tree with two subordinate non-leaf patterns (branch pattern). Leaf patterns may be found at each leaf in the binary tree (i.e., for each field). Branch patterns may be identified at each branching point indicating at least one of a left branch and a right branch value, which may also include its own subordinate patterns. Each pattern is stored in memory and is generally referred to by reference using a pointer. In other words, the pointer contains an address where the pattern is stored. Multiple occurrences of a single pattern result in the pattern being stored once with additional pointers to the same stored pattern. In this manner, a pattern that occurs 15 times in the table is only stored once with at most 15 pointers to the pattern value. As a result of this process, the data in the table is reduced to a set of stored patterns and the trees for each tuple of the table are reduced with pointers replacing leaf and branch patterns whenever possible except at the root level (a root level structure needs to be maintained to maintain an accurate ordering of the tuples). Depending on the degree of pattern repetition, this process can significantly reduce the amount of space (in memory or on disk) required to represent the data.

For most types of data patterns for the fields of a tuple, the pattern is encoded as a pointer to a location where the actual pattern is stored. For example, a simple pattern "blue" for a field "color" may be stored as a pointer in the "color" field (or associated leaf in a tree) for the tuple, the pointer containing an memory address where the actual pattern "blue" is stored. Alternatively, it is also possible to directly encode a leaf pattern (i.e., a field value) rather than an address in the pointer. For example, if there are 5 values in a set of values for a field {0, 1, 3, 5, and 8}, the field value could be encoded into the pointer by storing the binary value of the field value instead of an address in the pointer. In this example, the pointer may contain the binary sequence "0000" for value (or pattern) 0, "0001" for value (or pattern) 1, "0011" for value (or pattern) 3, "0101" for value (or pattern) 5, and "1000" for value (or pattern) 8. The database system can, using some meta-data indicating the contents for a field, determine whether the pointer contains a field value or a memory address based on the pointer contents and can handle the different types of pointers separately. For example, in the case of an address, the database will map the field value to the memory address of the pattern. In the case of a field value, the database will map the field value to the contents of the pointer. In other words, the pointer is either interpreted as pointing to a memory address or it is interpreted as a value. Incorporating a mix in these two types of pointers may reduce the overall size of the database.

In a 32-bit computer system where the pointer contains an address referencing an integer data pattern (e.g., a leaf pattern or field value), a pointer requires 32-bits of information for the pointer (i.e., for the address) and an additional 32-bits to represent the pattern (e.g., the integer) referenced by the pointer. Using the above example where the field values 0, 1, 3, 5, and 8 are the leaf patterns being referenced, a total of 5 pointers (5*32-bits) addressing the 5 patterns (5*32-bits) requires a total of 320-bits to implement (i.e., 5 pointers*32-bits+5 values*32-bits=320-bits). However, encoding the pattern (in this example the field value) into the pointer itself adds an additional requirement for a 32-bit value to identify the data type of the field (e.g., pointer contains value not address) while combining the pointer and pattern (i.e., value) into the pointer resulting in only 192-bits to implement (i.e., 5 pointers*32-bits+32-bits for the field type=192-bits). Incorporating the pattern into the pointer itself reduces the memory or disk space required to represent the field from 320-bits to 192-bits in this simple and limited example. The potential space savings may be significantly greater where a greater number of patterns are referenced.

One problem that may arise in storing a pattern in a pointer rather than in using only addresses is the situation in which the pointer represents a NULL value. A NULL value is used by some database systems to indicate that no value has been entered in a particular field of a tuple. How the NULL value is represented or referenced by the pointer is generally handled according to two methods. First, the entire set of values that can be included in a 32-bit pointer include integers falling into the range of $-2^{31}$ to $2^{31}-1$. The NULL value may be represented by using a particular value to represent NULL (e.g., $-2^{31}$). The second method uses an additional bit (i.e., 33-bits) to represent $2^{32}$ integers and may allow for an extra NULL value or pattern. In the first case, one potential value is lost to the pointer, and in the second case an additional bit needs to be used resulting in an additional n bits of storage, where n represents the total number of fields.

According to one embodiment of the present invention, using the first value of the set of values for the pointer to represent NULL allows for NULL to be represented without sacrificing a value in a pointer or adding additional bits to the pointer. As previously discussed, pointers reference, through their addresses or pattern values, a set of values for the field. Including a NULL value as the first value in the set of values for the field allows for NULL to be represented with only 32-bits*f additional space required for this NULL value where f represents the total number of fields. This situation applies to both cases where the pointer contains an address and when the pointer contains a pattern or value directly. In the case of a pointer containing an address, the first value in the set of values referenced by the pointers for the field may be the NULL pattern or value. In the case of a pointer containing a value, the first value in the set of values contained by the pointer for the field may be the NULL pattern or value.

One example of a modified query engine in order to provide a select operation for including a NULL value and for allowing the use of patterns or values incorporated directly into the pointer is, according to one embodiment of the present invention, presented below.

```
select(f,v,r)=
    let d=dataSettingsFor(f) in
        if(v==NULL)
            return pointerFor(f,r)==d.startAddressOfSet
        else if (dataIsPointerFor(d))
            return pointerFor(f,r)==v
        else
            return valueAt(pointerFor(f,r))==v
```

In this example code, the select function for a field "f" of the database, a value of the field "v", and a reference to a stored pattern "r" is executed according to 3 cases. The appropriate case is determined by examining the data settings for the field "d" which may include the above described example use of an extra 32-bits to identify the type of data contained for the field (e.g., whether the pointer contains values or patterns instead of addresses). In the first case, we are testing if the field contains a NULL value (i.e., v=NULL). In this case, the pointer is set to the first address in the set of addresses or, in other words, the first value in the set of values for the field. In the second case, the pointer contains the value for the field and not a reference to a value. In the third case, the pointer contains a reference to a value in the set of values for the field. In this case, we test whether the data pointed to by the reference (i.e., address) is equal to the requested value.

Figure 9:
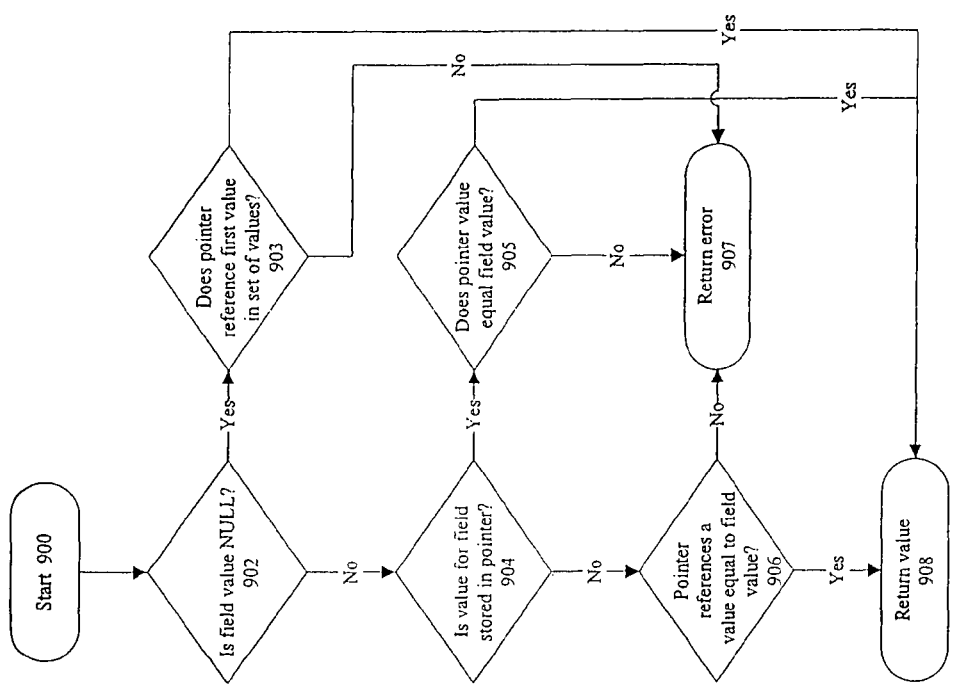
FIG. 9 is a flowchart illustrating the process of testing whether a field in a tuple is equal to a given value according to one embodiment of the present invention.

FIG. 9 is a flowchart illustrating the process of testing whether a field in a tuple is equal to a given value according to one embodiment of the present invention. According to this embodiment, a comparison is made between the original field value in the tuple of the table and the value generated for the pointer or referenced by the pointer as part of the process to use pointers to represent the fields of a tuple in a database table. The process begins 900 with one or more comparisons based on the field value being represented by the pointer. According to the embodiment depicted in FIG. 9, the first comparison 902 is a determination whether the field value being represented by the pointer is NULL. If the value is NULL, a second determination 903 is made to determine if the pointer references the first value in the set of values for the field. As previously discussed, the first value in the set of values for the field is used to represent the NULL value for the field. If the pointer does reference the first value in the set of values for the field, either the NULL value or other appropriate value may be returned 908 indicating that an appropriate pointer has been generated. If the pointer references another value or contains a different reference (i.e., address), an error value is returned 907 indicating that the pointer incorrectly reflects the value of the field. If the field value to be represented by the pointer is not NULL, the process further determines whether the pointer is storing the field value 904 rather than a reference (i.e., an address) to a value in the set of values. If the pointer is storing the field value instead of a reference, a determination is made as to whether the stored value in the pointer equals the field value 905. If the pointer value equals the field value, either the pointer value or other appropriate value is returned 908 indicating that an appropriate pointer has been generated. If the pointer value does not equal the field value, an error value is returned 907 indicating that the pointer incorrectly reflects the value of the field. If the pointer does not store the value of the field directly, a determination is made as to whether the value referenced by the pointer (i.e., the value at the address contained in the pointer) is equal to the field value 906. If the referenced value equals the field value, either the referenced value or other appropriate value is returned 908 indicating that an appropriate pointer has been generated. If the referenced value does not equal the field value, an error is returned 907 indicating that the pointer incorrectly reflects the value of the field. The process according to this embodiment not only outlines a procedure to check for the proper generation of a pointer for a field in a tuple of database table, it highlights the three main categories of values that a pointer may contain according to this embodiment: NULL value; directly containing a field value; and containing a reference or address to a field value.

Evaluating an Expression

Many database operations may be implemented using an expression rather than a particular value. For example, a sort operation, a search or query operation, and a count operation may be executed using an expression or function in addition to or instead of using a field or field value. Expressions are often used in database operations but are typically implemented in conventional database systems by computing the expression for each tuple of the table for the operation (e.g., a query operation). For example, if a query operation is executed looking for all tuples where age is greater that 21 years old, the age field of every tuple is examined to determine if the tuple matches the query requirements for an age greater than 21 years old. According to one embodiment of the present invention, the structure of a database and its component tables as described above allow expressions to be evaluated in a more efficient manner.

Figure 10A:
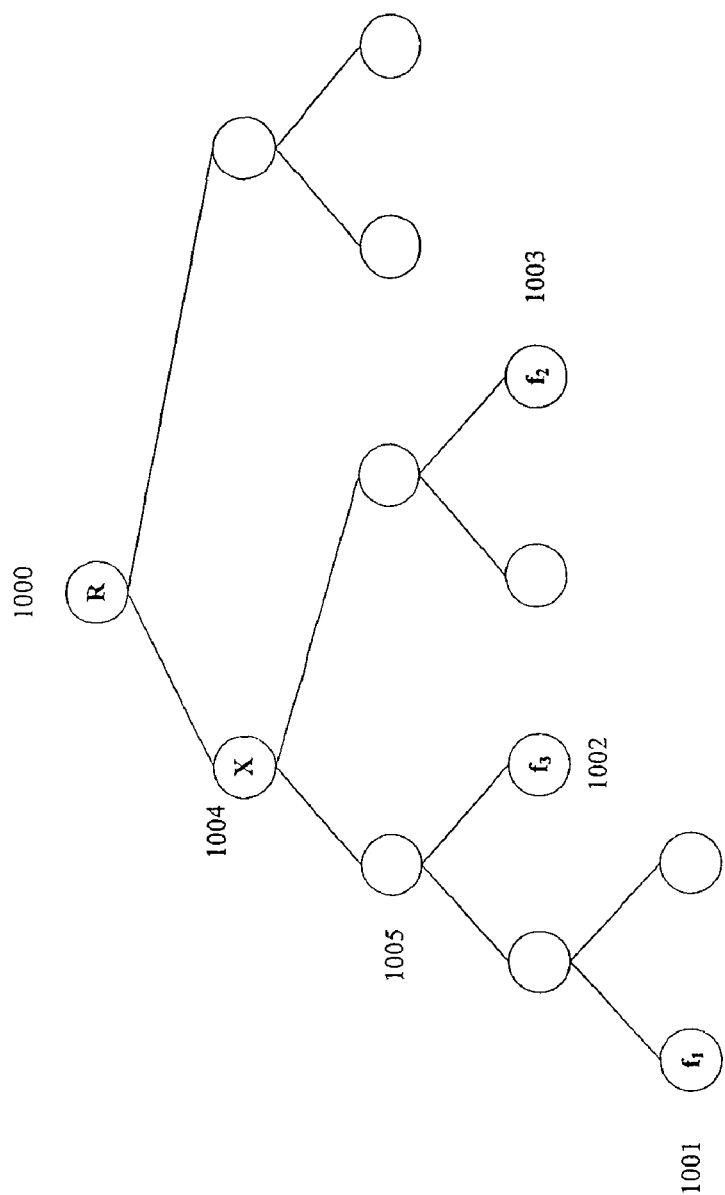
FIG. 10a is a diagram illustrating a binary tree representation of a table identifying a lowest-level common branch node for three leaf nodes (fields) according to one embodiment of the present invention.

The tree structure of a tuple according to the present invention may be used to implement an expression (i.e., a function). For example, if an expression uses three fields (leaf nodes) as arguments, the lowest level (i.e., closest to the leaf nodes and farthest away from the root node) common node for the three fields/leaf nodes in the tree structure may first be determined. FIG. 10a is a diagram illustrating a binary tree representation of a table identifying a lowest-level common branch node for three leaf nodes (fields) according to one embodiment of the present invention. If an expression (i.e., a function) uses three fields (e.g., $f_1$, $f_2$, and $f_3$) as arguments, the first common node is the lowest-level node where the paths (from the root node to the leaf node for the field) to the three fields join. The first field $f_1$ 1001, second field $f_2$ 1002, and third field $f_3$ 1003 are leaf nodes in the tree structure 1000 of the table. Even though, the paths to first two fields $f_1$ 1002, $f_2$ 1003 share a share or join at a common branch node 1005 early, a common branch node for all three fields is desired. The paths to the three fields 1001-1003 first join at node X 1004, which is the lowest-level node common to the paths for all three fields. This embodiment of the present invention for using expressions in database operations achieves the greatest efficiency gains over conventional database systems where the number of patterns stored for the first common branch node X 1004 is less than the number of tuples in the table.

Figure 10B:
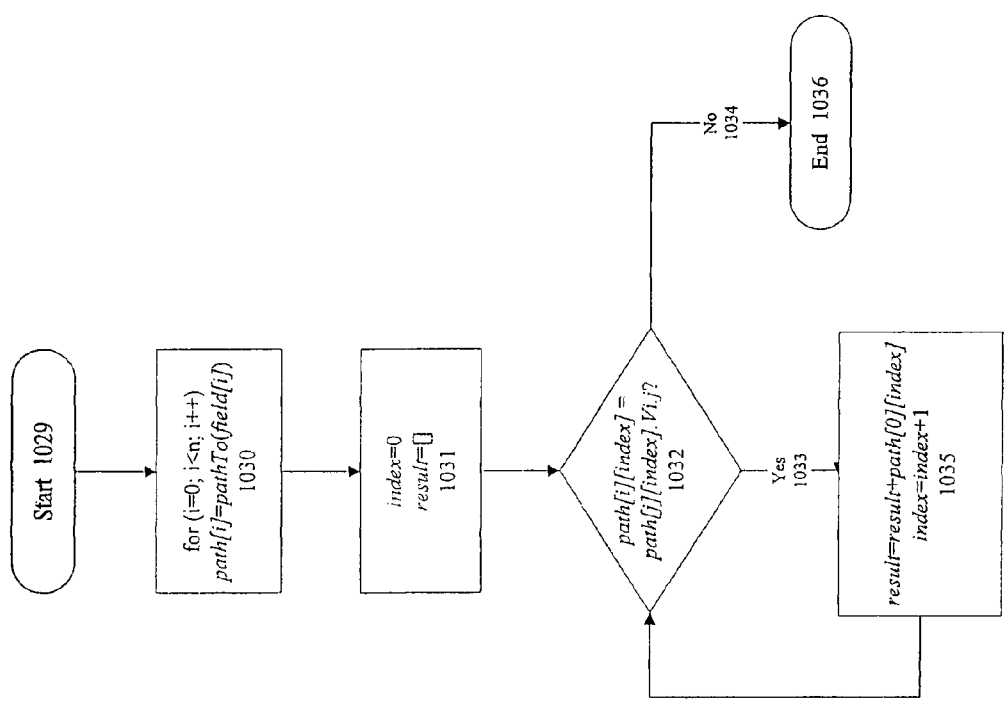
FIG. 10b is a flowchart illustrating the process used to determine the path the lowest-level common node for a set of leaf nodes or fields used in an expression according to one embodiment of the present invention.

A function may be used to determine the lowest-level common node for the set of fields used as arguments in the expression according to one embodiment of the present invention. FIG. 10b is a flowchart illustrating the process used to determine the path the lowest-level common node for a set of leaf nodes or fields used in an expression according to one embodiment of the present invention. The first step 1030 in the process is to retrieve the paths to the fields $f_1$ 1001, $f_2$ 1002, and $f_3$ 1003. Variables are next initialized 1031. A loop is then executed 1032 where each element of the path that is the same for all the paths 1033 is copied into the results 1035. As soon as a path element is encountered that is different among the three paths 1034, the processing ceases 1032 and the result is the path to the lowest-level common node. Once the path for the lowest-level common node X 1004 is determined, the expression can be evaluated for each unique pattern at the lowest-level common node according to one embodiment. The results may be stored with the pattern at the lowest-level common node where the expression value can be recalled by using the already determined path to the lowest-level common node.

Figure 10C:
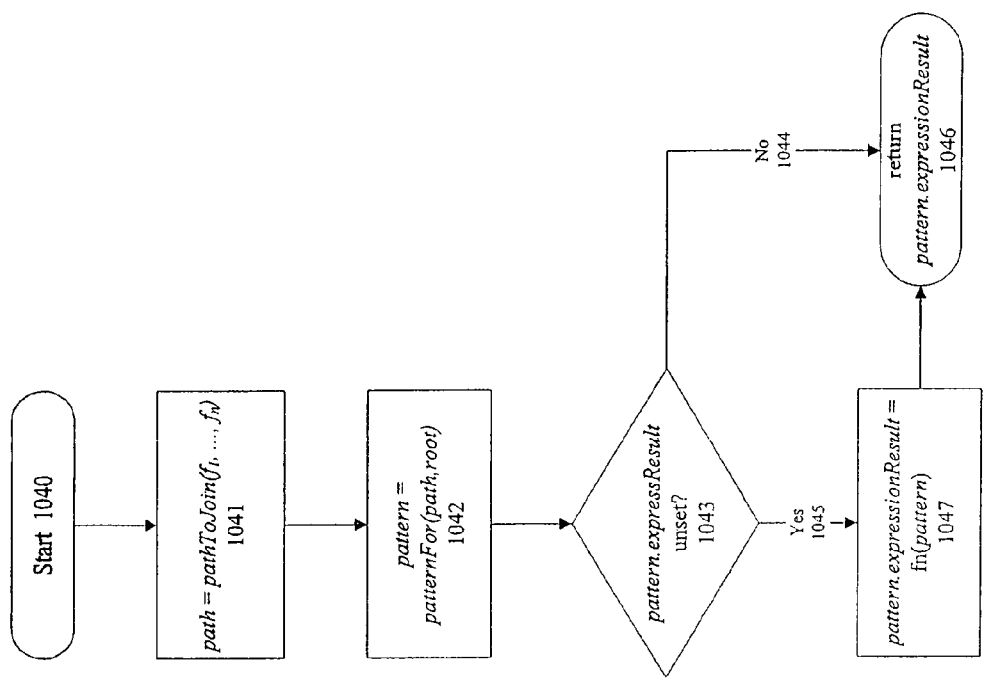
FIG. 10c is a flowchart illustrating the process for on demand evaluation of an expression according to one embodiment of the present invention.

In one embodiment of the present invention, the steps for computing the value of the expression and looking up the value using the path from the root node can be combined so that the expression value is calculated on demand. FIG. 10c is a flowchart illustrating the process for on demand evaluation of an expression according to one embodiment of the present invention. The first step 1041 in this process is determining the path the first node (i.e., the lowest level node) in the tree structure where the paths to all the fields used as arguments in the expression are joined (i.e., where they share a common node). The pattern for this first node is retrieved as the second step 1042 in the process. The third step 1043 in this process is determining whether an expression value has already been computed for the pattern. If a value for the expression has already been computed 1044, the expression value is returned 1046. If a value for the expression has not yet been computed 1045, a computation step 1047 is executed where the expression (i.e., the function) is executed using the field values and the resulting expression value is stored along with the pattern at that node and returned by the function. Storing the pattern at each node, in this embodiment, allows subsequent visits to the pattern at this first node of the tuple to retrieve and return the stored expression value 1046 rather than having the evaluate the expression again.

One benefit of this embodiment is that the expression is evaluated only at most M times where M is the number of unique patterns for the first node. The expression needs to be evaluated only once for each pattern (i.e., unique combination of fields) and, if a subset of the root set is being used, less than M evaluations need to be made. The performance characteristics for evaluating the expression from the root node of the tuple instead of implementing the embodiment above has a time required to evaluate any field used as an argument in the expression related to O(length(path(root,field))), where root is the root node for the tuple. Using the embodiment described above, the time required to evaluate any field used as an argument in the expression is related to O(length(path(X, field))), where X is the first node (lowest level node) where the paths of the fields used as arguments in the expression join (i.e., share a common node). If there are f fields used as arguments in the expression and n root set elements (i.e., tuples), the performance for evaluating the expression from the root node instead of implementing the embodiment described above is O(n*f*length(path(root,field))). The performance for evaluating the expression using the techniques of the embodiment described above is O(M*f*length(path(X, field))+n*length(path(root, X))), where the first half of the calculation is the determination of the evaluation value from the first node X and the second half is the determination of the path from the root node, root, to the first node X. If the evaluation value has already been determined and is stored with the pattern at the first node X as described above, the performance time is related to O(length(path(root, X))) which is the time taken to follow the path from the root node, root, to first node, X (i.e., the lowest level common node for the field arguments in the expression).

Derived Fields

A data set may be further augmented by adding additional fields that are calculated from other field values in the data set according to one embodiment of the present invention. In other words, a derived field is a new column or field in the data set for a table that did not appear in the original data set but was instead computed from the original data set. For example, a field "data of birth" may appear in the original data set for a table and may be used to calculate a derived field "age". Using a derived field may be particularly advantageous where the value in the derived field is often used for querying or sorting the data in the table. For example, if an age value is often used to query the table data or to sort on the table data, using a derived age field may improve the efficiency of the database system. A derived field value may be calculated at the time the data for a tuple is added or updated in a the table. For example if a new tuple for a person is added to a table, the derived age field value for the tuple is calculated using the data of birth field. If the data of birth field is NULL (i.e., there is no data in the field), the age field may also take a NULL value. Computing the derived field during the loading or updating of the data for a tuple according to one embodiment of the present invention may improve the performance of the derived field but results in an additional storage requirement for the derived field value. According to one embodiment of the present invention, only the unique values for the derived field along with the number of instances for the derived field pattern are stored in memory or on a storage device. The representation of the table may contain pointers to these values as it does for other field values. The overhead for implementing a derived field according to this embodiment is the additional storage required to store the unique patterns and number of instances as well as the pointers for each tuple. Though relatively efficient compared to conventional methods for using derived fields in a database management system, adding additional derived fields to a table or changing the definition of an existing derived field may still require a pass through the entire data set to generate the derived field values which, depending upon the circumstances, may result in an undesirable impact on the efficient operation of the database management system.

In another embodiment of the present invention, an expression (i.e., a function) is used to implement a derived field rather than calculating and storing a computed value. An expression is stored for the derived field and the expression is evaluated when the derived field is used rather than computing the value of the derived field earlier as in the previously discussed embodiment. The use of an expression reduces the amount of space in memory or on a storage device required to implement the derived field. In addition, the use of an expression allows derived fields to be added, modified, and removed in an easier manner generally using less resources than otherwise required. Also, the use of an expression for a derived field allows the derived field values to be dynamic in that they reflect the latest calculation rather than a previously made calculation. For example, a derived age field implemented as an expression results in a calculation made using the current date when the derived is used rather than an age determined the last time the tuple was added or modified or when the derived fields was added.

Implementing a derived field using an expression may only require the modification of the function that retrieves the value of the field according to one embodiment of the present invention. According to this embodiment of the present invention, the definition of a path may be expanded to include not only the previously described path to a node value but also a path may contain the details of an expression. For example if an expression is used to add a derived value to a table, a path may lead to the expression that can be evaluated when the derived value for a tuple is needed according to this embodiment. The expression for the added derived value may be stored along with the pattern data for the other fields of the table so that a function retrieving the value (e.g., a pathToField( ) function) may retrieve the expression. The valueOf( ) function retrieves the value (i.e., pattern) for a field f of a table t as previously described. According to this embodiment of the present invention, the valueOf( ) function is modified below to allow a determination if a path points to an expression or a value and, if it points to an expression, to evaluate the expression and return the results.

```
path=pathToField(f,t)
if (path.containsExpression( ))
    return evaluate(path.expression( ),root,t)
else
    return valueForPath(path,root,t)
```

As stated above, the path to a field f of a table t is first determined then evaluated according to the valueOf( ) function used in one embodiment of the present invention. If the path is to an expression, the expression is evaluated and the expression value is returned. If the path is not to an expression but to a field, the value of the field is retrieved. A path is retrieved as previously described but an additional test (the if statement) is added to determine if the path is for an expression. If the path is for an expression, the value for the derived field is computed using the expression otherwise the value of the field is retrieved for the path as previously described.

Root Indirection Set

Figure 10D:
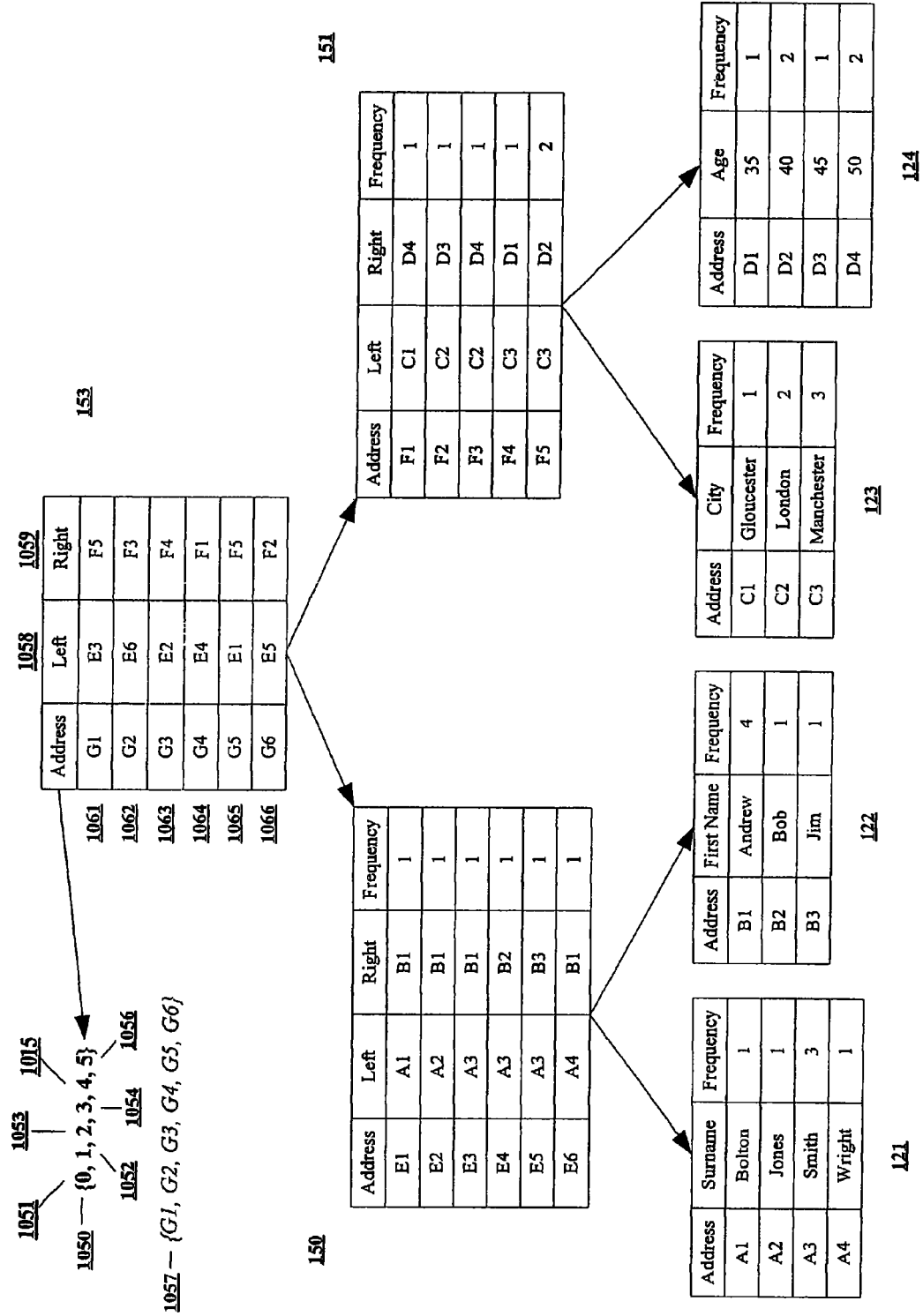
FIG. 10d is a diagram illustrating a root indirection set and how it relates to the pattern sets for the nodes in a tree structure of a table according to one embodiment of the present invention.

FIG. 10d is a diagram illustrating a root indirection set and how it relates to the pattern sets for the nodes in a tree structure of a table according to one embodiment of the present invention. In FIG. 10d, the binary tree structure for the data set of a table is represented at a root node 153 by pairs of pointer (one pointer for a left branch 1058 and one pointer for a right branch 1059) for each of the tuples in the table. Each pointer for a branch contains the address of either another pair of pointers for a subordinate branch node or it contains the address of a pattern (e.g., a data value) for a field in the tuple of the table (a leaf pattern in the tree). In the example shown in FIG. 10d, each of the pointers in the left branch 1058 of the root node 153 point to a pair of pointers in a subordinate branch node 150 and each of the pointers in the right branch 1059 of the root node 153 also point to a pair of pointers in another subordinate branch node 151. In turn, the pointers in the left and right branch of these two branch nodes 150, 151 point to leaf patterns (i.e., field values) at subordinate leaf nodes 121, 122, 123, 124 in the tree structure for the table. For the root node 153, a root indirection set may be generated to facilitate access to and/or processing of the tuples in the table—the root indirection set facilitates database operations on the table. A root indirection set 1050 is a list or set of pointers containing the addresses of the pointer pairs in the root node according to one embodiment of the present invention. In FIG. 10d, the root indirection set 1050 is shown as a set of pointers (an array of pointers) beginning with pointer 0 1051 and continuing until pointer 5 1056 with each pointer 1051-1056 corresponding to a to pair of pointers 1061-1066 in the root node 153 (a tuple in the table). The root indirection set 1057 is also alternatively shown with the corresponding addresses for the pointer pairs 1061-1066 in the root node 153 (the tuples) illustrating that the pointers contain addresses to the pointer pairs in the root node. In the example shown in FIG. 10d, the pointers 1051-1056 in the root indirection set 1050 are numbered beginning with 0 and continuing until n−1 where n is the number of tuples in the table (which correspond to pointer pairs 1061-1066 in the root node 153). In this embodiment, the pointers 1051-1056 in the root node are maintained in the same order as the pointer pairs 1061-1066 for the tuples in the root node 153 in order to preserve the existing tuple ordering. For example, the first pointer (pointer 0) 1051 in the root indirection set 153 contains the address G1 1061 of the first tuple (pointer pair) in the root node 153. Similarly, the second pointer (pointer 1) 1052 in the root indirection set 153 contains the address G2 1062 of the second tuple (pointer pair) in the root node 153, the third pointer (pointer 2) 1053 contains address G3 1063, the fourth pointer (pointer 3) 1054 contains address G4 1064, the fifth pointer (pointer 4) 1055 contains address G5 1065, and the sixth pointer (pointer 5) 1056 contains address G6 1066 according to this embodiment. A root indirection set may be used to allow faster manipulation of the tuples of a table when executing any number of database operations.

A root indirection set 1050 may exist for each table (root node set) in a database and additional root indirection sets may be used for specific operations as needed according to one embodiment of the present invention. For example, a primary or original root indirection set may exist for each table (root node set) to allow faster delete, insert, and update operations as discussed in the following sections. Additional root indirection sets may also be used for other operations such as sorting, partitioning, and joining as discussed later in this specification. According to this embodiment, the same root indirection set does not need to be used for all database operations (though they are based on the same data). In a sort operation as part of a database query, a copy of the root indirection set may be made and the order of the pointers in the root indirection set copy may be altered to produce the sorted tuple results without changing the underlying tuple order (and the original root indirection set). A query or search operation may also use a root indirection set that is a subset of all the tuples in the data set for the table. For example using FIG. 10d, a search or query operation may return the first, fourth, and fifth tuples of a table with a root indirection set of {0, 3, 4} containing pointers to the first 1061, fourth 1063, and fifth 1064 pointer pairs in the root node 153 corresponding to the tuples of the table.

Delete Operation

Using a primary root indirection set for a table, a tuple in the data set for a table may be in part deleted by removing the reference (i.e., the pointer) in the root indirection set addressing the tuple of the table. If a root indirection set is used to access the tuple data for the table, the absence of a pointer will eliminate accessing that particular tuple of the table. In one embodiment of the present invention, the pointer is replaced by an illegal value (i.e., a value that can't be used as a pointer) such as, for example, a negative value. A negative value may be used instead of eliminating the pointer altogether because it preserves the order of the tuples especially where the pointers to the patterns for the tuple may still exist at the nodes of the table. For example, a root indirection set containing 10 pointers to tuples in the data set for a table may be initially represented as follows:

{0, 1, 2, 3, 4, 5, 6, 7, 8, 9} (RIS1)

In the root indirection set above (RIS1), each pointer value represents the address in the root node for each tuple of the table—e.g., the address of the pair of pointers corresponding to the tuple in the root node for a binary tree representation of the table. If the fourth tuple of the table is deleted, according to this embodiment the fourth pointer (i.e., pointer value 3) is replaced with an illegal (e.g., negative) value resulting in the root indirection set containing the following new example values:

{0, 1, 2, −1, 4, 5, 6, 7, 8, 9} (RIS2)

Database operation algorithms using the root indirection set need to be properly structured in this embodiment to ignore illegal (e.g., negative) values when they occur. Therefore, when a database operation algorithm using the root indirection set encounters a negative value, that negative value is ignored as if it did not exist. For example, an algorithm processing the tuples of a table according to the modified root indirection set RIS2 above would ignore the −1 value.

In another alternative embodiment of the present invention, a deleted tuple may be reflected in the root indirection set by using a negative value of the actual pointer value (address). For example if a pointer has a value 3 (the 3 referring to a memory or storage address) addressing a tuple in the data set of a table, deleting the tuple may result in resetting the pointer value to −3 to reflect the deletion of the tuple. Using the original root indirection set RIS1 above as an example, deleting the fourth tuple of a table results in the root indirection set pointer value for the tuple (e.g., 3) being set to the negative of its value (i.e., −3). The resulting root indirection set is shown below.

{0, 1, 2, −3, 4, 5, 6, 7, 8, 9} (RIS3)

In this embodiment as in the previous embodiment, the value of the pointer for the deleted tuple is negative and it is still ignored by the database operation algorithms as discussed above. However, this alternative embodiment has the added benefit that the deletion of the tuple can be reversed or undone by taking the absolute value of the pointer. For example, the root indirection set RIS3 above reflects the deletion of a tuple (i.e., the fourth tuple) in a table. The deletion of this tuple can be reversed by taking the absolute value of the pointer value (e.g., the absolute value of −3) to restore the deleted tuple in the root indirection set. The resulting root indirection set is the original root indirection set RIS1. Though this example may simplify the contents of the pointer for explanation, the use of a negative or other inverse pointer value may be used to delete a pointer in a root indirection set in a manner to facilitating an option to undo the deletion.

The above embodiments have only dealt with the deletion of a tuple in the root indirection set. In addition, the deletion of a tuple needs to be reflected in the data set for the table. Traditionally, deleting a tuple of data resulted in the actual erasing or removing of the information from the table. According to one embodiment of the present invention, the tree structure representation of a table allows the actual data patterns to be stored separately from the table structure. According to this embodiment, a frequency indicating the number of times that a pattern (i.e., a value) occurs in the table is stored along with the pattern. As a result, deleting a tuple of a table necessitates updating the frequency associated with a pattern found in the tuple of the table. For example if a table contains information about an individual including the city in which they live, deleting a tuple requires decreasing the frequency for the associated city (e.g., London for the deleted tuple) by 1 to reflect the deletion of one instance of the pattern (e.g., London) in the table.

Updating the pattern frequencies for the data set of the table to reflect the deletion of a tuple can be achieved by traversing the tree representation of the deleted tuple decrementing the frequency for each occurrence of a pattern in the deleted tuple. This can be accomplished using any method of tree traversal that visits all the nodes in the tree representation of the tuple once (visiting a node more than once during the tree traversal may have an unintended consequence of decrementing the frequency by more than the one value in the deleted tuple). Tree traversals are conventionally well known and refer to the sequential processing of each node in a tree structure, which is inherently a non-sequential data structure. Traversal methods are characterized by the sequence in which the nodes of the tree are processed. Three common types of traversal for binary trees are pre-order, post-order and in-order traversal. A pre-order traversal method visits each node before any child nodes are visited. A post-order traversal method visits each node after all its child nodes have been visited. An in-order traversal method visits each node after visiting all its left-branch child nodes but before visiting any of its right-branch child nodes. According to one embodiment of the present invention, an in-order traversal method is used though the present invention may work with many other traversal methods.

The following algorithms for tree traversal assume that the structure of a node in a binary tree has a pattern (i.e., a value) and may have a left and right child node value. The following is an example of an in-order traversal function:

```
visit(node)
    if (node != NULL)
        visit(node.left)
        process node.pattern
        visit(node.right)
```

According to this above example in-order traversal function, each left child node is processed before the parent node and each right child node is processed after the parent node is processed. The following is an example of a pre-order traversal function:

```
visit(node)
    if (node != NULL)
        process node.pattern
        visit(node.left)
        visit(node.right)
```

The above pre-order traversal function visits and processes each node before any of its child nodes are processed. An example of a post-order traversal is as follows:

```
visit(node)
    if (node != NULL)
        visit(node.left)
        visit(node.right)
        process node.pattern
```

In the above post-order traversal function, all child nodes are processed before any parent nodes. As stated above, an in-order traversal of the tree structure for the table is used though other traversal functions may be used in other embodiments of the present invention. The following in-order function is used to decrement the frequency of the patterns for the deleted tuple in the data set of the table.

```
decrement_frequency(p) =
    if (p != NULL)
        decrement_frequency(p.left)
        p.frequency = p.frequency -1
        decrement_frequency(p.right)
```

The decrement_frequency( ) function operates recursively and begins by finding the lowest level left branching pattern (p.left) at a child node to process (as long as it is not NULL in value) and continues an in-order traversal of the tree. The processing done at each node for the pattern in the deleted tuple is simply to decrement the pattern frequency (p.frequency=p.frequency-1) to reflect the reduced frequency of the pattern due to the deletion of the tuple.

Figure 10E:
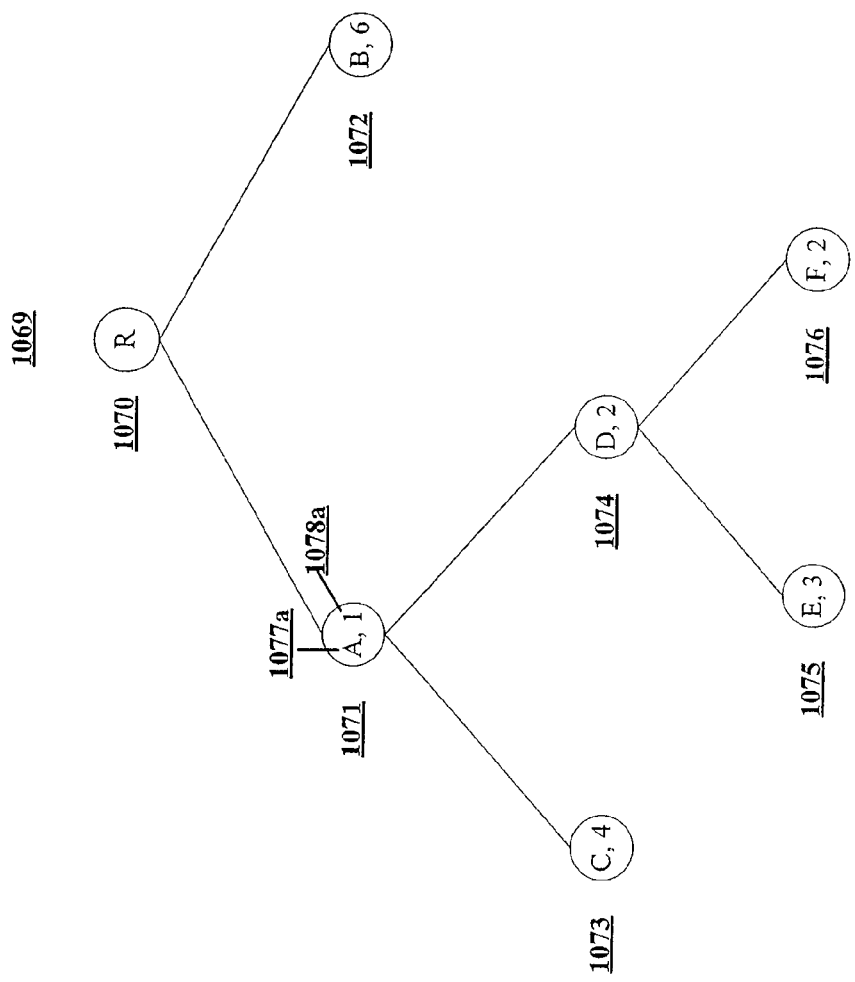
FIG. 10e is a diagram illustrating the tree structure of a tuple in the data set of a table and showing the pattern and its frequency at each node of the tuple according to one embodiment of the present invention.

FIG. 10*e* is a diagram illustrating the tree structure of a tuple in the data set of a table and showing the pattern and its frequency at each node of the tuple according to one embodiment of the present invention. The patterns shown are the patterns for the tuple at each node of the table. The data set for the table may have multiple patterns for each node. The frequency shown is the frequency of the pattern at that node in the overall data set for the table (the pattern occurs only once for the tuple shown). For example, at one branch node 1071 the pattern "A" 1077*a* occurs in the tuple 1069 and its frequency in the entire data set of the table is 1 1078*a* meaning it only occurs in this tuple 1069 of the table. The root node 1070 for the deleted tuple 1069 branches to two child nodes in the binary tree 1071, 1072 each containing a pattern for the tuple. The left child node 1071 is a branch node itself having one child leaf node 1073 and a second child branch node 1074, which in turn is made up of two leaf nodes 1075, 1076. The right child node 1072 of the root node 1070 is a leaf node (a terminal node containing a field value). At each node, the number of instances (the frequency) of each pattern in the table are shown along with the pattern for the tuple. For example, the pattern "A" 1077*a* at branch node 1071 has a frequency of 1 1078*a* indicating that the pattern occurs only once at that node in the table for this tuple. As the tree is traversed the frequency or number of instances for each pattern is decremented to reflect the deletion of the tuple. In the example above, the 1 instance 1078*a* of the pattern "A" 1077*a* at the branch node 1071 is reduced during the decrementing process to zero instances of the pattern. In a similar manner the frequency value or number of instances of all the patterns at each node in the tuple are reduced.

Figure 10F:
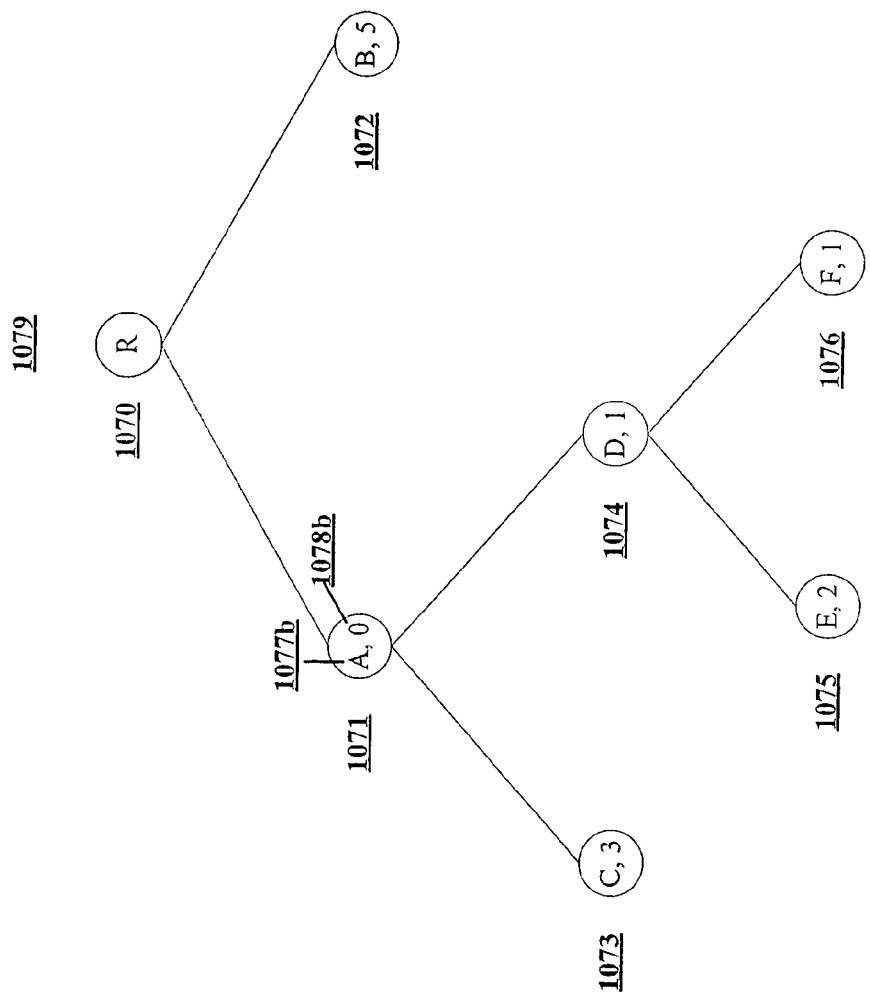
FIG. 10f is a diagram illustrating the tree structure of a tuple in the data set of a table showing the pattern for the deleted tuple and its frequency at each node after the tree has been traversed and the pattern frequencies decremented according to one embodiment of the present invention.

FIG. 10*f* is a diagram illustrating the tree structure of a tuple in the data set of a table showing the pattern for the deleted tuple and its frequency at each node after the tree has been traversed and the pattern frequencies decremented according to one embodiment of the present invention. The nodes are the same for all the tuples in the data set of the table only the pattern at each node may be different for each tuple. For this reason, the nodes shown in FIG. 10*f* match the nodes in FIG. 10*e* and include a root node 1070, three branch nodes 1071, 1072, 1074 and four leaf nodes 1073, 1075, 1076, 1072. The patterns at each of the nodes correspond to the patterns for the deleted tuple. The frequency for each pattern reflects the decrease of 1 instance or occurrence due to the tuple being deleted—every frequency value is one less in FIG. 10*f* than in FIG. 10*e*. For example at a branch node 1071, the frequency of the pattern "A" 1077*b* is reduced from its original value of 1 1078*a* to its new value of 0 1078*b* reflecting a decrease of one occurrence of the pattern due to the tuple being deleted. Though the process is straightforward a special situation may occur when decrementing the frequency results in a frequency value of zero as illustrated in the examples shown in FIGS. 10*e* and 10*f*.

When a pattern has a frequency of zero in the data set of a table, the pattern is not being used by any of the tuples in the table and, therefore, is not reachable through any of the pointer pairs in the root node. Additionally, a pattern having a frequency of zero indicates that all the patterns above it (patterns at parent and ancestor nodes) also have a frequency of zero. For this reason, a pattern with a frequency of zero can be removed from the pattern set for the node of the table. According to one embodiment of the present invention, a pattern with a frequency of zero is not removed because the adverse impact of the removal outweighs the minimal additional space (memory or storage) saved by no longer storing the pattern. In this embodiment when the data set of the table is first built (or it is optimized according to one embodiment of the present invention), a continuous area of memory or storage is allocated to the pattern set. As additional patterns are added to the pattern set for the node in the tree structure representation of the table, these additional patterns are stored in an overrun pattern set in memory or storage outside the originally allocated continuous pattern space. If a pattern is deleted from the continuous pattern space, the gap created in the continuous pattern space may need to be closed by moving other patterns within the continuous pattern space. This can be very computationally and resource expensive. Additionally, accessing and searching for patterns in the overrun pattern set is less efficient than accessing and searching for patterns in the continuous pattern space. Therefore, deleting a pattern from the continuous pattern space reduces the number of patterns that can be more efficiently accessed and searched. This presents no problems if the pattern is deleted but should the pattern be added back into the table at a future time, the overall performance of the database may be adversely impacted as the pattern will now be in the overrun pattern set rather than in the continuous pattern space. Also, a pattern once in the data set of a table is more likely to again recur at some future time. An insert or update operation adding a new pattern to the pattern set requires additional resources and time that can be avoided by leaving the pattern in the pattern set. The overhead for the pattern is generally very low and consists of the space (memory or storage) required for the pattern and an integer for its frequency. For these reasons, if a frequency of a pattern becomes zero as a result of a tuple being deleted from the data set of the table, the pattern is not deleted from the pattern set according to this embodiment of the present invention. In an alternative embodiment, the pattern may be deleted but the problems discussed above may occur.

Insert Operation

An insert operation allows a new tuple to be inserted into the tree representation for the table according to one embodiment of the present invention. The inserted tuple may be viewed as another set of patterns combined to form the tuple. If all the patterns in the inserted tuple already exist in the data set for the table, no additional patterns need to be added to the pattern set for a node. However if a new pattern is contained in the tuple, that new pattern needs to be added to the pattern set so that pointers in the tree structure representation of the tuple can refer to the pattern. In one embodiment of the present invention discussed above, the data set for the table is initially stored in one continuous block of memory. Additional patterns added later to this data set of patterns for the table may exceed the block of memory initially allocated to this continuous block of memory. Therefore, the additional patterns may be stored in an "overrun pattern set" or "overrun set". The dynamic nature of the data in a database makes it inefficient to try to determine and allocate sufficient continuous memory space for the patterns at each node (i.e., root, branch and leaf nodes) in the data set for the table. Therefore using an overrun set to handle the additional patterns inserted after the database is built (or alternatively optimized in another embodiment of the present invention) can solve this problem with little additional cost. The result for each node may be a pattern set consisting of two parts: an initial pattern set in a continuous block of memory generated when the database was built or later optimized; and a second overrun pattern set containing all the additionally inserted patterns after the database was last built or optimized. Using an overrun pattern set simplifies the insertion process while still retaining the benefits of the present invention as outlined herein but it may require more memory to store each pattern and may be slightly less efficient due to the use of non-continuous space to store the additional patterns. One possible implementation of an overrun set is a balanced binary tree of patterns.

One example of the use of an initial and an overrun pattern set for a leaf node (field) in a table using a balanced binary tree structure is illustrated in the following embodiment. If a field f contains integers, the initial pattern set (indicated in square brackets [ ]) may contain the following patterns (values):

[7, 11, 14, 18, 23, 26, 37]

As stated above, these patterns (integers) are stored in consecutive memory addresses. If the data can be updated (as is generally the case), an overrun pattern set is created to store any new patterns. Initially, the overrun pattern set (indicated in braces { }) for the node is empty with field f containing the following patterns:

[7, 11, 14, 18, 23, 26, 37] { }

A new tuple is added to the table. If the new tuple contains a value for f of "9", a determination is made that "9" is not in the original pattern set nor in the overrun pattern set so it must be added to the overrun pattern set. This results in field f now containing the following patterns:

[7, 11, 14, 18, 23, 26, 37] {9}

If another new tuple is added containing a valued for f of "5", a determination is again made as to whether the value "5" already exists in the original pattern set or in the overrun pattern set. In this case, "5" exists in neither set. This results in field f containing the following patterns:

[7, 11, 14, 18, 23, 26, 37] {5, 9}

The value "5" is placed before the "9" according to the balanced binary tree structure of the overrun pattern set. Eventually, field f may contain several additional (overrun) patterns as shown in the example below.

[7, 11, 14, 18, 23, 26, 37] {5, 9, 12, 24, 36}

A balanced binary tree pattern set may have an average search time of O(ln(|T|)) representing order of log of size T where T is the balanced binary tree. Other structures such as a hash table or other extensible data structure may be used for the pattern sets in other embodiments of the present invention.

Figure 10G:
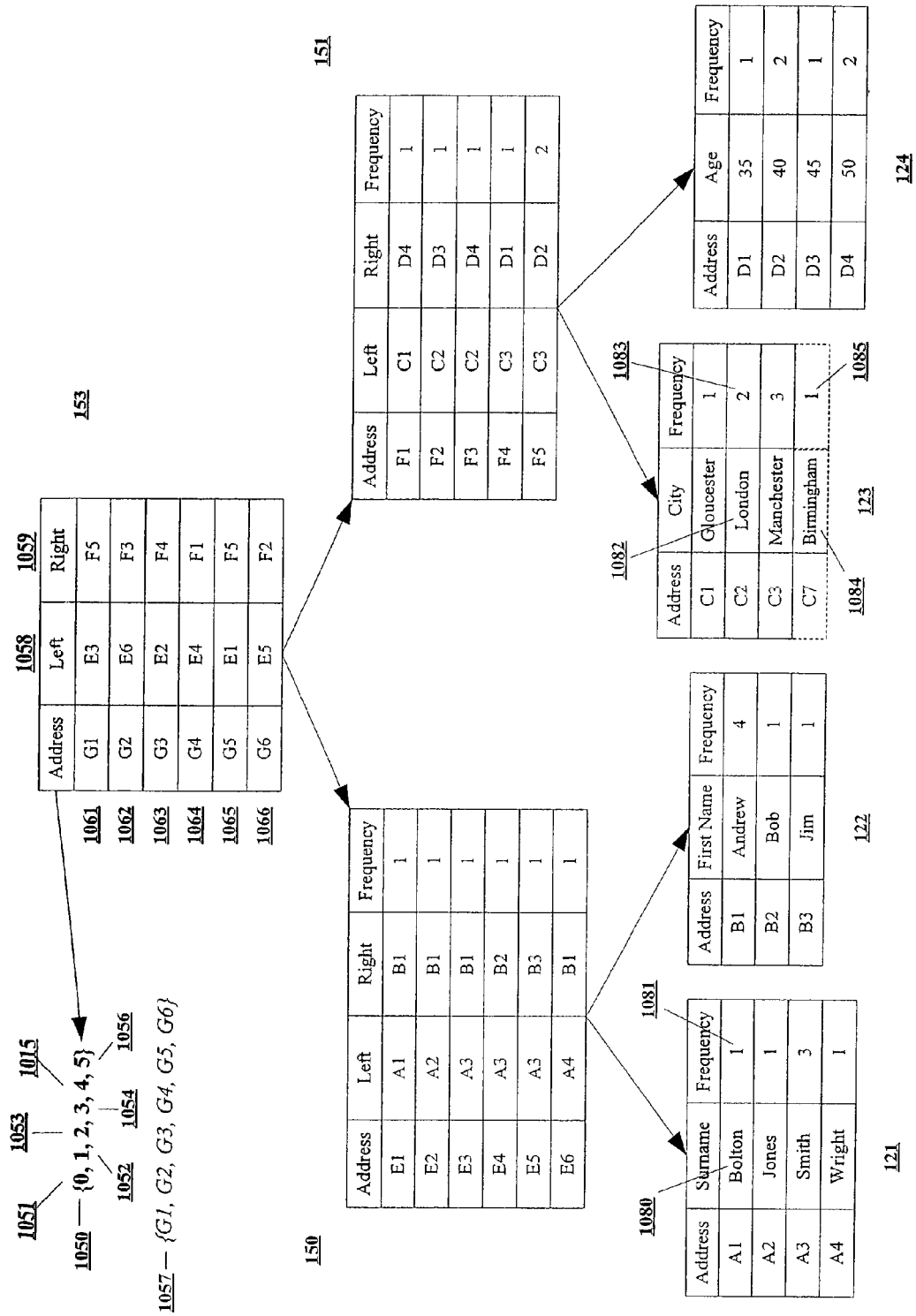
FIG. 10g is a diagram illustrating the pattern sets for each node of a table according to one embodiment of the present invention.

FIG. 10g is a diagram illustrating the pattern sets for each node of a table according to one embodiment of the present invention. The pattern set for the root node 153 is shown at the top of the tree structure for the table. Each pattern in the pattern set is identified by an address and consists of two pointers 1058, 1059: one each for the left 150 and right 151 subordinate child nodes in a binary tree structure. If there is no child node, a pointer may refer to a NULL value indicating that no subordinate child node exists for that branch in the tree. Unlike the subordinate nodes (i.e., the branch and leaf nodes), the root node 153 contains a pattern set for each tuple of the table and therefore neither needs nor contains a frequency for each pattern according to this embodiment of the present invention. In the branch nodes 150, 151, the pattern set is identified by an address and consists of two pointers for a left and a right subordinate node as well as a frequency indicating how many times the pattern (i.e., the combination of the left and right values) occurs at this node in the tree structure representation of the table. The two branch nodes 150, 151 in the FIG. 10g contain 6 and 5 patterns respectively. The leaf nodes 121-124 are terminal nodes in the tree structure representation of the table and, as such, the patterns at the leaf nodes do not point to other values but instead contain the actual field values for the data set of the table. These leaf node patterns are identified by an address and consist of a field value and a frequency indicating how many times the field value occurs in the data set of the table. For example, the pattern set for last names 121 contains the field value (pattern) "Bolton" 1080 which occurs once 1081 in the data set for the table—meaning that one tuple in the table contains a last name of "Bolton" 1081.

When a new tuple is inserted into the table, any new field values (patterns at the leaf nodes) must be added to the pattern set of the appropriate leaf nodes. For any existing field values (patterns at the leaf nodes) for new tuple, the frequency of the existing field value may be incremented to reflect the new occurrence (incidence) of the pattern in the table. For example, a new tuple inserted into the table may contain information for an individual living in "London" 1082 requiring the frequency for the pattern "London" 1082 in the city pattern set 123 to be incremented from 2 1083 to 3 to reflect the additional occurrence of the value in the tuples of the table. This is a simple operation for any existing patterns that are in the new tuple. However, a new tuple inserted into the table may contain information for a city not already in the pattern set (e.g., "Birmingham" 1084) requiring the new city pattern (e.g., "Birmingham" 1084) to be added to the city pattern set 123 with a frequency of 1 1085 for this one new occurrence of the value. As discussed above, a continuous block of memory may be allocated to the pattern set 123 when the table is built or when an optimization function is run reorganizing the data. Using a continuous block of memory may enhance the efficiency of the database. When an inserted tuple is added after the continuous block of memory has been allocated, the new patterns from the inserted tuple are added to the overrun pattern set for the node according to one embodiment of the present invention. Using the above example, the new city pattern "Birmingham" 1084 is then added to the overrun pattern set for the city leaf node 123. The use of a continuous block of memory or storage when a pattern is built or optimized is according to one embodiment of the present invention. Other than discussed herein, the use of a continuous block of space (memory or storage) for the pattern set has no other impact on these database operations, which can still function properly where other storage configurations for the pattern sets are used (e.g., all continuous or all non-continuous memory or storage space for the pattern sets). For example in an alternative embodiment of the present invention, pattern sets may be stored in a non-continuous manner making the entire pattern set function like the overrun pattern set. In this alternative embodiment, the performance of database operations on the pattern set may be less efficient than otherwise possible but the database operations function in the same manner as described herein.

Figure 10H:
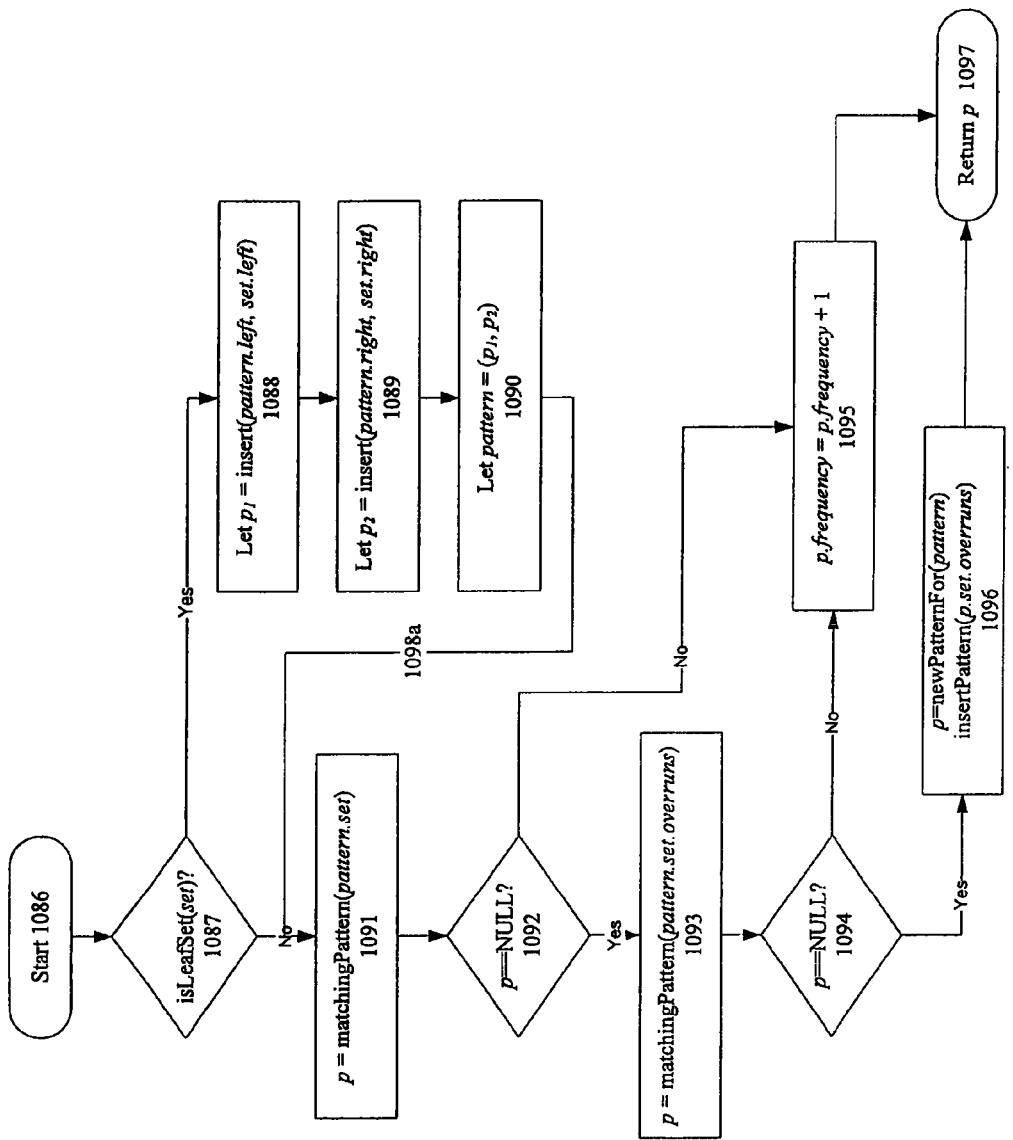
FIG. 10h is a flowchart illustrating the insert operation for a binary tree representation of the table according to one embodiment of the present invention.

When inserting a tuple into a table according to this embodiment, patterns need to be either added or updated (i.e., the frequency incremented) for all the nodes in the tree structure representation of the table for the inserted tuple. FIG. 10h is a flowchart illustrating the insert operation for a binary tree representation of the table according to one embodiment of the present invention. The process may begin examining the leaf node patterns first and then the branch node patterns in a recursive manner similar to how a data set for a table is initially built or how it may be optimized in an optimization function. If a pattern at a leaf node already exists, its frequency is incremented. If a pattern at a leaf node is new, the pattern is added to the overrun set with a frequency of one. A pattern for a branch node is examined in a similar manner by first determining if it already exists and, if so, incrementing its frequency. If a pattern does not already exist, it is added to the overrun set for the branch node with a frequency of one. For each pattern in the process, the process begins 1086 by first determining whether or not the pattern is for a leaf node or not. If the pattern is for a leaf node, a pointer is set 1091 to a matching pattern (i.e., a search is conducted for a matching pattern) in the initial pattern set (the pattern set in the continuous block of memory or storage) for the leaf node. If no matching pattern is found, the pointer has a NULL value otherwise it will contain the address of the pattern in the pattern set. For this reason, the value of the pointer is checked 1092. If the pointer value is not NULL, a matching pattern was found and the frequency for the pattern is incremented 1095 and the pointer is returned 1097. If the pointer value is NULL, the pointer is again set 1093 to a matching value (i.e., a search for the pattern is conducted) but this time in the overrun pattern set for the node. Another determination of the returned pointer value 1094 is made to determine if the pointer contains an address to a matching value in the overrun pattern set or if the returned pointer value is NULL. If a matching pattern is found in the overrun pattern set (i.e., the pointer value is not NULL), the frequency for the pattern is incremented 1095 and the pointer is returned 1097. If a matching pattern is not found in the overrun pattern set (i.e., the pointer value is NULL), the new pattern is added to the overrun pattern set 1096 with a frequency of 1 and the pointer is given the address of this new pattern. The pointer to this new pattern in the overrun pattern set is then returned 1097. If a pattern belongs to a branch node instead of leaf node 1087, a pointer is set 1088 to address the left branch child pattern. The recursive nature of the insert operation ensures that any child pattern is added to the appropriate pattern set and available to the branch node. A pointer is also set 1089 to address the right branch child pattern for the branch node. These two pointers (for the left branch and the right branch) are then used to determine the pattern 1090 for the branch node. After the pattern for the branch node is determined, the process executes 1098a in a similar manner as discussed above for the leaf node patterns with a search for a matching pattern conducted first in the initial pattern set 1091 and, if no match is found in the initial pattern set, in the overrun pattern set 1093 according to this embodiment of the present invention. The overrun pattern sets may be used for both branch and leaf nodes for the tree structure of the table according to this embodiment. The above examples illustrate how the leaf node (field) patterns are first examined in a recursive manner before branch node patterns are examined in order to ensure that underlying patterns are first addressed according to this embodiment. The process outlined above according to one embodiment of the present is for a binary tree representation of the table. Other storage or logical organization structures for the data in alternative embodiments of the present invention require appropriate modification to the process as outlined.

Figure 10I:
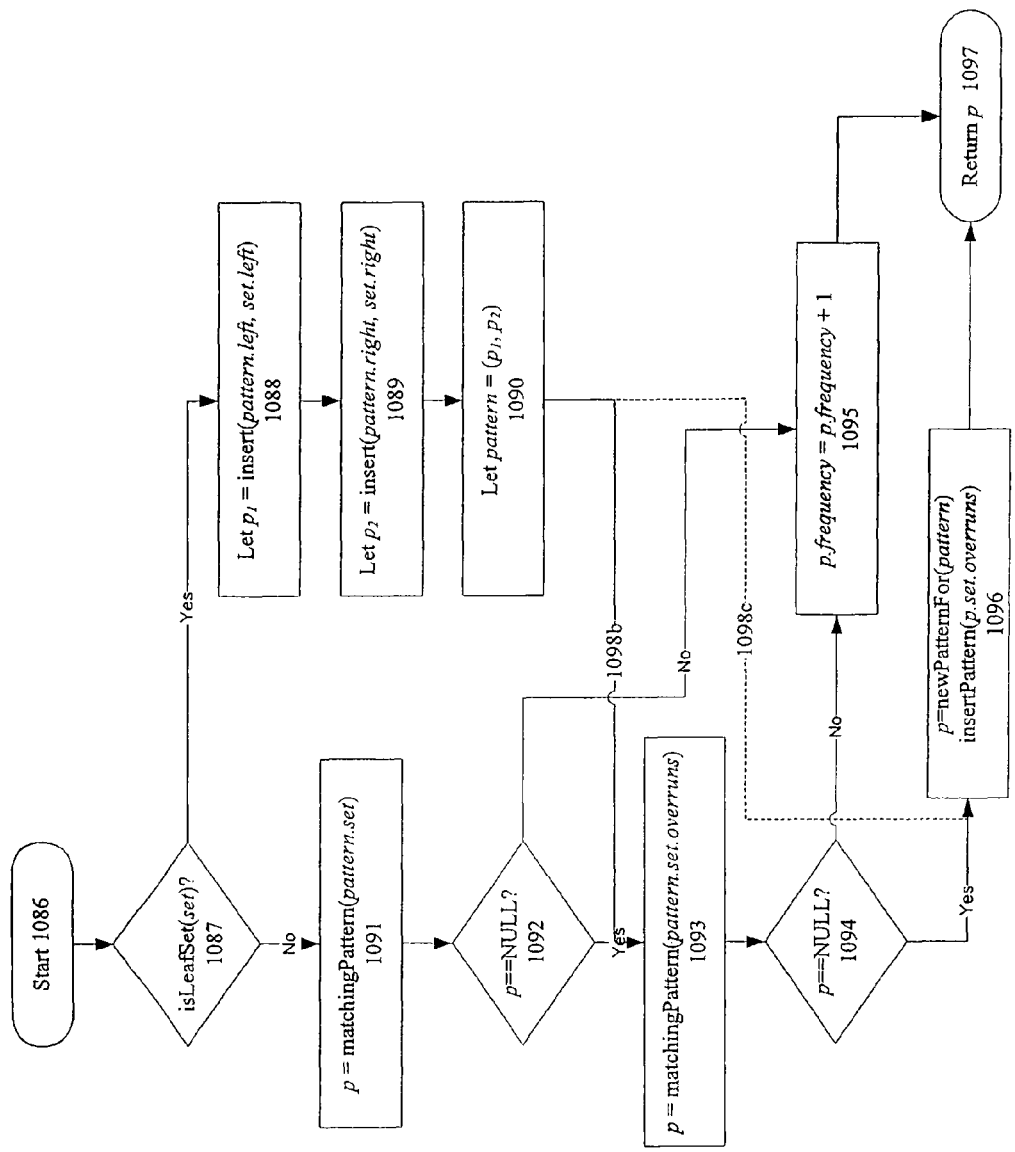
FIG. 10i is a flowchart illustrating a variation of the insert operation for a binary tree representation of the table according to one embodiment of the present invention.

A variation to the above insert process in one embodiment of the present invention may improve performance by omitting the determination of whether a branch pattern is new and assume that the branch pattern will always be new. Either the search for a matching pattern in the initial pattern set for the branch node may be omitted or both the search for a matching pattern in the initial pattern set and the overrun pattern may be omitted in alternate embodiments of this variation. FIG. 10i is a flowchart illustrating a variation of the insert operation for a binary tree representation of the table according to one embodiment of the present invention. According to this embodiment, the pattern for the branch node is determined as previously discussed 1088-1090, however, matching the pattern to the initial pattern set 1091 for the branch node does not occur and an assumption 1098b is made that the pattern is new regarding the initial pattern set. At this point, a search is made 1093 of the overrun pattern set for the branch node determining 1094 whether the pattern already exists in the overrun pattern set. If the pattern already exists, its frequency is updated 1095 and the pattern is returned 1097. If the pattern does not already exist, the new pattern is inserted 1096 into the overrun pattern set and the pattern is returned 1097 as previously discussed. In an alternative embodiment of this variation in addition to assuming that the pattern for the branch node is new in relation to the initial pattern set, an assumption 1098*c* is made that the pattern for the branch node is new for both the initial pattern set and the overrun pattern set. According to this variation, after the branch pattern is determined as previously discussed 1088-1090 the pattern is inserted into the overrun pattern set 1096. The difference between the embodiments shown in FIG. 10*i* and the embodiment shown in FIG. 10*h* is that after branch pattern is determined, the operation continues at a later step (shown by lines 1098*b* and 1098*c* in FIG. 10*i* versus line 1098*a* in FIG. 10*h*) in the flowchart. The method outlined in the first embodiment above in FIG. 10*i* skips the search of the base pattern set but still searches the overrun pattern set (shown by line 1098*b*). In an alternative embodiment of the present invention, the insertion operation may be further modified to skip this second search of the overrun pattern set and instead directly insert the pattern 1096 into the overrun pattern set (as shown by line 1098*c*). In this alternative embodiment, the operation for the branch node pattern continues at an even later step 1096 in the flowchart. In either variation, the insert operation is considerably quicker because it omits the search phase 1091, 1093 (either the first search phase or both search phases) considerably expediting the process. This is particularly relevant considering that the branch nodes may contain considerably more patterns that the subordinate leaf nodes. One disadvantage of these embodiments is that the improved performance is made at the expense of memory or storage resulting from the potential duplication of patterns that would otherwise be identified.

Implementing this embodiment incorporating a variation to the insert process may require additional changes that may result in reduced efficiencies and/or otherwise require alterations to other sections described herein. For example, using a balanced binary tree structure for the overrun set may no longer be possible if a pattern can be included multiple times in the overrun set—doing so runs counter to the definition of a balanced binary tree. In another example, the existing algorithms/functions may need to be modified to handle the occurrence of multiple identical patterns in the data set (pattern set) for a field (a leaf node).

The above embodiment variations become particularly advantageous with pattern sets having a high initial cardinality (i.e., where repeat patterns are uncommon or are less common). Conversely, the disadvantages become substantially greater in pattern sets expressing little initial cardinality. For this reason, an alternative embodiment of the present invention may incorporate a method for measuring the cardinality of a branch node with this cardinality value determining how an insert operation is executed on a pattern for a branch node. For example, an initial cardinality value may be used with the first embodiment variation above because it only skips the first initial pattern set. In this case, the variation skips the search of the initial pattern set for a node where the cardinality of the pattern set for the node exceeds a particular threshold. This cardinality may be determined when the initial pattern set is built and/or when it is updated during an optimization process. By determining the cardinality value during the initial build of the data set for the table or when an optimization process is run on the data set (updating the initial data set) the cardinality can readily be available and used to determine whether this embodiment variation is used to process a pattern for a branch node.

In addition to adding the new patterns in the inserted tuple to the patterns sets for each node in the tree structure representation of the table and incrementing the frequency for existing patterns in the inserted tuple, an insert operation also adds an entry to a root indirection set for the table according to one embodiment of the present invention. If a root indirection set is being used for the table, the inserted tuple is added using a pointer to the newly inserted root node for the tuple. Because the root indirection set maintains the order of the tuples in the table, the pointer to the newly inserted tuple is added to the end of the root indirection set according this embodiment. For example, the following root indirection set contains a set of pointers to root patterns for the tuples of a table:

{0, 1, 2, 3, 4, 5} (RIS 4)

Each pointer contains the address of the root node pattern of a tuple. Inserting a new tuple results in an additional pointer in the root indirection. According to the embodiment discussed above, the new pointer is appended at the end of the root indirection set resulting in a new root indirection set:

{0, 1, 2, 3, 4, 5, 6} (RIS 5)

The newly inserted tuple is identified by pointer 6 in the root indirection set above (RIS 5). In other embodiments of the present invention, the newly inserted tuple or pointer to the tuple may be placed elsewhere in the table and/or elsewhere in the root indirection set.

Update Operation

An update operation is another database operation that may be performed on the data set of a table using a root indirection set according to one embodiment of the present invention. During an update operation the contents of the data for a tuple of a table are modified. In addition to a possible modification in the root node, the actual data stored in the leaf nodes (the pattern sets) for a field in the binary tree representation of the table and intervening branch nodes may also need to be modified according to this embodiment. The possible implications of an update operation on the data set for the table (the tree representation) are further illustrated using the root indirection sets and figures discussed below.

Figure 10J:
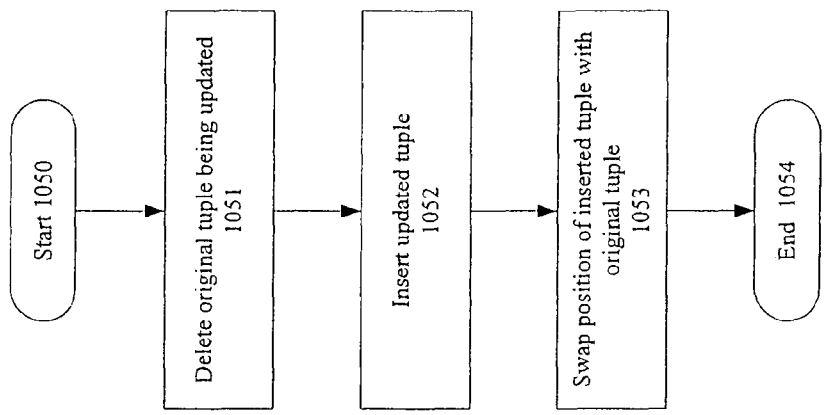
FIG. 10j is a flowchart illustrating the update operation according to one embodiment of the present invention.

An update operation may be implemented according to one embodiment of the present invention as a combination of a delete operation and an insert operation. FIG. 10*j* is a flowchart illustrating the update operation according to one embodiment of the present invention. The update begins 1050 by executing a first step 1051 wherein a tuple is deleted as previously discussed. Using a root indirection set example where the values in the set represent the pointers to the tuples (i.e., pointer pairs in the root node), an original root indirection set may contain ten entries:

{0, 1, 2, 3, 4, 5, 6, 7, 8, 9}

The deletion of a tuple (e.g., the fourth tuple identified by pointer 3) results in a negative value as previously discussed. For example in an embodiment where a simple negative value is used to indicate a deleted tuple, the original root indirection is modified to reflect the deletion as follows:

{0, 1, 2, −1, 4, 5, 6, 7, 8, 9}

The second step 1052 in the update operation according to this embodiment is the insertion of the updated record as discussed above (an insert operation). As previously discussed, an inserted tuple may be appended to the root indirection set. According to this embodiment, the root indirection set reflecting the deletion above is then appended to reflect the inserted and updated tuple as follows:

{0, 1, 2, −1, 4, 5, 6, 7, 8, 9, 10}

The third step 1053 is restoring the order of the tuples to reflect the update. To restore the order of the tuples, the newly inserted tuple needs to be moved to (swapped with) the position of the deleted tuple in the root indirection set. This may be accomplished by simply swapping the pointers to the deleted tuple with the pointer to the inserted tuple resulting in the following root indirection set:

{0, 1, 2, 10, 4, 5, 6, 7, 8, 9, −1}

The result is the inserted and updated tuple is in the same order as the original deleted tuple. The above embodiment accomplishes an update operation by deleting and inserting a tuple. The order given above is only one possible example and the order between inserting the updated tuple and the deletion operation on the original tuple may be switched in another embodiment of the present invention.

Sorting

According to one embodiment of the present invention, the process for building the example database identifies patterns in the data sets and replaces the patterns in the tables of the example database with pointers to the pattern stored elsewhere in memory or on a storage device. In this manner, the size of a table is greatly reduced resulting in something similar to a three-dimensional array of pointers, which can be rapidly sorted. For example, the computational complexity of conventional sorting algorithms determines their execution time. Some conventional sorting algorithms have an average execution time to sort a conventional data set of size n that is proportional to O(n log(n)). These conventional sorting algorithms may include traditional binary tree sorting, heap sorting (i.e., heap sorts), and merge sorting to name a few. Other conventional sorting algorithms may be less efficient with an average execution time $O(n^2)$. An example of this type of sorting algorithm is traditional bubble sorting. Conventional techniques exist to improve the performance of sorting algorithms by using key comparisons with average sort execution times proportional to O(n log(k)), where k is the size of the key space. According to one embodiment of the present invention, a majority of sorting operations can be reduced to an average execution time proportional to O(n) with only a few circumstances requiring average execution times proportional to O(n log(n)). This improvement in sorting execution times are partially a result of the representation of the data set using pointers as described in the following embodiments rather than the traditional database representation storing actual patterns. In addition, this improvement is also due to maintaining the data in the database in a sorted ordered by pattern that, as discussed later, can greatly reduce sort operation execution times according to one embodiment of the present invention. One embodiment of the sorting operation is discussed in greater detail in the following section.

As discussed above in the pattern recognition section, the identification of patterns in the data set results in a pointer being stored for each pattern according to one embodiment of the present invention—the pointer pointing to the pattern and the number of instances of the pattern in the table. According to this embodiment, each pattern in a tuple or row of a table is replaced by a pointer pointing to the pattern and the number of instances of the pattern in the table. The pointers point to a condensed listing of the unique patterns and instances (i.e., the pattern frequency) with duplicate patterns normally found in the table removed.

FIG. 11a is diagram illustrating the patterns and number of instances for each pattern that are stored in memory or on a storage device and referenced by pointers in the representation of the table for the data set according to one embodiment of the present invention. A first column 1101 in FIG. 11a lists the patterns that exist in the manufacturer field 1102 of the table in this example data set. As previously discussed, the patterns for a single field equal the values of that field while patterns spanning multiple fields equal a grouping of the appropriate values from the appropriate fields of the table according to this embodiment. In the example shown in FIG. 11a, the manufacturer field 1102 contains 5 different patterns (in this case field values): "Mfg A" 1103, "Mfg B" 1104, "Mfg C" 1105, "Mfg D" 1106, and "Mfg E" 1107. Each of the patterns in the manufacturer field 1102 is listed along with number of times the pattern occurs 1112 in the data set for the table—the number of instances of the pattern in the data set. The number of pattern instances 1111 for each pattern in the manufacturer field 1102 is shown. For example, the pattern "Mfg A" 1103 occurs 147 times 1113 (i.e., there are 147 instances of the pattern "Mfg A" in the data set for the table). In other words, for the field "manufacturer" 1102 in a table, the value "Mfg A" occurs in 147 tuples or rows of the table. The instances of the other patterns are as follows: "Mfg B" 1104 occurs 135 times 1114; "Mfg C" 1105 occurs 237 times 1115; "Mfg D" 1106 occurs 223 times 1116; and "Mfg E" 1107 occurs 258 times 1117. A total number of pattern instances 1118, which equals the number of tuples or rows for the table, is also shown in FIG. 11a even though this information is not stored in memory or on a storage device in this embodiment of the present invention. In an alternative embodiment, a total of the instances 1118 may be stored for each set of patterns. The 1000 total instances of all the patterns 1118 is the sum of the instances for each pattern and represents the total number of tuples or rows for the table.

FIG. 11a is illustrative of the use of pointers for each pattern in a tuple or row of the table according to one embodiment of the present invention. Instead of a pattern for the manufacturer field 1102 being stored repeatedly for each row, it is stored only once with many pointers to the pattern. As previously stated, pointers are typically smaller in size than the patterns and this may result in a considerable reduction in the amount of memory or storage space required to represent the pattern in a table. According to this embodiment of the present invention, a number of instances of the pattern in the table is also stored along with the pattern and is referenced in the same manner as the pattern. In the example in FIG. 9a, 1000 pointers are used in the tuples or rows of the table to reference the patterns in the manufacturer data set as indicated by the total number of pattern instances 1118 for the table.

Figure 12A:
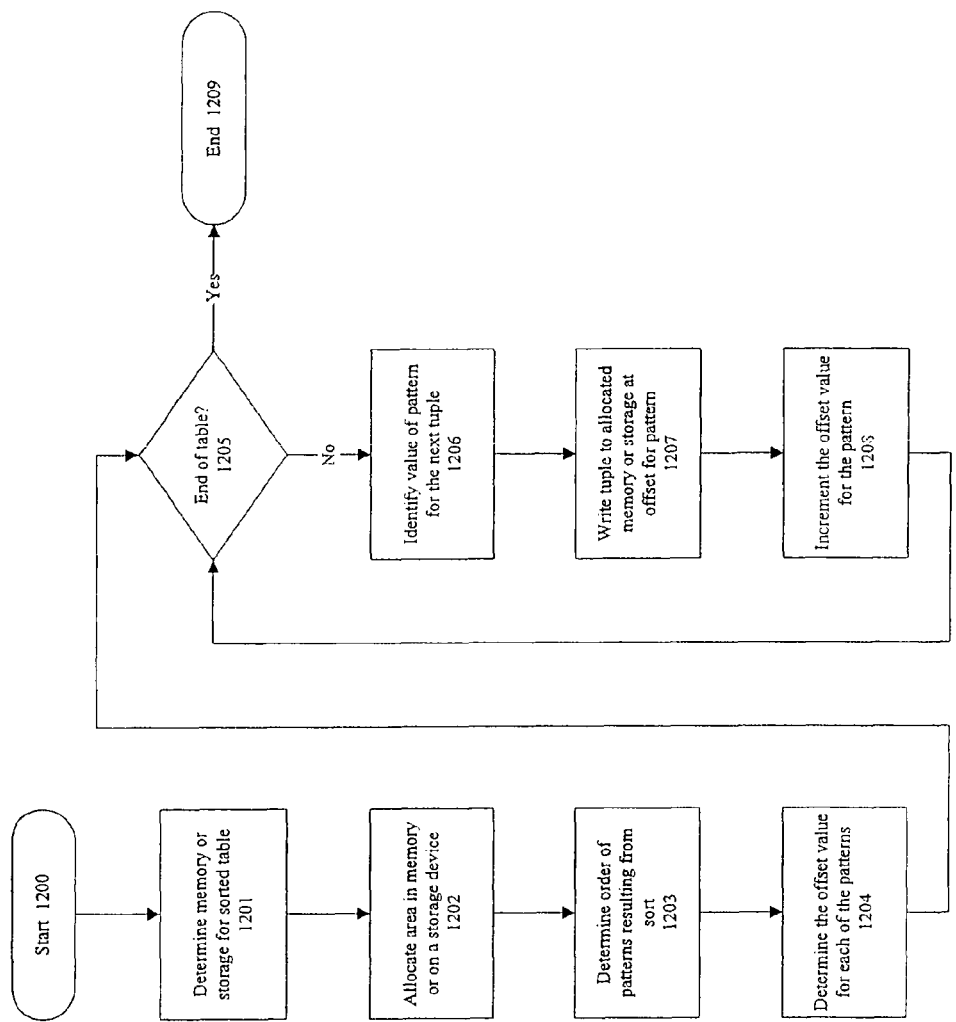
FIG. 12a is a flowchart illustrating the overall sorting process according to one embodiment of the present invention.

FIG. 12a is a flowchart illustrating the overall sorting process according to one embodiment of the present invention. According to this embodiment of the present invention, the sorting process begins 1200 by using the number of instances determined for each pattern in the table to determine the total amount of memory or storage required for the resulting sorted table as the first step in the overall sorting process 1201. The total amount of memory or storage required is calculated by determining the number of pointers representing each tuple of the table, the size of the pointers (e.g., 32-bit pointers in a 32-bit memory addressing system), and the number of tuples in the table (i.e., the total number of instances for each pattern in the table. In the example depicted in FIG. 9a, each pattern in the data set for the field (e.g., the manufacturer field) is referenced by a pointer in at least one tuple of the table where the field contains the data set pattern. The total number of instances 1118 for all the patterns is equal to the total number of tuples in the table—in this example, 1000. If more than one field exists for each tuple, the total number of tuples for the table remains the same but the amount of memory or storage space increases by the amount of additional pointers required for each tuple. An area in memory or storage is then allocated 1202 for the sorted table (i.e., the table resulting from the sort). The third step 1203 is to determine the order of the patterns in the sorted table (i.e., the table after the sorting occurs) which is then followed by determining the resulting offset values 1204 for the patterns. The offset values are determined using the sorted order of the patterns 1203 and the number of instances of each pattern to determine the offset from the start of the allocated memory. For example, using the patterns and number of instances provided in the example in FIG. 11a, sorting the rows into reverse alphabetical order based on manufacturer results in "Mfg E" 1107 being the first pattern in the sorted list. FIG. 11b is a diagram illustrating the offset values for a table sorted in reverse alphabetical order by manufacturer according to one embodiment of the present invention. Since "Mfg E" 1157 is the first pattern in the sorted table, there is no offset (i.e., the offset is equal to 0) 1177 for the "Mfg E" patterns which begin at the start of the allocated memory or storage space. "Mfg D" 1156 is the second pattern in the sorted order and, therefore, the offset for the "Mfg D" patterns begins at offset position 258 1176 reflecting the 258 tuples that contain "Mfg E" 1167 (at offsets 0-257) that precede it. Each offset is the position in the allocated memory or storage where the first (or next) element in the sort group will be stored. The offsets for the other patterns are similarly determined with the offset for "Mfg C" 1155 beginning at 481 1175 (reflecting the 258 tuples containing "Mfg E" 1167 at offsets 0-257 followed by the 223 tuples containing "Mfg D" 1166 at offsets 258-480), the offset for "Mfg B" 1154 beginning at 718 1174, and the offset for "Mfg A" 1153 beginning at 853 1173.

After determining the initial offset values for the patterns 1204, the sorting process continues by examining each tuple of the existing table in order to generate the sorted table. The first step in this sub-process for each tuple 1205 is a determination whether the end of the table has been reached. If not, the value of the pattern for the next tuple is identified 1206. Using the offset for the pattern determined earlier 1204, the tuple is written to the new sorted table in the allocated memory or storage at the offset value for the pattern 1207. The offset value for the pattern is then incremented 1208 and the determination of whether the end of the table has been reached 1205 is again made. On reaching the end of the table 1205, the sorting process may terminate 1209 at which time the table will be sorted in the allocated memory or storage.

Figure 12B:
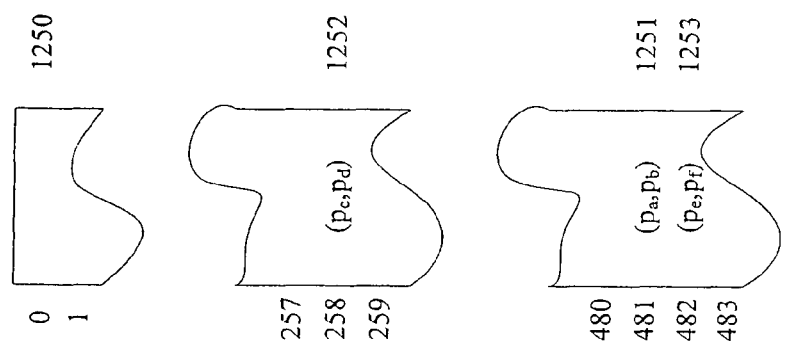
FIG. 12b is a diagram illustrating a further example of the sorting process according to one embodiment of the present invention.

The sorting process embodiment can be further illustrated showing an example of the use of offset values to the memory or storage areas for the sorted table. FIG. 12b is a diagram illustrating a further example of the sorting process according to one embodiment of the present invention. FIG. 12b illustrates the areas in the memory or storage for each tuple of the table sorted in reverse alphabetical order as previously described. The numbers refer to the offset value in the allocated memory or storage and include enough memory or storage to contain a tuple worth of data for the table. Offset 0 1250 is the first position or beginning of the memory or storage space used for the sorted table data. During the sorting process, if the first tuple of the table is represented by a pair of pointers ($p_a$, $p_b$) (which as previously described point to other pointers and eventually to the leaf sets or field values) eventually referencing a pattern "Mfg C" 1155 and a number of instances 237 1165 (e.g., $p_a$→"Mfg C" eventually) then this first tuple is stored at offset 481 1251 (the offset value identified for the "Mfg C" pattern) in the allocated memory or storage and the offset for the "Mfg C" pattern is incremented to 482. If the second tuple of the table is represented by a pair of pointers ($p_c$, $p_d$) eventually referencing a pattern "Mfg D" 1156 and a number of instances 223 1166 (e.g., $p_e$→"Mfg D" eventually) then this second tuple is stored at offset 258 1252 (the offset value identified for the "Mfg D" pattern) in the allocated memory or storage and the offset for the "Mfg D" pattern is incremented to 259. If the next tuple of the table is represented by a pair of pointers ($p_e$, $p_f$) eventually referencing a pattern "Mfg C" 1155 and a number of instances 237 1165 (e.g., $p_e$→"Mfg C" eventually) then this next tuple is stored at offset 482 1253 (the previously incremented offset for the "Mfg C" pattern) in the allocated memory or storage and the offset for the "Mfg C" pattern is incremented to 483. FIG. 12b illustrates the sorting of only three tuples from the original representation of the table into the new sorted representation of the table. The remaining offset positions in the allocated memory or storage for the sorted table remain empty and will eventually be filled as the sorting process continues to examine each of the tuples of the table. At the conclusion of the sorting process, all 1000 tuples of the example table are sorted into the allocated memory or storage using the offset values according to one embodiment of the present invention.

The sub-process 1205-1208 that executes for each tuple of the table as part of the overall sorting process performs the calculations for executing the sorting process as outlined in FIGS. 12a and 12b above. According to one embodiment of the present invention, the following offset process illustrates some of the calculations that are performed as part of this sub-process.

```
total=0
fieldSet = fieldSetFor(f,t)
for (i=0; i<fieldSet.length; i++)
    fieldSet[i].offset = total
    total = total + fieldSet[i].length
result = new int[t.rootSet.length]
for (i=0; i<result.length; i++)
    f = valueFor(f,t.rootSet[i])
    result[f.offset] = i
    f.offset = f.offset + 1
```

The above offset process performs a single pass through the pattern set (e.g., as shown in FIG. 9a) to compute the initial offset values for each pattern. The fieldSet[i].offset stores the offset value for each pattern beginning with the first pattern. For the first pattern, the value of the total variable equals 0 and is used for the first offset value. The fieldSet[i].length value is the number of instances of the pattern and is added to the total variable to generate the next offset value. By the completion of this pass through the patterns (the first loop), each pattern will have an offset value. The second loop represents a single pass through all the tuples of the original pre-sorted table (the root table)—t.rootSet. The variable result.length represents the number of tuples in the table. For each tuple, the pattern stored in the sorted table f is set to the pattern in the original table valueFor(f,t.rootSet[i]).

The above offset process is used during the sorting process according to one embodiment of the present invention. The sorting process rearranges the tuple data in the memory or storage allocation for the sorted table to sequentially place patterns in sort order according to the sorting pattern value and by instance. In another embodiment of the present invention, an alternative process to determine the offset may be used.

The offset process shown above involves a single pass through the set of patterns for the table to compute the initial offset values and then a single pass through the set of tuples in the original or root table to sort the tuples. The time to compute the sort is proportional to O(m+n) where m is the number of patterns (the first pass or loop in the offset process) and n is the number of tuples in the table (the second pass or loop in the offset process). The upper bound of the time to compute the sort is proportional to O(n) because m<=n where n dominates this computation.

As previously discussed, the patterns are structured as a tree in the representation of the table, therefore the time required for the sort operation may be determined not by n (the number of tuples in the table) but by f the number of fields in each tuple. Where a table contains only a single field, performance remains proportional to n as previously discussed because f is one. However, if a table contains multiple fields, the performance of the sort operation may be considered proportional to log(f). The above example performance calculations for one embodiment of the present invention reflect the utility and efficiency of the embodiment as compared to conventionally known sorting techniques. The sorting operation in this embodiment may include other efficiency in consideration of the use of pointers rather than actual table data and through the use of the offset values during the sorting process.

In an alternative embodiment of the present invention, the offset values may be stored along with the patterns and number of instances in memory or storage instead of calculating them during the sort operation. An example of this embodiment is reflected in FIG. 11b where the pattern (for manufacturer), number of instances of the pattern in the table, and the offset value of the first instance of the pattern are specified. For each field in a tuple of the table, the pointers allow not only the pattern to be retrieved but also the offset value. Therefore, the offset value is readily available. As previously discussed, to sort a table according to a single field requires time proportional to n, the number of tuples in the table. By storing the offset value, the first loop in the offset process that examines each of the patterns can be eliminated where the sorting process uses the default order of the filed. This reduces any influence of m on the execution time of the sorting process in some sorting cases.

According to one embodiment as previously discussed, the sorting process generates a new sorted table in memory or storage containing n pairs of pointers (one pair for each tuple storing the root node pattern) and therefore requires 2nP bits to store, where P is the number of bits per pointer (typically 32 or 64) representing the typically addressing size of the computer system. The pairs of pointers in the sorted table are identical to the pairs of pointers in the original, root table but are only in a different order. The sorting operation does not alter the pair of pointers only their order in the table. Therefore, instead of generating a sorted table containing n rows of the pointer pairs, a single pointer to a tuple in the root table could be stored in sorted order instead according to another embodiment of the present invention. Instead of the sort operation generating a new sorted table, a root indirection set (i.e., a sorted set of pointers to the tuples in the root or original table) could be generated instead. The root indirect set uses just nP bits because only one pointer is stored for each tuple in the table. Therefore, using a root indirection set according to this embodiment may use half the memory to perform the sort operation for a table with a single field.

Combining a selection or query operation on one particular field along with a sort operation on the same or other field presents additional challenges above those discussed for the previous embodiments of the sort operation. A selection or query operation is the identification of a subset of the data in the table. For example, if a table contains information about automobiles and one particular field is the age in years of the car, a selection or query specifying SELECT WHERE age <5 may result in only those tuples of the table for which the age field value is less than 5. Selection or query operations are common when using databases. In conjunction with a selection or query operation, a specification is often made regarding the order in which to present the selection or query results. Specifying the order of the results is a sort operation combined with the selection or query operation. Under these circumstances, not all of the tuples of the table are of interest and, therefore, the offset values are no longer relevant as the results will generally not include every tuple of the table. One solution (embodiment) to handle this situation may include recalculating the number of instances of the patterns for the subset of data returned by the selection or query operation and the new associated offset values. However, the recalculation of the number of instances of the pattern for the subset is time consuming and results in values that are only valid for that selection or query operation. In another solution according to one embodiment of the present invention, the sorting process is conducted as previously described with the addition of two new steps: a selection or query matching operation and the removal of gaps in the resulting sorted table or root indirection set.

Figure 13A:
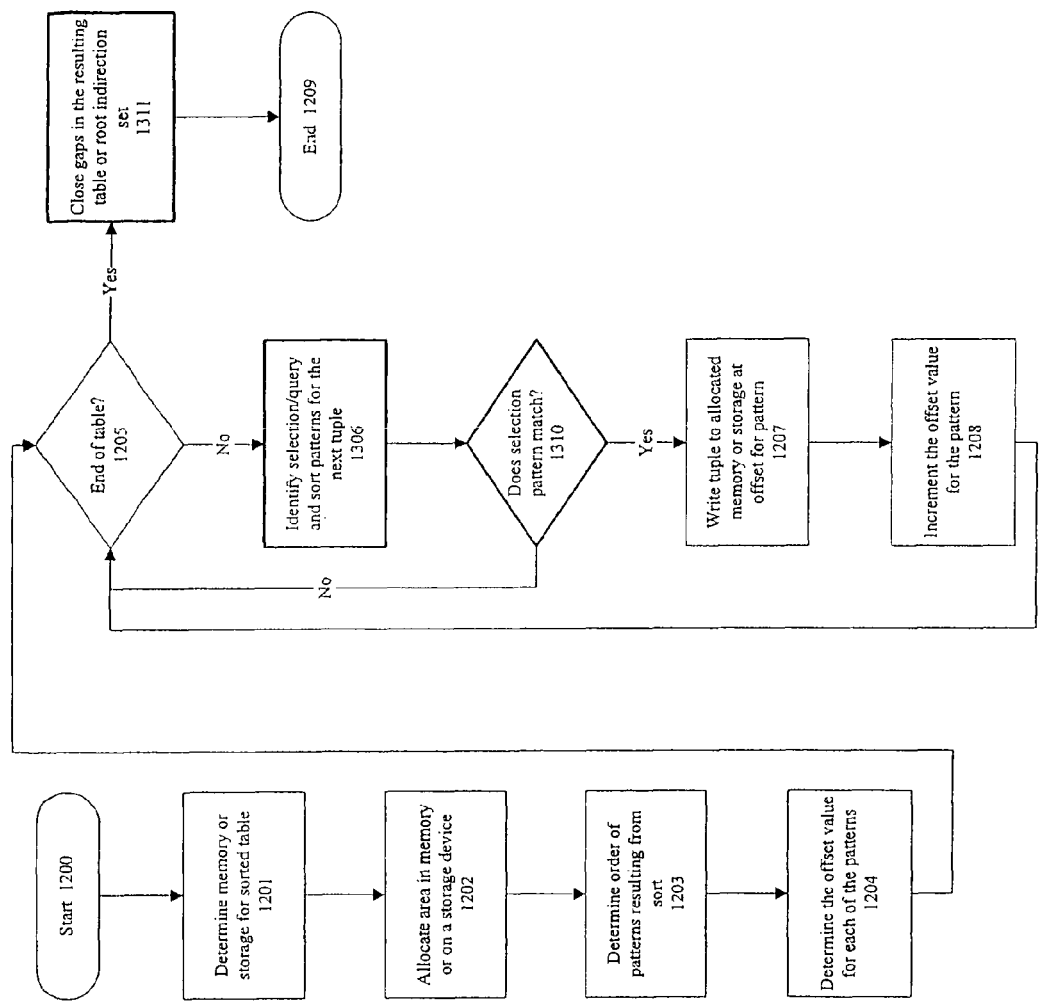
FIG. 13a is a flowchart illustrating the combination of a selection or query operation with a sorting operation according to one embodiment of the present invention.

FIG. 13a is a flowchart illustrating the combination of a selection or query operation with a sorting operation according to one embodiment of the present invention. The flowchart for the combination of a selection or query operation with a sorting operation according to this embodiment is similar to the flowchart for the sorting operation identified in FIG. 12a. For example, the offset values are still calculated using all the tuples as previously discussed. However, one step is slightly changed and two new steps are added as shown by the bold border for those operations. During the processing of each row in the original or root table 1205-1008, the value of the selection/query pattern and sort pattern are retrieved for each tuple 1306 instead of only the sort pattern. The selection/query pattern is necessary to determine if the tuple satisfies the selection/query requirements 1310 specified for the operation. In the above example, the age pattern for each automobile may be the selection/query pattern. If the value of the age pattern for the tuple is less than 5 then it satisfies the selection/query requirements 1310 and further processing including writing the tuple or generating a root indirection set pointer in the allocated memory or storage 1207 occurs. This step 1207 uses the sort pattern to determine where the tuple or root indirection set pointer is written by using the offset value for the sort pattern. This offset value is then incremented 1208. If the value of the age pattern (in this example) is 5 or more then it does not satisfy the selection/query requirements 1310 and the tuple is ignored—no further processing of the tuple occurs. After all the tuples have been examined in light of the selection/query criteria, gaps in the resulting sorted table or root indirection set are closed 1311. Gaps exist because all the memory or storage allocated for the operation will not be used if all the tuples do not meet the selection/query criteria. The result may look like the partial sort results shown in FIG. 12b with blocks of memory or storage containing pointers interspersed with blocks of memory or storage that are not used and contain no pointers. In order to consolidate the results, the consolidation process 1311 copies the pointers to the resulting sorted table subset or root indirection set in a manner removing the gaps according to one embodiment of the present invention. In another embodiment, the consolidation process 1311 closes the gaps in the results after they have been transferred to an intermediate memory or storage space. In either case, the size of the used and unused allocated memory or storage needs to be determined according to the blocks (one block for each pointer for a root indirection set or one block for each tuple for a table subset) used and unused. In one embodiment, this can be determined by taking the final offset value for each pattern and subtracting the starting offset value to determine the number of offset positions used for each pattern. For example, if the "Mfg D" manufacturer starts at offset value 258 (as determined in step 1204) and after the selection/criteria matching 1310 and sort are complete the offset value for "Mfg D" is 266, a determination that 266−258=8 cars of "Mfg D" are in the subset can be made.

Figure 13B:
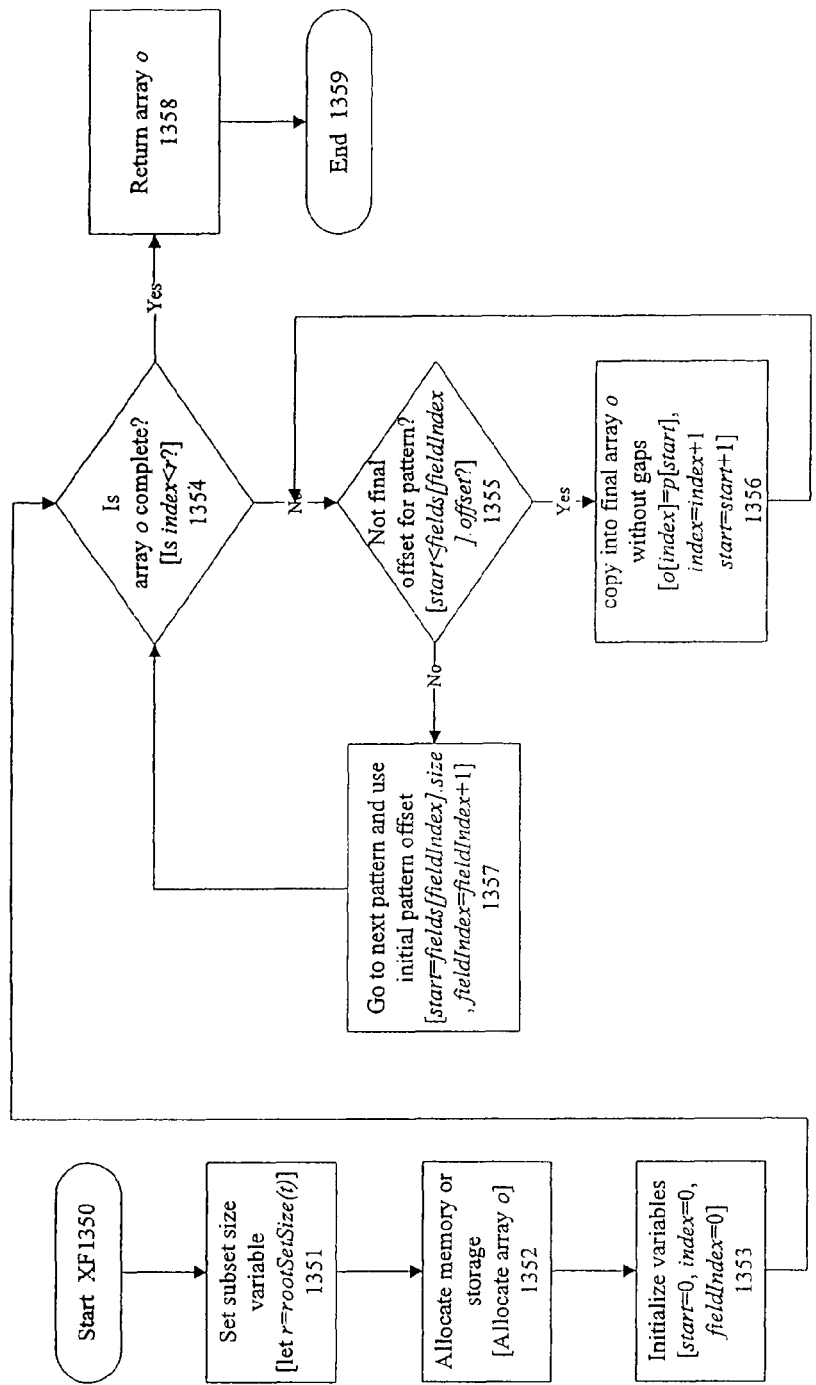
FIG. 13b is a flowchart illustrating the consolidation process for a subset of the data from a table according to one embodiment of the present invention.

FIG. 13b is a flowchart illustrating the consolidation process for a subset of the data from a table according to one embodiment of the present invention. According to the embodiment illustrated in FIG. 13b, the selection/query determination and sorting of the tuples from the original root data set occurs with the resulting pointers (either for the tuples or for the root indirection set) stored in an array p containing gaps—unused blocks—as previously discussed. The subset of the root data set (the original or root table) resulting from the selection or query criteria is referred to as t in the example shown in FIG. 13b. The consolidation process begins in a first step 1351 by determining the size of the subset t (i.e., the number of tuples in subset t) and setting a variable r to represent this information. An array of r pointers is allocated 1352 in memory or storage as array o if a root indirection set is being used. Otherwise C*r pointers are used for array o, where the number of subset tuples r times is multiplied by a coefficient C specifying the number of pointers representing each pattern—e.g., 2 in the previous embodiments discussed above. The next step 1353 is to initialize a number of counting variables. The variable start represents the block or position in the original array p (the block of memory or storage) which has the gaps that are being closed. The variable index represents the current block in memory or storage (the array position) allocated in array o, which is initially set to zero. The variable fieldIndex represents the counter to sequentially examine the patterns as they appear in sort order. The fieldIndex variable is used in the fields[fieldIndex].offset value to retrieve the final offset value for the pattern. For example, if only 8 occurrences of the pattern "Mfg D", which began at offset 258 in the above example, match the selection or query criteria, the final offset value for the "Mfg D" pattern will be 266 (258+8=266). If the "Mfg D" pattern is the second pattern, the fields[1].offset will be 266 for the second pattern "Mfg D" (the count begins at 0 for the first pattern). After these variables are initialized, a loop is executed 1354 until the index variable tracking the position in array o reaches the size of the subset r indicating that all the gaps have been closed and array o is complete. Within this first loop 1354 a second loop is executed for each pattern 1355. This second loop 1355 begins for each pattern at its initial offset in array p and continues block-by-block (or tuple-data by tuple-data) until the final offset value for the pattern (all the data for the pattern) is reached. For each block of data (pointer or set of pointers) for the pattern, the value in array o is set to the current value in array p 1356 resulting in gaps between the patterns being removed. The counter for array o, index, and the counter for array p, start, are then incremented 1356. Once the counter for array p, start, exceeds the final offset value for the pattern 1355, fields[fieldIndex].offset, the start variable is set to the initial offset value of the next pattern 1357 and the fieldIndex variable is incremented to the next pattern 1357 thus skipping over the gaps in array p. Once all the gaps have been removed 1354-1357, the consolidation process returns array o 1358 as either an array of pointers in sorted order to the tuples in the root or original table that satisfy the selection/query criteria if a root indirection set is used or as an array of pointers in sorted order representing the tuples in the root or original table that satisfy the selection/query criteria if an actual subset is generated. The above example illustrates only one possible consolidation process for a combination of selection or query operation with a sorting operation. In other embodiments, other consolidation processes may be used to implement the present invention.

The previous examples have described one embodiment of the present invention where sorting of a table is performed using a single pattern or field from the table. However, it is also possible to sort the data using multiple patterns or fields. According to one embodiment of the present invention, a sorting process using multiple fields can be implemented by using the previously described sorting process on the patterns in a reverse sort order for the patterns. For example, if a table containing the fields vehicle manufacturer and age of vehicle is to be sorted first by manufacturer then by age within manufacturer, the above described sorting process can be used to sort the data first by age and then the resulting set of data sorted by age can then be sorted by manufacturer. The result is a final data set first sorted by manufacturer then by age within manufacturer. The term data set is used instead of table because this process for sorting by multiple fields can also be used in conjunction with a selection or query operation resulting in only a subset of the table data being used.

Building the root or original table in a manner where the tuples are already sorted by pattern or field may improve the sorting operation by allowing two of the steps—1203 determining the order of the patterns and 1204 determining the offset value for each pattern—to be eliminated where the natural order (the original or root order) is used for the sort. This can improve the performance of the sort operation by reducing or eliminating several calculations that are part of the process outlined above. The resulting benefit is that performance more closely achieves O(log(n)) or O(log(m)) rather than O(n+m log(m)) that otherwise occurs, where n represents the number of tuples and m represents the number of patterns. Building the root or original table in a manner where the tuples are sorted according to a unique key for the table is particularly performance enhancing according to one embodiment of the present invention. Sorting on an unsorted unique key requires time proportional to O(n log(n)) to complete, which is the average sort time of many conventional sorting algorithms. By sorting the table by unique key when the table is generated or amended, future sorting operations can still function efficiently because sorting on the unique key can be avoided.

Sort by Expression

According to one embodiment of the present invention, using derived fields or an expression, both of which were previously discussed, can further expand the sorting process. A derived field may be calculated and added to the data set for a table and is treated as any other field according to one embodiment of the present invention. An expression is calculated at the time an operation (e.g., a sort operation) is executed and is not stored with the data set for the table according to one embodiment of the present invention. A sort by expression operation uses an expression as part of the sort process.

Sorting conducted according to the previously discussed embodiments of the present invention used single or multiple patterns in a table to produce the sorted ordering of data. Combining some of these previously discussed techniques allows for the implementation of a sort operation using an expression in addition to or in place of using a pattern value according to one embodiment of the present invention. Unlike the values for a pattern that are part of the data set for a table, an expression is a computation using the values of the patterns in the table and it is not stored for future use in one embodiment of the present invention—unlike derived fields.

In this embodiment, an expression is a computation made during the sorting process using at least one of the fields from the data set for the table. For example, an expression may involve a mathematical calculation such as 5*int(age/5). According to this example, a derived field value age, as previously discussed, is divided by 5, the integer value of this quotient is taken and multiplied by 5 yielding the expression value to be used in conducting the sort operation. Another example of an expression involving a mathematical calculation is the expression premium-claim which uses a difference obtained by subtracting the value of an insurance claim (i.e., the claim field value) from the value of an insurance premium (i.e., the premium field value). These are only a few examples of possible expressions that may be used according to this embodiment. The use of an expression for a sort operation may require a new or modified sorting process according to this embodiment of the present invention.

The sorting process as previously described according to one embodiment of the present invention used sort "bins" determined according to the unique patterns of the sort field. Memory or storage space was allocated for the sorted data, the memory was partitioned using offset values to created blocks of space or sort bins for each unique value in the sort field or key and a single pass through the tuples of the table was made with each tuple being assigned to the appropriate bin or block of space. The sort process for multiple fields worked the same way sorting by the individual sort fields (sort keys) in reverse order according to one embodiment described above. The sorting process using an expression is similar but uses a modification of these previously described techniques accounting for the addition of one or more expressions.

Figure 14A:
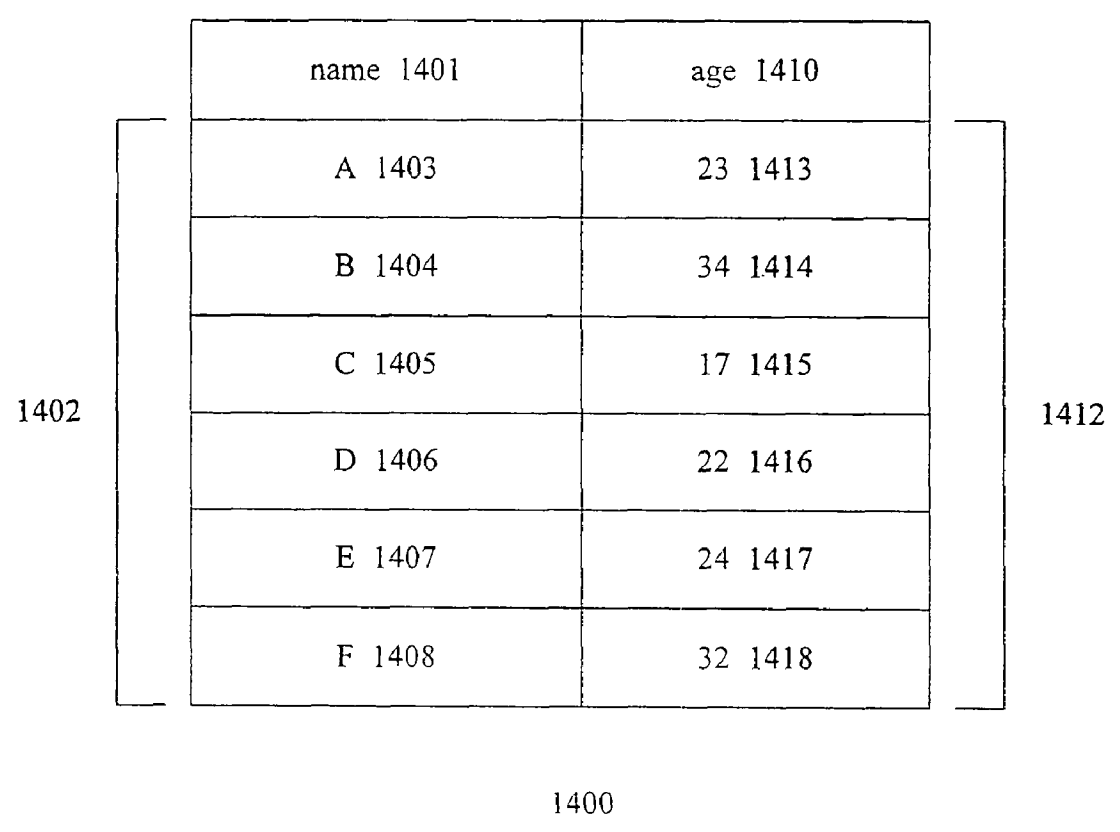

FIG. 14a is a diagram illustrating an example table to be sorted using an expression according to one embodiment of the present invention. In FIG. 14a, a table 1400 contains two fields: a name field 1401 and an age field 1411. Though FIG. 14a shows a conventional table, as previously discussed a table according to one embodiment of the present invention contains pointers to the patterns which are stored in memory or on a storage device. The data set of the patterns for the table 1400 is stored in memory or on a storage device. According to this example, there are six name patterns 1402—"A" 1403, "B" 1404, "C" 1405, "D" 1406, "E" 1407, and "F" 1408—and six age patterns—23 1413, 34 1414, 17 1415, 22 1416, 24 1417, and 32 1418. The combination of the patterns for name and age are unique resulting in a single name being matched to a single age according to the example shown in FIG. 14a. However, it is possible, for example, that an age may be paired with more than one name (e.g., A has an age of 23 and M has an age of 23). Using the first example expression above, 5*int(age/5), a sort by expression operation may be executed. The expression 5*int(age/5) groups age values into five-year bands where ages in the range of 0-4 result in an expression value of 0, ages in the range of 5-9 result in an expression value of 5, ages in the range of 10-14 result in an expression value of 10, etc. Sorting the tuples of the table based on this expression and sorting in an ascending order (whether by default or specified) results in the table reorganized according to FIG. 14b.

FIG. 14b is a diagram illustrating the sorted table with the expression value shown according to one embodiment of the present invention. The third column shown is the expression value used as the sort field or key for the sort by expression operation. The sort field or key appears in an ascending sorted order as a result of the sort operation on the table data using the expression. The sort field or key values in the third column shown in FIG. 14b do not appear as part of the table or data set after the sort by expression operation concludes and, as a result, some of the previously described sorting techniques can no longer be directly applied. Therefore, executing a sort operation using an expression may necessitate the use of a modified sort process—a sort by expression process—according to one embodiment of the present invention. One example of a sort by expression process is listed below.

```
sort(t,f)
    for each bin in sorted data
        keys[i] = fn(bin[i].key)
    sort(keys)
    reorder bins using keys
```

The sort by expression process begins by conducting a previously described sort operation on the table t using a sort field f representing a field used in the expression for the table—in this example, the age field. As previously described, the sort operation, according to one embodiment of the present invention, allocates an area of memory for the sorted table and then determines "bins" or subsets of the allocated memory by computing offset values. These bins are determined using the unique patterns for the sort field. Tuples from the table are then copied to the appropriate bins, which are arranged by sort order, in the tuple order in which they appear in the original table. The sort by expression process calculates the expression value for each of the determined bins (the unique patterns for the sort field f) resulting in a determination of the sort field or key (the expression value) for the sort by expression operation. These sort fields or keys (sort expression values) are then reorganized in a sorted order with the bins being reorganized according to these keys. Because of the initial sort based on the field used in the expression, the sort field/key for the sort by expression operation only needs to be determined once for each bin and the bins as a whole can be rearranged according to the sorted order of these sort fields/keys. In FIG. 14b, the table data is sorted according to field age 1410 used by the expression. The sort field or key 1420 for the sort by expression operation is then determined for each bin and placed in sorted order and the bins are reorganized accordingly. The bins in FIG. 14b are organized by age—17 1415, 22 1416, 23 1413, 24 1417, 32 1418, and 34 1414—and determine the sort field or key for the sort by expression operation.

Further examining the sort by expression process, an execution or performance assessment may be made by examining each of the subordinate steps. The initial sort operation sort(t,f) takes $O(n)$ operations as previously described. Determining or collecting the keys (i.e., the sort expression values) for the bins (i.e., for each unique pattern in the sort by expression field f) takes $O(m)$ operations where m is the number of unique patterns for the sort by expression field f. The keys are then sorted taking $O(m \log(m))$ operations and resulting in a sorted list of the keys (i.e., sort expression values). As shown in FIG. 12b, the bins from the initial sort are then reordered according to the key (i.e., sort expression) value. The reordering of the bins generally takes $O(n)$ operations. According to this information, the entire sort by expression process requires an execution time related to $O(2n+m+m \log(m))$ operations. As previously discussed, n will generally be larger than m in most circumstances and with most data sets and n can be significantly larger than m in some circumstances. For this reason, the value of n will generally be the more significant variable in this equation. Where n is significantly larger than m, performance will approach O(n) and where n and m are closer in size, performance will more closely approximate O(m log(m)) which is the average performance of many conventional sorting techniques.

The sort by expression process evaluates the function for the expression m times during the sort operation where m is the number of unique patterns for the sort by expression field for, in other words, the number of sort bins in the initial sort. Evaluating the expression for m (i.e., for each occurrence of a unique pattern) rather than n (i.e., for each tuple in the data set for the table) may result in a significant improvement in performance where n is greater than m. The more significant the difference between n and m, the greater the performance gained by using the initial sort bins to evaluate the expression rather than on a row-by-row basis requiring n calculations of the expression (i.e., execution of the expression function) as is generally done in conventional database management systems. The above description for implementing a sort operation based on an expression can also be applied to a partition or join operation as well, especially because both are based on the basic sort process as described later in this document.

The embodiment discussed above describes the implementation of a sort by expression operation where the expression is based on a value for a single field in the data set for the table. In another embodiment of the present invention, the sort by expression operation may be conducted using an expression involving multiple fields in a table. If the sort expression uses multiple fields to determine a single key (i.e., sort by expression value), there is little change from the sort by expression process described above. According to one embodiment where multiple fields are used to generate a single key (sort by expression) value, a minor variation of the sort by expression process may be used as follows.

```
sort(t,f_1...f_n)
for each bin in sorted data
    keys[i] = fn(bin[i].key)
sort(keys)
reorder bins using keys
```

The sort by expression process conducts the initial sort using the multiple fields as previously described. The order of the fields in this initial sort does not matter as any resulting sort bin organization for the combination of the field values/patterns will be reordered later. The initial sort by the multiple fields creates bins for each unique combination of the patterns for the multiple fields with each bin containing any corresponding tuples (or root indirection sets for the tuples) of the table. The keys (sort by expression values) are then determining using the multiple fields. The keys are then sorted and the bins reordered as previously described resulting in a successful sort by expression using multiple fields in the expression.

Using the multiple fields alters the performance characteristics of the sort by expression process. The performance of the sort by expression process using a single field had an execution time related to $O(2n+m+m \log(m))$ operations. The sort by expression process using multiple fields has an expected performance related to $O(2n+M+M \log(M))$ operations, where M is the total number of unique patterns resulting from the various combinations of the multiple fields used in the expression for the sort by expression operation. For example, if a sort by expression operation is conducted for the expression 5*int(age/5)+int(int(income/1000)/2), the unique patterns M for the different combinations of the fields age and income determine the performance of the sort by expression operation. FIG. 14c is a diagram illustrating a data set for an example table. In one embodiment of the present invention, the data set for the table would contain unique pattern values and their number of instances stored in memory or on a storage device with a table representation containing the structure of the table with pointers to the stored patterns and number of instances. Instead, a conventional table format is illustrated in FIG. 14c to simplify the explanation provided for the sort by expression operation involving multiple fields according to one embodiment of the present invention. The table 1430 contains 3 fields: name 1440, age 1441, and income 1442. The expression for the sorting operation uses the values from two of these fields: age 1441 and income 1442. As described in the sort by expression process for multiple fields above, the table is first sorted according to the fields in the sort expression. Because the order of the fields in the sort is not relevant to the final result, either the age 1441 or income 1442 field can be the first sort field. As previously discussed in the sorting section, when conducting a sort operation with multiple sort fields, a sort is first conducted for the last sort field, then a second sort is conducted on the first sort results for the next to last sort field, etc. (i.e., reverse sort order). In this example, the first sort field is age 1441 and then income 1442 and, as a result, we first sort by income 1442 then use those results to sort by age 1441. FIG. 14d is a diagram illustrating a sorted table in order by age and then income and showing the sort expression value (the sort key) for each tuple of the table according to one embodiment of the present invention. According to the embodiment previously described, the key (sort expression value) is not calculated for each tuple of the table but is calculated for each sort bin. In the case of multiple fields used in a sort expression, the bins are determined by the unique pattern for the combination of field values. The unique values are as follows from the sorted (by age then income) data set: 17 1462—29,000 1472; 18 1468—15,000 1478; 22-1463—43,000 1473; 23 1460—57,000 1470; 24 1464—80,000 1474; 32 1465—110,000 1475; 34 1461—78,000 1471; 35 1467—85,000 1477; 40 1469—98,000 1479; and 50 1466—210,000 1476. According to this example, each tuple has a unique pattern combination of the age and income field values with each combination being its own sort bin. According to this example, a sort key (sort expression value) is calculated for each bin (in this case each tuple) and the sort key is shown in a fourth column 1443. The keys are then sorted and the bins are rearranged according to the sorted keys. FIG. 14e is a diagram illustrating the data set for the table in sorted order by expression according to one embodiment of the present invention. Reordering the sort bins using the sort keys (the sort expression values) results in a final table organization sorted according to the expression using multiple fields. The key values are not stored with the table and are only calculated for the sort by expression operation and, therefore, are not listed in conjunction with the final table according to this embodiment.

In addition to the above examples where a sort by expression operation using a single field and a sort by expression operation using multiple fields are described, a sort by expression operation using multiple expressions may also be implemented according to one embodiment of the present invention. The use of multiple expressions is similar to sorting using multiple fields as previously described. According to this embodiment, a sort by expression operation for the last expression—whether using single or multiple fields—is first conducted, then a sort by expression operation for the next to last expression is then conducted until the final sort by expression operation for the first expression is conducted (i.e., the sort by expression operations are conducted in reverse expression order—last first). The sort by expression operations for multiple expressions results in a table sorted first by the first expression, second by the second expression, etc. The sort by expression operations each work as outlined above depending upon if a single field or multiple fields are a used for the sort expression. A sort by expression process for multiple expressions, according to one embodiment of the present invention, is shown below.

```
count = expressionsTotal
for(i=0; i<expressionsTotal; i++)
    t = sort(t,expression[count]f_1...expression[count]f_n)
    for each bin in sorted data
        expression[count].keys[j] = expression[count].fn(bin[j].key)
    sort(expression[count].keys)
    reorder bins using expression[count].keys
    count = count - 1
```

The sort by expression process for multiple expressions is similar to the previous sort by expression process except that a loop is executed for each expression with the sorting beginning with the last expression and continuing until the first expression—the final expression for which a sort operation is conducted—is executed.

Partition Operation (Partitioning)

The sorting process can be used to implement partitioning and joining according to one embodiment of the present invention. Partitioning is the dividing of a table and possibly its associated data set. For example, if a table contains information about automobiles, it may be partitioned into subsets of data according to the manufacturer. One example of this type of partition operation is to group and separate all the tuples for "Mfg A", "Mfg B", etc. This example divides information by complete tuple according to one embodiment of the present invention. For example, dividing the automobile information by manufacturer results in the complete tuple of automobile data for the manufacturer being included into the partitioned subset (i.e., partition). According to this embodiment, the sorting process previously discussed can be used to group the data in a table according to the partition field or partition key and generate the partitions accordingly. The partition field or partition key is the pattern or field value that is the basis for the sorting and separation of the data in the table—in the above example, the manufacturer field value/pattern. Though the examples for this embodiment use a single partition field, it is possible to partition a table using multiple fields or patterns in other embodiments of the present invention.

According to this embodiment of the present invention if the manufacturer field has 5 associated patterns 1103-1107 as illustrated in FIG. 11a, partitioning the table will result in 5 partitions of the original data set for the table one containing all the tuples for "Mfg A", a second partition containing all the tuples for "Mfg B", etc. The number of partitions resulting from this embodiment depends on the number of patterns in the partition field. If there are m patterns in the partition field (e.g., m manufacturers), there will be m partitions resulting from the partition operation according to this embodiment of the present invention. Each of the resulting partitions can then be used for further sorting operations, selection or query operations, statistical calculations or other database operation as if the partition was its own table. For example, a table containing automobile registrations at a university can be partitioned into subsets by automobile manufacturer that can further be queried. A selection or query operation may be executed on the partition for "Mfg A" to find all automobiles that are under 2 years old and registered after a certain date. Though this information may alternatively be obtained by combining a more detailed selection or query operation (or multiple selection/query operations) with a sorting operation as previously discussed, the use of a partition operation to generate a partition may also be used. According to one embodiment of the present invention, using a partition operation may be particularly advantageous when a number of subsequent operations are to be performed on each data subset. A partition operation may also allow or assist in the efficient computing of complex statistics for each partition.

According to one embodiment of the present invention, the partition process is based on the sort process previously discussed and is shown as follows.

```
table=frequenciesFor(f,t)
s=sort(t,f)
fieldIndex=0
count=0
for(i=0; i<size(t); i++)
    if (count==0)
        p[fieldIndex] = newPartition(table[fieldIndex].name,t)
        count = table[fieldIndex].frequency
        fieldIndex = fieldIndex + 1
    p[fieldIndex-1].addRoot(s.rootAt(i))
    count = count - 1
```

The value t is the table to be partitioned and f is the partition field according to which the table is partitioned. The table is first sorted and the two counter variables fieldIndex and count are initialized (set to 0). After the sorting of the table, a for loop is executed going through each tuple of the table one at a time partitioning the tuples by the partition field.

The partition operation is a linear process similar to the sort process as previously described. A first pass through the table is executed to sort the tuples and a second pass through the sorted table is executed to assemble the partitions according to this embodiment. In one embodiment of the present invention, the partitions are virtual tables in that they share leaf and branch nodes with the parent table. For this reason, the only unique information for the partition is its root indirection set referencing the already existing parent table tuples making the partition efficient and quick to compute, manipulate, and store. For example, a partition on a 32 bit computer system may use approximately 4n bytes to store the entire set of partitions for the table according to this embodiment, where n is the number of tuples in the table.

The combination of a selection or query operation with the sorting process as previously described can be used as the basis for a partitioning of the data set according to another embodiment of the present invention. According to this embodiment, all the data in the table is not partitioned as described in the previous embodiment and a partition is only generated for a subset of the data (i.e., tuples) in a table. According to this alternative embodiment, if a table includes information about automobiles a partition or subset may only be generated for tuples related to one manufacturer. In the previous embodiment, the entire table would be partitioned as a result of the partition operation with one partition for each manufacturer. According to this embodiment, a partition only for the desired (i.e., selected) manufacturer will be generated. The partition process for this alternative embodiment is similar to the partition process for the previous embodiment except that a partition is only generated for the desired partition field value/pattern.

The previous partition embodiments grouped and separated the table data by complete tuple. In the first embodiment, a root indirection set was generated for each partition with one partition for every value/pattern in the partition field. In the second embodiment, a root indirection set was generated for the sole partition for the selected partition field value/pattern. In both cases, the root indirection set referenced the complete tuple in the parent table from which the partition was generated. In another embodiment of the present invention, a partition operation may be used to split the tuples of the table with the fields and patterns being partitioned rather than the tuples. This embodiment is the opposite of the join operation discussed below and illustrated later in FIGS. 15b and 15c.

Join Operation (Joining)

The sorting process can also serve as the basis for a join operation according to one embodiment of the present invention. A join operation is the combination of two tables into a single resulting joined table. For example, a table or data set of automobile information for cars made by manufacturer "Mfg A" may be combined with a table or data set of automobile information for cars made by manufacturer "Mfg B". This example of a join operation is the opposite operation to a partitioning operation as described above. According to this example, both tables share a similar structure in that they have the same fields for each tuple of data. The join operation according to this example merely merges the two tables sharing the same structure into a single joined table. This can be done by appending the data from one table to the other table or by creating a new table and adding the information from the two merging tables according to previously discussed embodiments of the present invention. This type of a join operation is different from other types of join operations and will be referred to as a merge operation to distinguish it and to avoid any confusion.

Another type of join operation is the joining of the tuples from two tables that do not share the same structure (i.e., do not have all the same fields for their tuples). In this second type of join operation, tuples from the first or "left" table are associated with data from the second or "right" table according to some criteria. For example, a join operation for a table of insurance claims with a table of insurance policies may use an insurance policy identifier or insurance policy number to identify the insurance policy details to which each claim applies. According to this example, the resulting joined table will contain a tuple for each insurance claim but each tuple will also contain details about the insurance policy to which the insurance claim applies. Under these circumstances, the insurance policy number may be repeated in numerous claims (tuples) which apply to the same insurance policy. This may result in a loss of data normalization under the relational database model but this will not affect the join operation according to this embodiment of the present invention.

Figure 15A:
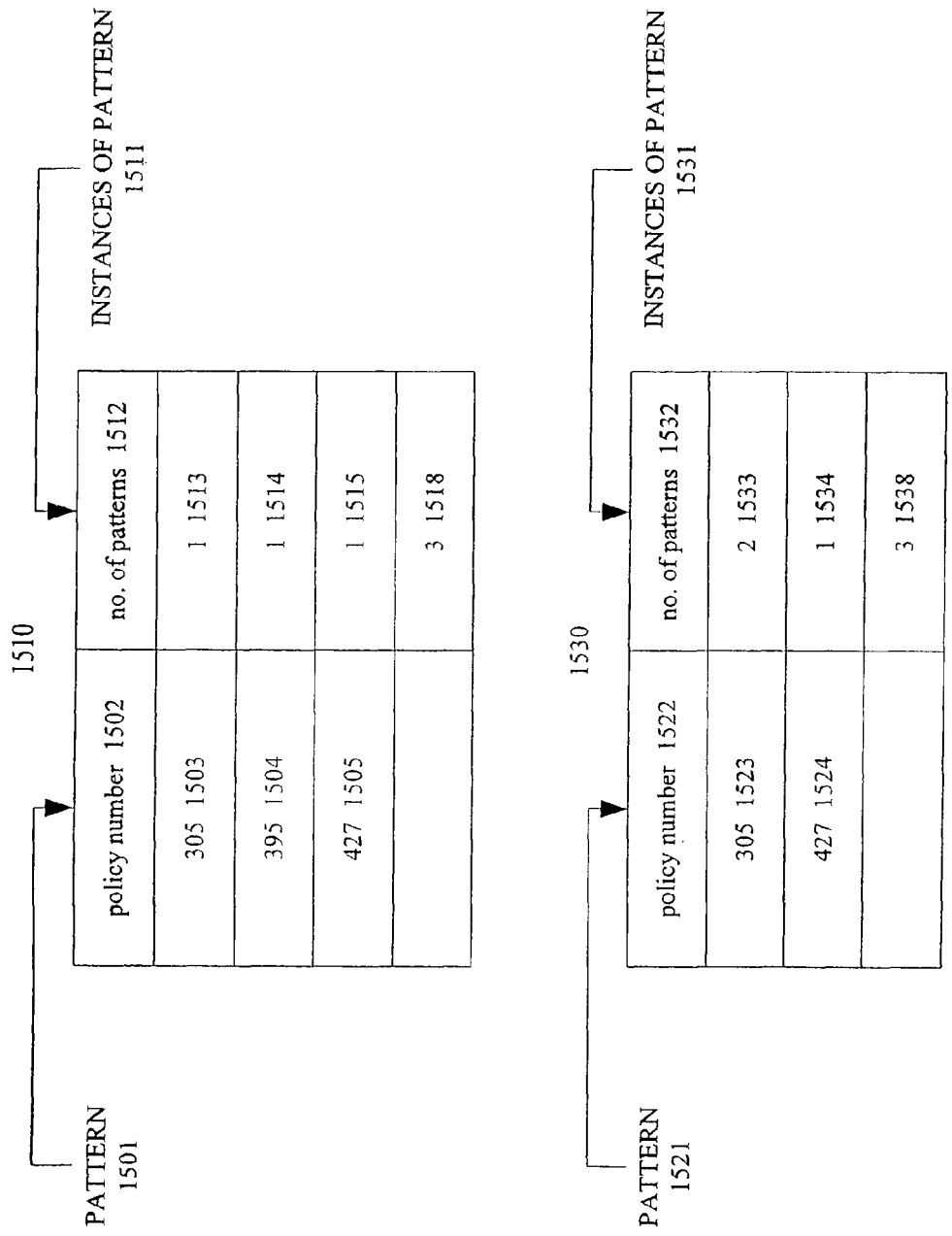
FIG. 15a is diagram illustrating the patterns and number of instances for each pattern that are stored in memory or on a storage device and referenced by pointers in a representation of two tables for two data set, according to one embodiment of the present invention.

FIG. 15a is diagram illustrating the patterns and number of instances for each pattern that are stored in memory or on a storage device and referenced by pointers in a representation of two tables for two data sets according to one embodiment of the present invention. The information for the first pattern 1501 referenced by pointers from a first table 1510 are patterns for an insurance policy number 1502. According to the example illustrated in FIG. 13a, only 3 patterns for insurance policy number 1502 exist: 305 1503, 395 1504, and 427 1505. The number of instances for each pattern 1511 is the number of times the pattern occurs 1512 in the tuples of the first table 1510. Insurance policy number 305 1503 occurs 1 time 1513, policy 395 1504 occurs 1 time 1514, and policy 427 1505 also occurs 1 time 1515. The 3 instances in total for these patterns 1518 should match the total number of tuples in the first table 1510. The information for the second pattern 1521 referenced by pointers from a second table 1530 are patterns for an insurance policy number 1522 for insurance claims. According to the example illustrated in FIG. 13a, only 2 patterns for insurance policy number 1522 for the insurance claims exist: 305 1523 and 427 1524. Insurance policy number 395 1504 that occurs in the data set for the first table 1510 is not associated with any claims in the second table 1530 and, therefore, the pattern 395 does not show up in the insurance policy numbers 1522 for the second table 1530. The number of instances for each pattern 1531 is the number of times the policy number pattern occurs 1532 in the tuples of the second insurance claims table 1530. Insurance policy number 305 1523 occurs 2 times (i.e., is associated with two claims) 1533 and policy 427 1524 occurs only 1 time (i.e., is associated with only one claim) 1534. The total number of instances 1532 for the policy number patterns 1522 is 3 1538 (i.e., 2 for policy 305 and 1 for policy 427) which equals the total number of tuples for the second insurance claims table 1530.

Figure 15B:
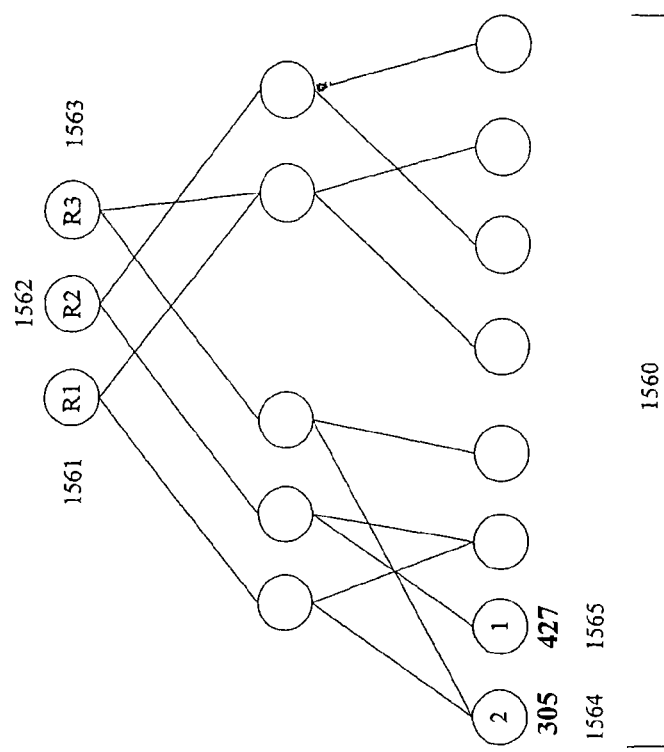
FIG. 15b is a diagram illustrating a tree-structure representation of a table for an insurance policies data set and a table for an insurance claims data set according to one embodiment of the present invention.
Figure 15B:
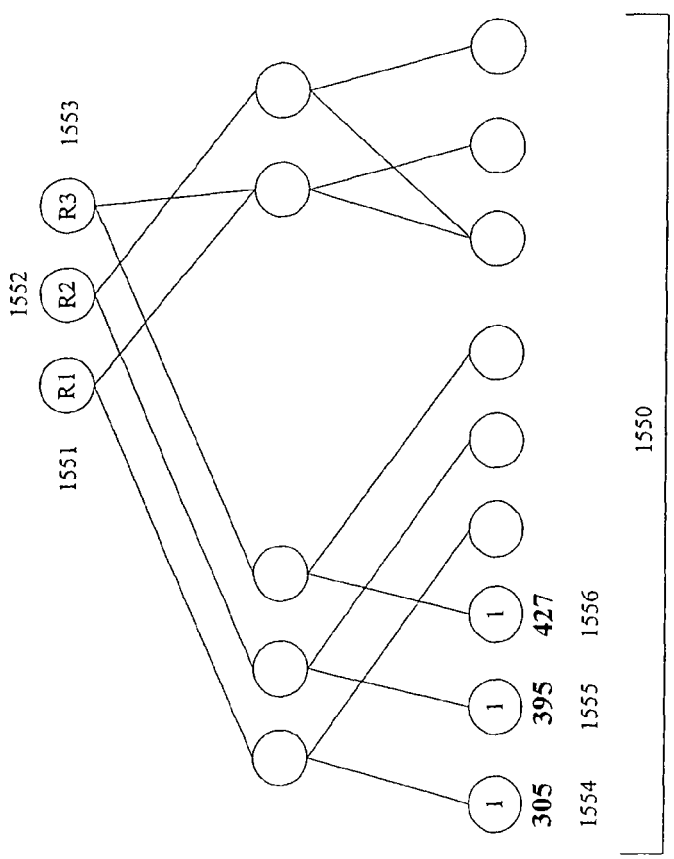

FIG. 15b is a diagram illustrating a tree-structure representation of a table for an insurance policies data set and a table for an insurance claims data set according to one embodiment of the present invention. The first tree structure 1550 is a representation of the first insurance policies table 1510 previously discussed. A tree structure is shown for each tuple of the table. The first tuple 1551 is shown beginning with a root node (identifying the tuple) and containing the insurance policy number 305 1554 as a leaf pattern. The second tuple 1552 is shown beginning with a root node and containing the insurance policy number 395 1555 as a leaf pattern. The third tuple 1553 is shown and contains an insurance policy number 427 1556 as a leaf pattern. Each of the insurance policy nodes show a value of 1 indicating that there is only 1 instance of the pattern in the data set for the table. The other node values and patterns are not shown. The second tree structure 1560 is a representation of the second insurance claims table 1530 previously discussed. A tree structure is also shown for each tuple of the table. The first tuple 1561 is shown and contains information regarding a first claim for insurance policy number 305 1564. The second tuple 1562 is shown and contains information regarding a first claim for insurance policy number 427 1565. The third tuple 1563 is shown and contains information regarding a second claim for insurance policy number 305 1564. The node values for policy 305 1564 and 427 1565 reflect the number of instances that each pattern occurs in the data set for the claims table 1530—2 instances for policy 305 and 1 instance for policy 427. Additional patterns and node values are not shown for the insurance claims table 1560. FIG. 15b is illustrative of the different circumstances that exist for joining tables whose structures do not match. The tree structure for the first data set 1550 and the second data set 1560 may contain different nodes and patterns as reflected by the other nodes for which data is not included in FIG. 15b.

Figure 15C:
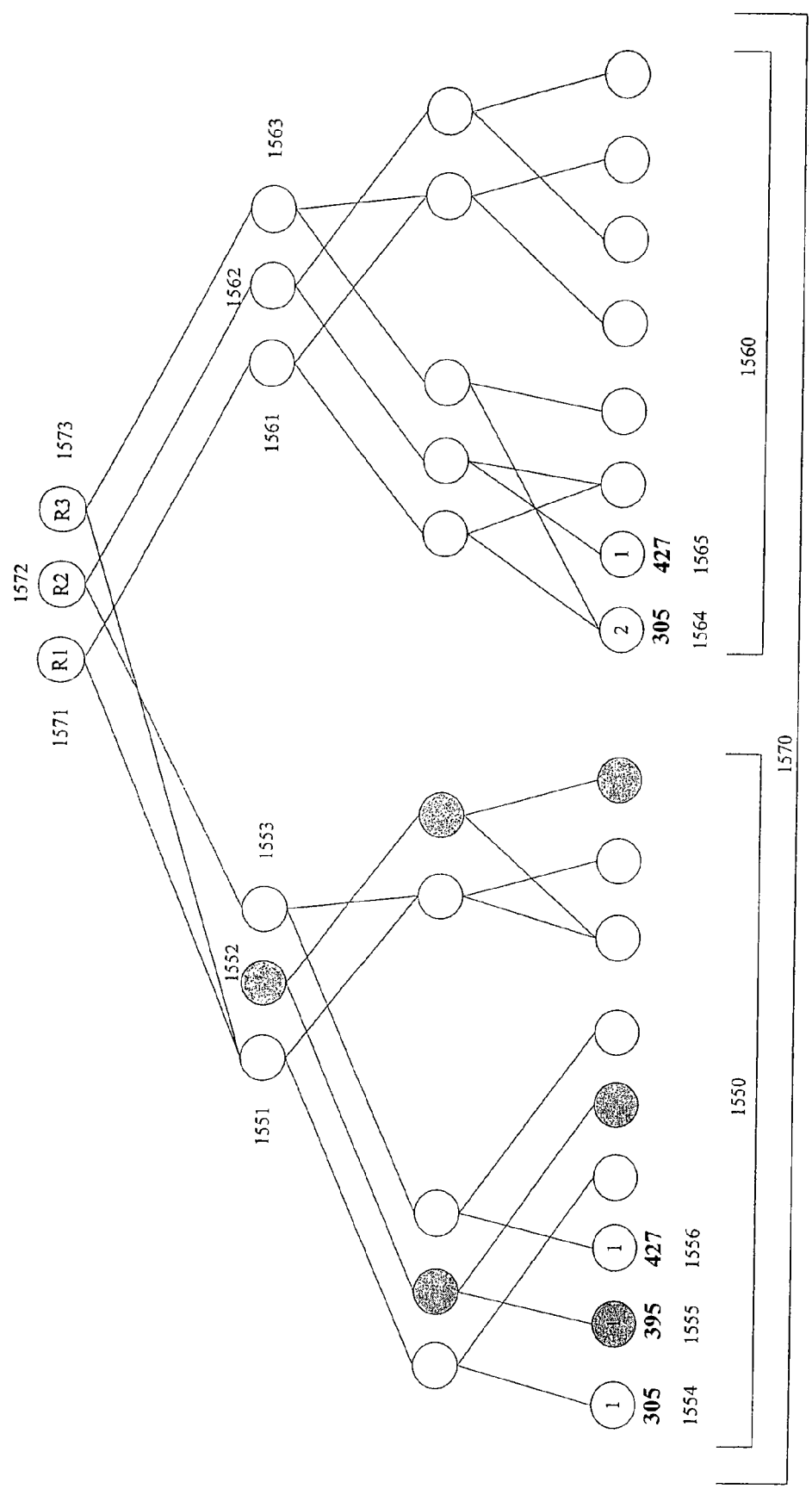
FIG. 15c is a diagram illustrating a tree-structure representation of the joining of the data sets for two tables according to one embodiment of the present invention.

According to one embodiment of the present invention, joining the table for insurance policies with the table for insurance claims results in a new root node for each tuple with the root node sitting above the previous root nodes for the tuple data in the individual tables. FIG. 15c is a diagram illustrating a tree-structure representation of the joining of the data sets for two tables according to one embodiment of the present invention. The data set for the insurance policies table 1550 is joined to the data set for the insurance claims table 1560 resulting in a joined data 1570 containing the data from both. According to this embodiment, the joining process joins only the data from the tuples in the insurance policies table 1550 that have an insurance policy number 1554, 1556 that match an insurance policy number 1564, 1565 in the tuples of the insurance claims table 1560. For example, a tuple 1552 in the insurance policies table 1550 that does not match a policy number in the insurance claims table 1560 is not joined to the insurance claims table 1560. For this reason, the tuple 1552 for insurance policy number 395 1555 is not joined to the insurance claims table 1560 as indicated by the shading in FIG. 15c. The tuples that are joined are joined by creating a new root node in the joined table linking the information for the insurance policy number in the insurance policies table 1550 to the policy number for claims in the insurance claims table 1560. For example, insurance policy number 305 1564 appears in tuples for 2 claims 1561, 1563 in the insurance claims table 1560. In this situation, a new root node 1571, 1573 is generated for each tuple 1561, 1563 in the insurance claims table 1560 linking the insurance policy tuple 1551 for policy number 305 1554 to each of these claims 1561, 1563. Another claim tuple 1562 for insurance policy number 427 1565 is also linked to the insurance policy information 1553 for policy number 427 1556 in the insurance policies table 1550 in the example shown in FIG. 15c.

FIG. 15c illustrates the join operation conducted using a single join field—insurance policy number—even though the joined tuples may contain many fields or patterns. In other embodiments of the present invention, it is possible to conduct the join operation using multiple fields or patterns in the data set rather only one field/pattern as shown in FIG. 15c.

The above example for joining the two data sets is facilitated by the use of pointers as previously discussed according to at least one embodiment of the present invention. Because pointers are used, the underlying data (e.g., the insurance policy numbers 1503-1505 and associated number of instances 1513-1515 stored for the insurance policies data set 1510, 1550 and the insurance policy numbers 1523-1524 and associated number of instances 1533-1534 stored for the insurance claims data set 1530, 1560) remain unaffected by the joining of the data sets. Instead, the resulting joined table only needs to incorporate pointers to the data stored in memory or on a storage device according to one embodiment of the present invention.

One method of determining which tuples in the table data sets to be joined is to examine every possible pairing of data and determine whether it belongs in the resulting joined table. Implementing this type of process takes time proportional to $n_1 * n_2$, where $n_1$ and $n_2$ are the sizes of the data sets (the number of patterns for the join field in the data set) for the insurance policies 1510, 1550 and the insurance claims 1530, 1560. Depending on the size of the data sets to be joined, the number of combinations that need to be tested according to this method can be potentially very large. For the example given in FIG. 15c, this involves an execution time proportional to the 6 (3*2) combinations that must be tested according to this method. This method is obviously inefficient and an alternative method for joining the tables is used according to one embodiment of the present invention.

There are a number of types of join operations used in database systems. One example is a equi-join or natural join where two tuples are joined where they both have a matching join "key". The type of join operation illustrated in FIG. 15c is an equi-join where tuples from the two data sets are only joined if their join field or join key (in this example, the insurance policy number) match. For an equi-join, the size of the resulting joined table can be determined using the following join size determination process according to one embodiment of the present invention.

```
s₁=patternSetFor(f₁,t₁)
s₂=patternSetFor(f₂,t₂)
total=0
i=0; j=0
while (i<size(s₁)) && (j<size(s₂))
    if (s₁.patterns[i]==s₂.patterns[j])
        total = total+s₁.sizeFor[i]*s₂.sizeFor[j]
        i=i+1; j=j+1
    else if (s₁.patterns[i]<s₂.pattern[j])
        i=i+1
    else
        j=j+1
```

The values $t_1$ and $t_2$ represent the two tables to be joined and $f_1$ and $f_2$ represent the shared fields (i.e., the join field or join key) according to this embodiment. The join size determination process is predicated on both data sets being in sorted order as the determination $s_1.patterns[i]<s_2.patterns[j]$ would otherwise not function properly. This join size determination process applies to an equi-join and can be illustrated using the example join shown in FIGS. 13a-13c. Using the insurance policies table 1550 to determine the pattern set $s_1$ 1510 and the insurance claims table 1560 to determine the pattern set $s_2$ 1530, the join size determination process is illustrated as follows. According to the process, the variables i and j and the join size count total are initialized (set to 0). The while loop executes as long as the counters i and j are less than the size of the insurance policies data set (i.e., 3 patterns) and the insurance claims data set (i.e., 2 patterns) respectively. On the first iteration of the while loop, a determination is made whether the patterns for the data sets match. In this case, $s_1.pattern[0]=305=s_2.pattern[0]$ so the join size count total is incremented by the number of instances for pattern 305 1503 in the first data set 1510 (i.e., 1 1513) multiplied by the number of instance of the pattern 305 1523 in the second data set 1530 (i.e., 2 1533) resulting in total=0+1*2=2. The counters i and j are incremented (i.e., i=1 and j=1) and the while loop executes again. In this second iteration of the while loop, the patterns do not match and $s_1.pattern[1]=395$ and $s_2.pattern[1]=427$. Because $s_1.pattern[1]<s_2.pattern[1]$, the counter i only is incremented (i.e., i=2 and j=1). On the third and final iteration of the while loop, the patterns match with $s_1.pattern[2]=427=s_2.pattern[1]$ so the join size count total is incremented by the product of the number of instances (i.e., 1 1515*1 1534 respectively) resulting in total=2+1*1=3. The join size process therefore calculates a join size of 3. As is clear from the preceding examples, the sorted nature of the two data sets 1510 and 1530 may be necessary for the proper performance of this example process.

According to one embodiment of the present invention, the join process is similar to the join size determination process. The equi-join join process for two tables $t_1$ and $t_2$ with two shared fields $f_1$ and $f_2$ (i.e., the join field or join key) according to this embodiment is listed below.

```
s₁=sort(t₁,f₁)
s₂=sort(t₂,f₂)
i=0; j=0
while (i<size(s₁))
    if (valueFor(f₂,s₂[j])==valueFor(f₁,s₁[i]))
        k=0
```

```
        while (valueFor(f₂,s₂[j+k])==valueFor(f₁,s₁[i]))
            add(s₁[i],s₂[j+k])
            k=k+1
    else if (valueFor(f₂,s₂[j])<valueFor(f₁,s₁[i]))
        j=j+1
    else
        i=i+1
```

The above equi-join join process is similar to the join size determination process previously discussed except that the tables are first sorted and no join count total is maintained. In addition, the add function is the joining of the matching tuples from both tables. As previously discussed, the sorting of the tables takes $O(n_1)$ steps to execute the first sort and $O(n_2)$ steps to execute the second sort. The while loop for the equi-join join process will take at most $O(\max(n_1+n_2, n_3))$ steps to complete where $n_1$ and $n_2$ are the sizes of the data sets to be joined and $n_3$ is the size of the final joined data set. Because the first branch of the if statement combines the processing of the second and third branches of the if statement, every time a result uses this first branch the overall steps are reduced resulting in $O(n_1+n_2)$ being the worst case number of steps to be performed for the equi-join join process.

An equi-join is only one example of a database join operation. For other types of join operations, variations of the above equi-join join process may be used to implement the other join operations according to one embodiment of the present invention. For example, another type of join operation may be termed a "left outer join" operation. In the equi-join example provided above and in FIGS. 15b and 15c, insurance policy number 395 1555 did not match any tuples in the claims table 1560 and therefore the insurance policy data 1552 for policy 395 1555 was omitted from the resulting joined table. A "left outer join" would include a tuple for policy 395 in the resulting joined table but would have all the data (i.e., the fields) for the claims portion of the joined tuple set to a NULL value. To implement the "left outer join" operation, a modification of the join size determination process and the equi-join join process may be used. According to one embodiment of the present invention, a modified join size determination process as shown below can be used for the "left outer join" operation.

```
s₁=patternSetFor(f₁,t₁)
s₂=patternSetFor(f₂,t₂)
total=0
i=0; j=0
while (i<size(s₁)) && (j<size(s₂))
    if (s₁.patterns[i]==s₂.patterns[j])
        total = total+s₁.sizeFor[i]*s₂.sizeFor[j]
        i=i+1; j=j+1
    else if (s₁.patterns[i]<s₂.pattern[j])
        i=i+1
        total=total+1
    else
        j=j+1
```

The join size determination is the same for both the equi-join operation and the "left outer join" operation except that for the "left outer join" the total is incremented for all patterns in the "left" data set—even for those where no match is found. The changes to the join size determination process (i.e., an additional line in this case) made from the equi-join operation to the "left outer join" operation is shown in bold above. A "left outer join" operation may be particularly useful where the "right" data set requires the existence of the join key or join field before allowing data to be included in the data set and table. For example, to add a claim to the insurance claim table, a requirement may be in place that the insurance policy number must already exist in the insurance policies table with the insurance policies table serving as the lookup table for the policy number in the insurance claims table. In this situation, it would not be possible to have a tuple in the insurance claims table (the "right" data set) that does not match a tuple in the table for the "left" data set though the table for the "left" data set may have tuples that do not match the data in the table for the "right" data set. In these circumstances, the "left outer join" operation is particularly useful in making sure that all tuples are included in the resulting joined table.

According to one embodiment of the present invention, a "left outer join" join process is shown below as a modification of the equi-join join process previously discussed.

```
s₁=sort(t₁,f₁)
s₂=sort(t₂,f₂)
nullTree = nullTree(t₂)
i=0; j=0
while (i<size(s₁))
    if (valueFor(f₂,s₂[j])==valueFor(f₁,s₁[i]))
        k=0
        while (valueFor(f₂,s₂[j+k])==valueFor(f₁,s₁[i]))
            add(s₁[i],s₂[j+k])
            k=k+1
    else if (valueFor(f₂,s₂[j])<valueFor(f₁,s₁[i]))
        j=j+1
    else
        add(s₁[i], nullTree)
        i=i+1
```

The nullTree($t_2$) is a tuple or tree in the table for the second or "right" data set with NULL values for all the patterns in the tuple/tree. This NULL value tuple for the "right" data set is then joined to the tuple in the table for the "left" data set where the data (i.e., the join key or join field) in the tuple for the left data set does not match the data (i.e., the join key or join field) in the "right" data set. This is reflected in the second use of the add function. The additions to the equi-join join process to implement a "left outer join" join process are shown in bold.

The equi-join join operation and the "left outer join" operation are only two examples of possible join operations that may be implemented according to at least one embodiment of the present invention. Other join operations may be implemented in a similar manner using minor modification to the join size determination process and join process discussed above according to one embodiment of the present invention.

Archiving

The necessity to maintain increasingly greater amounts of data to comply with, for example, current government regulatory requirements, such as Sarbanes-Oxley and Basle 2, may create burdens that conventional archiving techniques are ill equipped to satisfy. According to one embodiment of the present invention, implementing the present invention as discussed above may provide a mechanism for successful meeting the archiving requirements that demand increasingly greater storage and rapid accessibility.

This embodiment of the present invention favorably addresses several archiving issues and criteria. For example, one challenge raised by archiving is the accessibility of the archived data. Having archived data readily accessible online over an information network (e.g., the Internet) may provide the best accessibility to the data. However, conventional archiving systems typically implement means further removing the archived data from online accessibility. Deploying tape storage based backup procedures, for example, are less practical as they further remove the archived data from rapid online access and may also be more failure prone than optical or hard disk online storage formats. This embodiment of the present invention reduces the amount of memory or storage space used for an archive thereby facilitating its storage on more immediately accessible media. This reduction in the amount of memory or storage space to store an archive coupled with the fully searchable (i.e., the user is able to query the archived data) nature of the archive provides significant advantages over conventional archives.

One particular advantage according to this embodiment of the present invention is that a compression in the data occurs without any data loss. The patterns themselves are uniquely stored while addresses to the patterns are used in the tree structure representation of each tuple in a table. In this manner, the amount of memory or storage space necessary for the data set of a table may be substantially reduced over other conventional database management systems. In this manner, an archive may be stored using less memory or storage than otherwise conventionally necessary.

Another particularly advantageous benefit of this embodiment of the present invention is obtained when archiving snapshots of data in a database. A snapshot is copy of the data that exists in the database at one particular point in time. Because a snapshot of data from a database will share a considerable amount of data with other snapshots of the database and with the current data in the database, it is possible to achieve greater archiving efficiency. As described above, the patterns in the data set of a table are uniquely stored and pointers to the patterns are used in the representation of the table. The overlap between the patterns used in one archived snapshot and another archived snapshot and between an archived snapshot and the current data set may be substantial. Therefore, the patterns for all the snapshots may be stored together in a single pattern set for the table (i.e., not broken down into separate pattern sets for each archived snapshot). A root indirection set as previously described may then be used for each archived snapshot to indicate the grouping of patterns for the tuples in the snapshot. In other words, adding an archive of data (e.g., a snapshot of the database) may be implemented by simply adding a root indirection set for the archive. In addition, the delete function described herein would instead of erasing data (according to one embodiment above) would instead remove a tuple from the root indirection set for the current table of the database. Also, the update function described herein would instead of erasing data (according to one embodiment above) would instead add any new patterns to the pattern set for the table and create a new entry to the root indirection set for the current table of the database. In this manner, the patterns used in the root indirection set for the archive are preserved even though they may no longer be reachable (i.e., used) in the current database.

In addition to this embodiment of the present invention, other advantages of this embodiment include:

The following example illustrates the memory or storage savings that may be achieved according to this embodiment of the present invention used for implementing multiple archives. According to this example, a table containing one million tuples (records) having a total size of 200 MB (200 bytes per tuple) is going to be archived according to this embodiment. Assuming that there is 80% compression (i.e., reduction in the amount of space necessary) resulting from the savings in memory or storage space that occurs when patterns are stored uniquely with pointers for each tuple pointing to the unique patterns, the archive of the data uses 40 MB of data to store the patterns. In addition, as previously discussed a root indirection set may then be used by the archive to indicate its component tuples. As previously discussed, a root indirection set may use four bytes per tuple in a 32-bit system resulting in 4 MB of space for the one million tuples in the root indirection set of the archive. Combined with the 40 MB of storage, the archive uses 44 MB of space (40 MB for the storage of the patterns and pointers and 4 MB for the root indirection set). If a second archive (e.g., a second snapshot of the table data) is generated where 10% of the patterns are different from (new over) the first archive, an additional 4 MB of memory or storage space is necessary for these different patterns in addition to the 4 MB for the root indirection set for the second archive resulting in 52 MB of space for both archives (44 MB for the first archive+4 MB extra patterns for the second archive (10% of 40 MB)+4 MB for the root indirection set for the second archive=52 MB). This 52 MB represents considerably less memory or storage space than the 88 MB (44 MB per archive) that would otherwise be required if the two snapshots were stored separately. This savings in memory or storage space is in addition to the savings that occur from storing the patterns uniquely and using pointers to point to the patterns. In a conventional archiving system, the above example may require 400 MB for both archives (200 MB for each archive) whereas this embodiment of the present invention not only reduces the memory or storage for the archives to 88 MB (44 MB each) but further reduces their size by sharing the duplicated patterns resulting in only 52 MB of memory or storage. Each additional snapshot that is added to the this archive further increases the memory or storage space savings according to this embodiment of the present invention.

As previously stated, an archive unlike a current database (the database that is in current use) may be moved to a persistent storage media other than an online memory structure or storage space for which the above embodiments have been described. This may raise an issue regarding the immutability of the data relating to the use of pointers to the memory addresses of patterns. If the database is move to a persistent storage structure, the address of the patterns changes. When the database is reloaded into a memory structure or other readily accessible storage structure, the pointers may no longer refer to accurate pattern addresses. In order to correct for this potential problem when moving an archive to another media, the addresses are transformed into offset values (i.e., relative addresses) indicating an offset position in memory or storage with the pointers referencing the offset values. When the archive is restored (reloaded), the offset values are transformed from a relative address back to an actual address with the pointers referring to the actual address. In this manner, problems with the addressing of patterns may be avoided. This embodiment may also be used when moving the current database as well. According to one embodiment of the present invention, active data may be kept in memory (which is more readily accessible) while less active data may be stored on a persistent storage media such a disk from which it may be loaded into memory when needed. The short delay resulting from the loading of data into memory may be acceptable considering the other performance gains and, in particular, with the less frequent accessing of the data not already in memory.

In another embodiment of the present invention, the use of snapshots as described above may be used to perform time series analysis on the data in the database. For example, each snapshot captures the data in the database at a particular period of time. Using specified snapshots that are stored together allows for changes in the data over time to be examined indicating trends. This may be accomplished by running queries on each snapshot desired for the analysis using those snapshots' root indirection sets. According to this embodiment, time series analysis may be performed without any extra aggregation and indexing of the data as may be required in conventional specialty database allowing time series analysis.

What is claimed is:

1. A method for sorting a table of a database according to a sort pattern and a sort order, comprising:
    allocating space for a sorted table, the space allocated in memory or storage;
    determining an offset value for each sort pattern in the table of the database, the offset value determined as a function of the sort order and a number of instances for each sort pattern; and
    forming the sorted table by copying each row of the table of the database to the allocated space, a position of the row in the sorted table determined as a function of the sort pattern of the row and the offset value for the sort pattern of the row, wherein the offset value for the sort pattern of the row is incremented after copying the row.

2. A method for sorting a table of a database according to a sort pattern and a sort order, comprising:
    allocating space for a sorted pointer list, the space allocated in memory or storage and the sorted pointer list containing enough space for a pointer to each row of the table;
    determining an offset value for each sort pattern in the table, the offset value determined as a function of the sort order and a number of instances for each sort pattern; and
    forming the sorted pointer list by creating the pointer to each row of the table in the allocated space, a position of the pointer in the sorted pointer list determined as a function of the sort pattern of the row and the offset value for the sort pattern of the row, wherein the offset value for the sort pattern of the row is incremented after creating the pointer.

3. A method for sorting a subset of a table of a database according to selection criteria, a sort pattern, and a sort order, comprising:
    allocating space for a sorted table, the space allocated in memory or storage;
    determining an offset value for each sort pattern in the table of the database, the offset value determined as a function of the sort order and a number of instances for each sort pattern;
    comparing each row of the table of the database with the selection criteria to determine if the row meets the selection criteria;
    forming the sorted table by copying each row of the table of the database that meets the selection criteria to the allocated space, a position of the row in the sorted table determined as a function of the sort pattern of the row and the offset value for the sort pattern of the row, wherein the offset value for the sort pattern of the row is incremented after copying the row; and
    consolidating the sorted table, wherein unused allocated space is removed from the sorted table.

4. A method for sorting a subset of a table of a database according to selection criteria, a sort pattern, and a sort order, comprising:
    allocating space for a sorted pointer list, the space allocated in memory or storage and the sorted pointer list containing enough space for a pointer to each row of the table;
    determining an offset value for each sort pattern in the table, the offset value determined as a function of the sort order and a number of instances for each sort pattern;
    comparing each row of table with the selection criteria to determine if the row meets the selection criteria;
    forming the sorted pointer list by creating the pointer in the allocated space for each row of the table that meets the selection criteria, a position of the pointer in the sorted pointer list determined as a function of the sort pattern of the row and the offset value for the sort pattern of the row, wherein the offset value for the sort pattern of the row is incremented after creating the pointer; and
    consolidating the sorted pointer list, wherein unused allocated space is removed from the sorted pointer list.

5. A method for sorting a table of a database according to an expression, comprising:
    determining at least one unique pattern for a sort field of the table, wherein the sort field is used as part of the expression;
    sorting the table into at least one bin as a function of the at least one unique pattern, wherein the at least one bin is a block of data having a same value of the sort field of the table;
    determining a key for the at least one bin, wherein the key is a result of the expression using the same value of the sort field for the bin;
    generating a sorted list of keys, wherein the sorted list of keys contains the key and the key corresponds to one bin; and
    reordering the at least one bin as a function of the sorted list of keys.

6. A method for sorting a table of a database according to an expression, comprising:
    determining at least one unique pattern for a first sort field of the table, wherein the first sort field is used as part of the expression;
    determining at least one unique pattern for a second sort field of the table, wherein the second sort field is used as part of the expression;
    sorting the table into at least one bin, the table sorted in a reverse sort order first as a function of the at least one unique pattern for the second sort field and second as a function of the at least one unique pattern for the first sort field, wherein the at least one bin is a block of data having a first same value of the first sort field of the table and a second same value of the second sort field of the table;
    determining a key for the at least one bin, wherein the key is a result of the expression using the first same value of the first sort field for the bin and the second same value of the second sort field for the bin;
    generating a sorted list of keys, wherein the sorted list of keys contains the key and the key corresponds to one bin; and
    reordering the at least one bin as a function of the sorted list of keys.

7. A method for sorting a table of a database according to a first expression and a second expression, comprising:
    determining at least one unique pattern for at least one first sort field of the table, wherein the at least one first sort field is used as part of the first expression;
    determining at least one unique pattern for at least one second sort field of the table, wherein the at least one second sort field is used as part of the second expression;
    sorting the table into at least one bin first as a function of the second expression and second as a function of the first expression, the table first sorted as a function of the at least one unique pattern for the at least one second sort field of the second expression and second as a function of the at least one unique pattern for the at least one first sort field of the first expression;

determining a key for the at least one bin, wherein the key is a result of the first expression using the at least one unique pattern for at least one first sort field and the second expression using the at least one unique pattern for the at least one second sort field;

generating a sorted list of keys, wherein the sorted list of keys contains the key and the key corresponds to one bin; and reordering the at least one bin as a function of the sorted list of keys.

* * * * *